US012580132B2

(12) United States Patent　　　　　　(10) Patent No.: US 12,580,132 B2

Stockman　　　　　　　　　　　　　　　　(45) Date of Patent: Mar. 17, 2026

(54) CAPACITOR WITH MULTIPLE ELEMENTS FOR MULTIPLE REPLACEMENT APPLICATIONS

(71) Applicant: HVAC South, LLC, Beverly Hills, CA (US)

(72) Inventor: Robert M. Stockman, Palm Coast, FL (US)

(73) Assignee: HVAC South, LLC, Beverly Hills, CA (US)

( * ) Notice: Subject to any disclaimer, the term of this patent is extended or adjusted under 35 U.S.C. 154(b) by 0 days.

(21) Appl. No.: 17/542,079

(22) Filed: Dec. 3, 2021

(65) Prior Publication Data

US 2022/0344101 A1　　Oct. 27, 2022
US 2023/0307188 A9　　Sep. 28, 2023

Related U.S. Application Data

(63) Continuation of application No. 16/742,557, filed on Jan. 14, 2020, now Pat. No. 11,195,663, which is a (Continued)

(51) Int. Cl.
*H01G 4/38*　　　　(2006.01)
*H01G 2/10*　　　　(2006.01)
(Continued)

(52) U.S. Cl.
CPC .............. *H01G 4/385* (2013.01); *H01G 2/103* (2013.01); *H01G 2/24* (2013.01); *H01G 4/232* (2013.01);
(Continued)

(58) Field of Classification Search
CPC .......... H01G 4/385; H01G 2/10; H01G 4/224; H01G 4/232; H01G 4/236; H01G 4/32; H01G 2/24
See application file for complete search history.

(56) References Cited

U.S. PATENT DOCUMENTS 1,665,499 A　　4/1928　Hoch
1,707,959 A　　4/1929　Fried
(Continued)

FOREIGN PATENT DOCUMENTS

CA　　2285721　　4/2000
CA　　188725　　12/2021
(Continued)

OTHER PUBLICATIONS

US 10,504,654 B2, 12/2019, Stockman (withdrawn)
(Continued)

*Primary Examiner* — Michael P McFadden
(74) *Attorney, Agent, or Firm* — Dickinson Wright PLLC

(57) ABSTRACT

A capacitor provides a plurality of selectable capacitance values, by selective connection of six capacitor sections of a capacitive element each having a capacitance value. The capacitor sections are provided in a plurality of wound cylindrical capacitive elements. Two vertically stacked wound cylindrical capacitance elements may each provide three capacitor sections. There may be six separately wound cylindrical capacitive elements each providing a capacitor section. The capacitor sections have a common element terminal.

20 Claims, 30 Drawing Sheets

Related U.S. Application Data continuation-in-part of application No. 15/973,876, filed on May 8, 2018, now Pat. No. 11,183,338.

(60) Provisional application No. 62/792,187, filed on Jan. 14, 2019, provisional application No. 62/505,483, filed on May 12, 2017.

(51) Int. Cl.

| | |
|---|---|
| *H01G 2/24* | (2006.01) |
| *H01G 4/232* | (2006.01) |
| *H01G 4/236* | (2006.01) |
| *H01G 4/32* | (2006.01) |
| *H01G 5/011* | (2006.01) |
| *H01G 5/014* | (2006.01) |

(52) U.S. Cl.

CPC .............. *H01G 4/236* (2013.01); *H01G 4/32* (2013.01); *H01G 5/011* (2013.01); *H01G 5/014* (2013.01)

(56) References Cited

U.S. PATENT DOCUMENTS

| | | | |
|---|---|---|---|
| 1,789,949 A | | 1/1931 | Georgiev |
| 1,943,714 A | | 1/1934 | Bailey |
| 2,050,062 A | | 8/1936 | Mershon |
| 2,202,166 A | | 5/1940 | Peck |
| D122,825 S | | 10/1940 | Peck |
| D124,726 S | | 1/1941 | Shimer |
| D130,952 S | | 12/1941 | Miller |
| 2,296,123 A | | 9/1942 | Stimson |
| 2,569,925 A | | 10/1951 | Deeley |
| 2,607,833 A | | 8/1952 | Schomaker |
| 2,779,813 A | | 1/1957 | Collins |
| 2,896,008 A | | 7/1959 | Putz |
| 2,968,752 A | | 1/1961 | Rubinstein |
| 2,974,234 A | | 3/1961 | Rowe |
| 3,010,056 A | | 11/1961 | Kurland |
| 3,015,687 A | | 1/1962 | Ruscito |
| 3,041,477 A | | 6/1962 | Lucien et al. |
| 3,210,457 A | | 10/1965 | Hancock |
| 3,246,205 A | | 4/1966 | Miller |
| 3,302,081 A | | 1/1967 | Grahame |
| 3,304,473 A | | 2/1967 | Netherwood et al. |
| D209,054 S | | 10/1967 | Braiman et al. |
| D210,210 S | | 2/1968 | Braiman et al. |
| 3,377,510 A | | 4/1968 | Rayno |
| 3,454,858 A | | 7/1969 | Robinson |
| 3,473,088 A | | 10/1969 | Ernst |
| 3,524,614 A | | 8/1970 | Sorth |
| 3,553,542 A | | 1/1971 | Stonemetz |
| 3,555,370 A | | 1/1971 | Bowling |
| 3,593,066 A | | 7/1971 | Norman |
| 3,771,321 A | | 11/1973 | Maksy |
| 3,803,457 A | | 4/1974 | Yamamoto |
| 3,921,041 A | | 11/1975 | Stockman |
| 3,955,170 A | | 5/1976 | Geishecker |
| 3,988,650 A | | 10/1976 | Fritze |
| 4,009,425 A | * | 2/1977 | Muranaka .............. H01G 9/008 361/515 |
| 4,028,595 A | | 6/1977 | Stockman |
| 4,095,902 A | | 6/1978 | Florer et al. |
| 4,106,068 A | | 8/1978 | Flanagan |
| 4,107,758 A | | 8/1978 | Shirn et al. |
| 4,112,424 A | | 9/1978 | Lapeyre |
| 4,112,474 A | | 9/1978 | Wilson et al. |
| D253,887 S | | 1/1980 | Truner et al. |
| 4,190,702 A | | 2/1980 | Pun et al. |
| 4,209,815 A | | 6/1980 | Rollins et al. |
| 4,240,126 A | | 12/1980 | Sanvito |
| 4,263,638 A | | 4/1981 | Stockman et al. |
| 4,312,027 A | | 1/1982 | Stockman |
| 4,326,237 A | | 4/1982 | Markarian et al. |
| D264,959 S | | 6/1982 | Ota et al. |
| 4,352,145 A | | 9/1982 | Stockman |
| 4,356,729 A | | 11/1982 | Kubota |
| 4,360,848 A | | 11/1982 | Noutko et al. |
| 4,363,078 A | | 12/1982 | Dwyer |
| 4,388,669 A | | 6/1983 | Cichanowski |
| 4,398,782 A | | 8/1983 | Markarian |
| 4,408,818 A | | 10/1983 | Markarian |
| 4,420,791 A | | 12/1983 | Shedigian |
| 4,447,854 A | | 5/1984 | Markarian |
| 4,459,637 A | | 7/1984 | Shedigian |
| 4,486,809 A | | 12/1984 | Deak et al. |
| 4,546,300 A | | 10/1985 | Shaikh |
| 4,558,394 A | | 12/1985 | Stockman |
| 4,586,107 A | | 4/1986 | Price |
| 4,609,967 A | | 9/1986 | Shedigian |
| 4,621,301 A | | 11/1986 | Shedigian |
| 4,631,631 A | | 12/1986 | Hodges et al. |
| 4,633,365 A | | 12/1986 | Stockman |
| 4,633,367 A | | 12/1986 | Strange et al. |
| 4,633,369 A | | 12/1986 | Lapp et al. |
| 4,639,828 A | | 1/1987 | Strange et al. |
| 4,642,731 A | | 2/1987 | Shedigian |
| 4,698,725 A | | 10/1987 | MacDougall et al. |
| 4,737,785 A | | 4/1988 | Zottnik |
| 4,754,361 A | | 6/1988 | Venturini |
| 4,757,414 A | | 7/1988 | Barker et al. |
| 4,768,129 A | | 8/1988 | Sasaki |
| 4,804,944 A | | 2/1989 | Golladay et al. |
| 4,811,161 A | | 3/1989 | Sasaki |
| 4,812,941 A | | 3/1989 | Rice et al. |
| 4,813,116 A | | 3/1989 | Thiel et al. |
| 4,897,760 A | | 1/1990 | Bourbeau |
| D307,000 S | | 4/1990 | Sasaki |
| 4,992,910 A | | 2/1991 | Evans |
| 5,006,726 A | | 4/1991 | Okumura |
| 5,019,934 A | | 5/1991 | Bentley et al. |
| 5,032,948 A | | 7/1991 | Sakai |
| 5,138,519 A | | 8/1992 | Stockman |
| 5,148,347 A | | 9/1992 | Cox et al. |
| 5,162,718 A | | 11/1992 | Schroeder |
| 5,196,818 A | | 3/1993 | Anderson |
| 5,247,236 A | | 9/1993 | Schroeder |
| 5,280,219 A | | 1/1994 | Ghanbari |
| 5,313,360 A | | 5/1994 | Stockman |
| 5,381,301 A | | 1/1995 | Hudis |
| 5,412,532 A | | 5/1995 | Nishimori |
| 5,528,120 A | | 6/1996 | Brodetsky |
| 5,561,357 A | | 10/1996 | Schroeder |
| 5,673,168 A | | 9/1997 | Efford et al. |
| 5,691,845 A | | 11/1997 | Iwatsuka et al. |
| 5,817,975 A | | 10/1998 | Heilmann et al. |
| 5,847,919 A | | 12/1998 | Shimizu et al. |
| 5,866,276 A | | 2/1999 | Ogami et al. |
| 5,880,423 A | | 3/1999 | Li |
| D408,266 S | | 4/1999 | Santiago |
| 5,921,820 A | | 7/1999 | Dijkstra |
| 5,940,263 A | | 8/1999 | Jakoubovitch |
| 6,009,348 A | | 12/1999 | Rorvick et al. |
| 6,014,308 A | | 1/2000 | Stockman |
| 6,031,713 A | | 2/2000 | Takeisha et al. |
| 6,064,563 A | | 5/2000 | Yamada et al. |
| 6,084,764 A | | 7/2000 | Anderson |
| 6,141,205 A | | 10/2000 | Nutzman |
| 6,147,856 A | | 11/2000 | Karidis |
| 6,157,531 A | | 12/2000 | Breyen et al. |
| 6,160,465 A | | 12/2000 | Yamaguchi et al. |
| 6,212,058 B1 | | 4/2001 | Huber |
| 6,222,270 B1 | | 4/2001 | Lee |
| 6,229,236 B1 | | 5/2001 | Fisher |
| 6,233,133 B1 | | 5/2001 | Weng |
| 6,282,078 B1 | | 8/2001 | Tsai |
| 6,282,081 B1 | | 8/2001 | Takabayashi et al. |
| 6,310,756 B1 | | 10/2001 | Miura et al. |
| 6,313,978 B1 | | 11/2001 | Stockman et al. |
| 6,320,348 B1 | | 11/2001 | Kadah |
| 6,373,720 B1 | | 4/2002 | Fechtig et al. |
| 6,385,490 B1 | | 5/2002 | O'Phelan |
| 6,404,618 B1 | | 6/2002 | Beard et al. |

(56) References Cited

U.S. PATENT DOCUMENTS

| | | | |
|---|---|---|---|
| 6,410,184 B1 * | 6/2002 | Horiuchi | H01M 10/486 |
| | | | 429/153 |
| 6,442,955 B1 | 9/2002 | Oakner et al. | |
| D464,028 S | 10/2002 | Clark | |
| 6,466,429 B1 | 10/2002 | Volfkovich et al. | |
| 6,490,158 B1 | 12/2002 | Ellyson et al. | |
| 6,538,544 B1 | 3/2003 | Hardy | |
| 6,552,893 B2 | 4/2003 | Tanaka | |
| 6,681,627 B1 | 1/2004 | Li | |
| 6,697,249 B2 | 2/2004 | Maletin et al. | |
| 6,701,740 B1 | 3/2004 | Hernandez-Zelaya | |
| 6,706,079 B1 | 3/2004 | Shmatko et al. | |
| 6,720,689 B2 * | 4/2004 | Agnes | H02K 11/33 |
| | | | 310/43 |
| 6,730,865 B1 | 5/2004 | Hernandez-Zelaya | |
| 6,745,491 B1 | 6/2004 | Hernandez-Zelaya | |
| 6,798,677 B2 | 9/2004 | Jakob et al. | |
| 6,807,048 B1 | 10/2004 | Nielsen | |
| 6,816,541 B1 | 11/2004 | Hong | |
| 6,819,545 B1 | 11/2004 | Lobo et al. | |
| 6,842,328 B2 | 1/2005 | Schott | |
| 6,847,517 B2 | 1/2005 | Iwaida et al. | |
| D505,211 S | 5/2005 | Stanchfried | |
| 6,888,266 B2 | 5/2005 | Burke et al. | |
| 6,922,330 B2 | 7/2005 | Nielson et al. | |
| 6,930,874 B2 | 8/2005 | Lobot et al. | |
| 6,982,539 B1 | 1/2006 | Ward | |
| 6,992,259 B1 | 1/2006 | Cantolino | |
| 6,995,971 B2 | 2/2006 | Norton | |
| 7,009,125 B1 | 3/2006 | Hernandez-Zelaya | |
| 7,031,139 B1 | 4/2006 | Fayram | |
| 7,046,498 B1 | 5/2006 | Huang | |
| D522,456 S | 6/2006 | Matsumoto | |
| D524,758 S | 7/2006 | Sweeney | |
| D525,209 S | 7/2006 | Sweeney | |
| D529,202 S | 9/2006 | Nagai et al. | |
| 7,110,240 B2 | 9/2006 | Breyen | |
| 7,184,256 B1 | 2/2007 | Sato | |
| D541,218 S | 4/2007 | Colopy | |
| 7,203,053 B2 | 4/2007 | Stockman | |
| 7,206,186 B1 | 4/2007 | Knight | |
| D541,746 S | 5/2007 | Colopy | |
| 7,251,123 B2 | 7/2007 | O'Phelan | |
| D551,943 S | 10/2007 | Hodjat | |
| 7,315,250 B1 | 1/2008 | Hernandez-Zelaya | |
| D562,237 S | 2/2008 | Tu | |
| 7,337,945 B1 | 3/2008 | Riggs et al. | |
| 7,365,959 B1 | 4/2008 | Ward | |
| D573,008 S | 7/2008 | Sipe | |
| 7,423,861 B2 | 9/2008 | Stockman | |
| 7,474,519 B2 | 1/2009 | Stockman | |
| 7,474,520 B2 | 1/2009 | Kashihara | |
| 7,492,574 B2 | 2/2009 | Fresard et al. | |
| 7,511,941 B1 | 3/2009 | Gallay | |
| 7,521,148 B2 | 4/2009 | Kim | |
| 7,547,233 B2 | 6/2009 | Inoue et al. | |
| 7,619,420 B2 | 11/2009 | Stockman | |
| 7,667,954 B2 | 2/2010 | Lessner | |
| 7,710,713 B2 | 5/2010 | Restorff | |
| D621,789 S | 8/2010 | Wang et al. | |
| D623,500 S | 9/2010 | Langner | |
| 7,835,133 B2 | 11/2010 | Stockman | |
| 7,848,079 B1 | 12/2010 | Gordin et al. | |
| 7,867,290 B2 | 1/2011 | Nielsen | |
| 7,881,043 B2 | 2/2011 | Hirose et al. | |
| 7,911,762 B2 | 3/2011 | Stockman | |
| 7,911,766 B2 | 3/2011 | Caumont et al. | |
| 7,952,854 B2 | 5/2011 | Stockman | |
| 7,987,593 B1 | 8/2011 | Gorst | |
| 8,029,290 B2 | 10/2011 | Johnson | |
| D653,064 S | 1/2012 | Lutt | |
| 8,159,810 B1 | 4/2012 | Gorst et al. | |
| 8,170,662 B2 | 5/2012 | Bocek | |
| 8,174,817 B2 | 5/2012 | Georgopoulos et al. | |
| 8,270,143 B2 | 9/2012 | Stockman | |
| 8,274,778 B2 | 9/2012 | Yoshinaga et al. | |
| 8,310,802 B2 | 11/2012 | Fujii et al. | |
| 8,331,076 B2 | 12/2012 | Tuncer | |
| 8,371,458 B2 | 2/2013 | Yu | |
| D681,438 S | 5/2013 | Chen | |
| 8,456,795 B2 | 6/2013 | Stockman | |
| 8,465,555 B2 | 6/2013 | Sherwood | |
| 8,472,164 B2 | 6/2013 | Kim | |
| 8,514,547 B2 | 8/2013 | Galvagni | |
| 8,514,548 B2 | 8/2013 | Miller et al. | |
| 8,531,815 B2 | 9/2013 | Stockman | |
| 8,537,522 B2 | 9/2013 | Stockman | |
| 8,559,161 B2 | 10/2013 | Takeoka et al. | |
| 8,619,409 B2 | 12/2013 | Yawata et al. | |
| D707,639 S | 6/2014 | Rego | |
| 8,761,875 B2 | 6/2014 | Sherwood | |
| 8,842,411 B2 | 9/2014 | Zhang | |
| 8,853,318 B2 | 10/2014 | Tielemans | |
| 8,861,178 B2 | 10/2014 | Terashima et al. | |
| 8,861,184 B2 | 10/2014 | Schmidt | |
| 8,871,850 B2 | 10/2014 | Koh et al. | |
| 8,885,318 B2 | 11/2014 | Stockman | |
| 8,891,224 B2 | 11/2014 | Stockman | |
| D728,480 S | 5/2015 | Chang | |
| D729,164 S | 5/2015 | Chen | |
| 9,105,401 B2 | 8/2015 | Dreissig | |
| D747,225 S | 1/2016 | Decook | |
| 9,318,261 B2 | 4/2016 | Stockman | |
| 9,324,501 B2 | 4/2016 | Stockman | |
| 9,343,238 B2 | 5/2016 | Stockman | |
| 9,378,893 B2 | 6/2016 | Stockman | |
| 9,412,521 B2 | 8/2016 | Stockman | |
| 9,424,995 B2 | 8/2016 | Stockman | |
| 9,466,429 B1 | 10/2016 | Casanova | |
| D771,567 S | 11/2016 | Flohe et al. | |
| 9,496,086 B2 | 11/2016 | Stockman | |
| 9,536,670 B2 | 1/2017 | Stockman | |
| 9,629,455 B2 | 4/2017 | Shah et al. | |
| D795,819 S | 8/2017 | Okamoto et al. | |
| 9,859,060 B1 * | 1/2018 | Stockman | H01G 4/385 |
| 9,916,934 B1 | 3/2018 | Casanova et al. | |
| 9,947,467 B2 | 4/2018 | Goodson et al. | |
| D816,470 S | 5/2018 | Green | |
| D818,437 S | 5/2018 | Stockman | |
| D818,959 S | 5/2018 | Stockman | |
| 10,056,194 B2 | 8/2018 | Stockman | |
| 10,056,195 B2 | 8/2018 | Stockman | |
| D829,173 S | 9/2018 | Stockman | |
| 10,134,528 B2 | 11/2018 | Stockman | |
| 10,147,549 B2 | 12/2018 | Stockman | |
| 10,147,550 B1 | 12/2018 | Stockman | |
| 10,163,571 B2 | 12/2018 | Stockman | |
| 10,209,751 B2 | 2/2019 | Zikes | |
| 10,249,439 B2 | 4/2019 | Stockman | |
| 10,256,195 B2 | 4/2019 | Yamamoto | |
| 10,366,840 B1 | 7/2019 | Stockman | |
| 10,475,588 B2 | 11/2019 | Stockman | |
| 10,497,518 B1 | 12/2019 | Stockman | |
| 10,497,520 B1 | 12/2019 | Stockman | |
| D873,772 S | 1/2020 | Hsu et al. | |
| 10,586,655 B1 | 3/2020 | Stockman | |
| D886,741 S | 6/2020 | Okajima et al. | |
| D892,741 S | 8/2020 | Biere | |
| D893,441 S | 8/2020 | Rao | |
| D894,026 S | 8/2020 | Lievore | |
| D906,247 S | 12/2020 | Stockman | |
| D906,969 S | 1/2021 | Stockman | |
| D914,605 S | 3/2021 | Xin | |
| 11,177,074 B1 | 11/2021 | Stockman | |
| 11,183,330 B2 | 11/2021 | Stockman | |
| 11,183,335 B2 | 11/2021 | Stockman et al. | |
| 11,183,336 B2 | 11/2021 | Stockman et al. | |
| 11,183,337 B1 | 11/2021 | Stockman et al. | |
| 11,183,338 B2 | 11/2021 | Stockman | |
| 11,183,341 B1 | 11/2021 | Stockman | |
| 11,189,425 B1 | 11/2021 | Stockman et al. | |
| 11,189,426 B1 | 11/2021 | Stockman | |
| D937,785 S | 12/2021 | Hess | |
| D938,912 S | 12/2021 | Stockman | |

(56) References Cited

U.S. PATENT DOCUMENTS

| | | | |
|---|---|---|---|
| 11,195,663 B2 | 12/2021 | Stockman | |
| 11,369,198 B2 | 6/2022 | Sytsma | |
| D956,709 S | 7/2022 | Lin et al. | |
| 11,424,077 B1 * | 8/2022 | Stockman | H01G 4/40 |
| 11,575,298 B2 | 2/2023 | Waldrop et al. | |
| 11,946,237 B1 | 4/2024 | Hernandez-Zelaya | |
| D1,045,798 S | 10/2024 | Stockman | |
| D1,074,597 S | 5/2025 | McConnell et al. | |
| D1,075,701 S | 5/2025 | Wu | |
| 2001/0025618 A1 | 10/2001 | Kelling | |
| 2002/0030548 A1 | 3/2002 | Dejima | |
| 2003/0011959 A1 | 1/2003 | Moriwaki et al. | |
| 2005/0272012 A1 | 12/2005 | Logan et al. | |
| 2006/0007387 A1 | 1/2006 | Xiao | |
| 2006/0050468 A1 | 3/2006 | Inoue et al. | |
| 2006/0067031 A1 | 3/2006 | Crane | |
| 2006/0201971 A1 | 9/2006 | Wegman | |
| 2006/0222508 A1 | 10/2006 | Cantolino | |
| 2006/0227495 A1 | 10/2006 | Stockman | |
| 2007/0025051 A1 | 2/2007 | Stockman | |
| 2007/0221278 A1 | 9/2007 | Sartorius | |
| 2007/0236860 A1 | 10/2007 | Stockman | |
| 2007/0279015 A1 | 12/2007 | Livingston et al. | |
| 2007/0283707 A1 | 12/2007 | Hatano | |
| 2007/0295877 A1 | 12/2007 | Gaydos | |
| 2008/0025549 A1 | 1/2008 | Avera | |
| 2008/0158780 A1 | 7/2008 | Stockman | |
| 2008/0217053 A1 | 9/2008 | Vojtila et al. | |
| 2009/0001921 A1 | 1/2009 | Mills | |
| 2009/0052109 A1 | 2/2009 | Stockman et al. | |
| 2009/0059463 A1 | 3/2009 | Ward | |
| 2009/0115557 A1 | 5/2009 | Minowa | |
| 2009/0219665 A1 | 9/2009 | Stockman | |
| 2009/0261762 A1 | 10/2009 | Tsuchiya | |
| 2011/0063775 A1 | 3/2011 | Stockman | |
| 2011/0075342 A1 | 3/2011 | Gotham et al. | |
| 2011/0134584 A1 | 6/2011 | Stockman | |
| 2011/0157764 A1 | 6/2011 | Stockman | |
| 2011/0228444 A1 | 9/2011 | Lai et al. | |
| 2011/0228446 A1 | 9/2011 | Stockman | |
| 2011/0317333 A1 | 12/2011 | Chun | |
| 2012/0026046 A1 | 2/2012 | Bit-Babik | |
| 2012/0181240 A1 | 7/2012 | Crowley | |
| 2013/0003252 A1 | 1/2013 | Stockman | |
| 2013/0214720 A1 | 8/2013 | Stockman | |
| 2013/0329342 A1 | 12/2013 | Stockman | |
| 2013/0343029 A1 | 12/2013 | Stockman | |
| 2014/0049205 A1 | 2/2014 | Curiel | |
| 2014/0126107 A1 | 5/2014 | Yoda et al. | |
| 2014/0138009 A1 | 5/2014 | Lim | |
| 2014/0201018 A1 | 7/2014 | Chassin | |
| 2014/0232485 A1 | 8/2014 | Bultitude | |
| 2014/0285949 A1 | 9/2014 | Stockman | |
| 2014/0347784 A1 | 11/2014 | Stockman et al. | |
| 2015/0016012 A1 | 1/2015 | Stockman | |
| 2015/0022991 A1 * | 1/2015 | Stockman | H01G 4/224 |
| | | | 361/821 |
| 2015/0138690 A1 | 5/2015 | Stockman | |
| 2015/0255218 A1 | 9/2015 | Stockman et al. | |
| 2015/0287308 A1 | 10/2015 | Shuttleworth | |
| 2016/0028230 A1 | 1/2016 | Elfman | |
| 2016/0203916 A1 | 7/2016 | Stockman | |
| 2016/0233030 A1 | 8/2016 | Stockman | |
| 2017/0011855 A1 | 1/2017 | Stockman et al. | |
| 2017/0032898 A1 | 2/2017 | Stockman | |
| 2017/0110252 A1 | 4/2017 | Stockman | |
| 2017/0186554 A1 | 6/2017 | Stockman | |
| 2017/0229242 A1 | 8/2017 | Goodson et al. | |
| 2017/0236646 A1 | 8/2017 | Stockman | |
| 2017/0372838 A1 | 12/2017 | Casanova et al. | |
| 2018/0061600 A1 | 3/2018 | Ito | |
| 2018/0090278 A1 | 3/2018 | Stockman et al. | |
| 2018/0254150 A1 | 9/2018 | Stockman et al. | |
| 2018/0261391 A1 | 9/2018 | Stockman | |
| 2019/0057815 A1 | 2/2019 | Stockman | |
| 2019/0057817 A1 | 2/2019 | Stockman | |
| 2020/0066470 A1 | 2/2020 | Mitchell | |
| 2020/0143994 A1 | 5/2020 | Stockman | |
| 2020/0155983 A1 | 5/2020 | Maeda | |
| 2020/0161057 A1 | 5/2020 | Stockman et al. | |
| 2020/0211780 A1 | 7/2020 | Stockman | |
| 2020/0251285 A1 | 8/2020 | Stockman | |
| 2022/0328247 A1 | 10/2022 | Stockman | |
| 2022/0328254 A1 | 10/2022 | Stockman | |
| 2022/0336156 A1 | 10/2022 | Stockman | |
| 2022/0336157 A1 | 10/2022 | Stockman | |
| 2022/0336161 A1 | 10/2022 | Stockman | |
| 2022/0352789 A1 | 11/2022 | Waldrop et al. | |
| 2023/0261549 A1 | 8/2023 | Waldrop et al. | |
| 2023/0307189 A1 | 9/2023 | Stockman | |
| 2023/0411082 A1 | 12/2023 | Stockman | |
| 2024/0006126 A1 | 1/2024 | Stockman | |
| 2024/0029961 A1 | 1/2024 | Stockman | |
| 2025/0239399 A1 | 7/2025 | Waldrop et al. | |
| 2025/0239406 A1 | 7/2025 | Stockman | |
| 2025/0239410 A1 | 7/2025 | Stockman | |
| 2025/0239412 A1 | 7/2025 | Stockman | |
| 2025/0239413 A1 | 7/2025 | Stockman | |
| 2025/0239414 A1 | 7/2025 | Stockman | |
| 2025/0239415 A1 | 7/2025 | Stockman | |

FOREIGN PATENT DOCUMENTS

| | | |
|---|---|---|
| CA | 204951 | 12/2021 |
| CA | 204952 | 1/2022 |
| CN | 2033169 | 2/1989 |
| CN | 3607691 | 2/2007 |
| CN | 101991323 | 3/2011 |
| CN | 301914077 | 5/2012 |
| CN | 104201077 | 12/2014 |
| CN | 204351550 | 5/2015 |
| CN | 204539389 | 8/2015 |
| CN | 304472828 | 1/2018 |
| CN | 304806073 | 9/2018 |
| CN | 305610350 | 2/2020 |
| CN | 305625370 | 2/2020 |
| CN | 305780976 | 5/2020 |
| CN | 308082810 | 6/2023 |
| EP | 129714 | 1/1985 |
| EP | 1115128 | 7/2001 |
| EP | 2587503 | 3/2014 |
| FR | 2343221 | 9/1977 |
| FR | 2802708 | 6/2001 |
| GB | 517718 | 2/1940 |
| GB | 2169747 | 7/1986 |
| GB | 2070861 | 12/1997 |
| JP | S498747 A | 1/1974 |
| JP | S498748 | 2/1974 |
| JP | H04139807 | 5/1992 |
| JP | 07211596 A | 8/1995 |
| JP | D1273871 | 6/2006 |
| JP | D1288240 | 12/2006 |
| JP | 2007059477 A | 3/2007 |
| JP | D1456333 | 11/2012 |
| JP | 2015130259 | 7/2015 |
| KR | 20160061825 | 6/2016 |
| MX | 62279 | 8/2021 |
| MX | 65643 | 12/2022 |
| WO | WO 2010031594 | 3/2010 |
| WO | WO 2010037186 | 4/2010 |
| WO | WO 2014190072 | 11/2014 |
| WO | WO 2020123834 | 6/2020 |

OTHER PUBLICATIONS

Ebay, "25 + 3 nF MFD x 370 / 440 VAC Motor Run Capacitator AmRad USA2224BA+Made in USA," ebay.com, 2020 retrieved from URL: https://www.ebay.com/itm/25-3-uF-MFD-x-370-440-VAC-Motor-Run-Capacitor-AmRad-USA2224BA-Made-in-USA-/164162793031; retrieved on Oct. 28, 2020, 15 pages.

NMR.mgh.harvard.edu [online], "Strategies to Repair or Replace Old Electrolytic Capacitors," available on or before Nov. 30, 2001,

(56)            References Cited

OTHER PUBLICATIONS via Internet Archive: Wayback Machine URL <https://web.archive.org/web/20011130084328/https://www.nmr.mgh.harvard.edu/~reese/electrolytics/> retrieved on Apr. 22, 2021, URL <https://www.nmr.mgh.harvard.edu/-reese/electrolytics/, >, 6 pages.

YouTube video "AmRad's Turbo Installation" published on Apr. 22, 2012 by AmRad Engineering {link: https://www.youtube.com/watch?v=axo86NCbuNs&1c=UgguTwZgduBg5HgCoAEC}, 6 pages.

YouTube video "HVAC 1 AC Repairs 1 Turbo 200 Capacitor Install 1 Crest Hill IL 1 2" published on Jul. 15, 2011 by NLB Heating & Cooling hereafter referred to as NLB {link to video : https://www.youtube.com/watch?v=U7h7pg12t6M}, 5 pages.

"AC Capacitors," brochure by AmRad Engineering, Inc., undated (4 pages).

"American Radionic Co., Inc. Introduces . . . The World's First Multiple Metallized Film Dielectric Capacitor Produced from a Single Winding! The Patented Ultramet™ Capacitor," poster by American Radionic Co., Inc. (undated) (one page).

"Industrial Power Factor Correction Capacitors," Cornell Dubilier, Undated (1 page).

"The Patented Ultramet™ Capacitor," poster by American Radionic Co., Inc., (undated) (three pages).

"The Patented Ultramet™ Capacitor. A product of years of American Radionic research & development," poster by American Radionic Co., Inc, (undated) (one page).

Photograph 1 from Defendants' First Supplemental Disclosure of Non-Infringement and Invalidity Contentions, undated (1 page).

Photograph 10, undated (1 page).

Photograph 11, undated (1 page).

Photograph 12, undated (1 page).

Photograph 13, undated (1 page).

Photograph 14, undated (1 page).

Photograph 15, undated (1 page).

Photograph 16, undated (1 page).

Photograph 17, undated (1 page).

Photograph 18, undated (1 page).

Photograph 19, undated (1 page).

Photograph 2 from Defendants' First Supplemental Disclosure of Non-Infringement and Invalidity Contentions, undated (1 page).

Photograph 20, undated (1 page).

Photograph 3 from Defendants' First Supplemental Disclosure of Non-Infringement and Invalidity Contentions, undated (1 page).

Photograph 4 from Defendants' First Supplemental Disclosure of Non-Infringement and Invalidity Contentions, undated (1 page).

Photograph 5 from Defendants' First Supplemental Disclosure of Non-Infringement and Invalidity Contentions, undated (1 page).

Photograph 6 from Defendants' First Supplemental Disclosure of Non-Infringement and Invalidity Contentions, undated (1 page).

Photograph 7 from Defendants' First Supplemental Disclosure of Non-Infringement and Invalidity Contentions, undated (1 page).

Photograph 8, undated (1 page).

Photograph 9, undated (1 page).

"American Radionics—Home of the Turbo200 MultiUse Capacitor," online archive of website captured at http://web.archive.org/web/20050309191805fw_/http://www.americanradionic.com/home, Mar. 9, 2005, (16 pages), (accessed May 29, 2014).

"American Radionic Co., Inc. Introduces A New Circuit Component The Patented Ultramet™ Capacitor," poster by American Radionic Co., Inc., (poster undated, 1980 year date appears below one image), (one page).

"American Radionic Co., Inc. Introduces A New Circuit Component, The Patented Ultramet™ Capacitor," poster by American Radionic Co., Inc., which is reprint from Electronic News dated Feb. 11, 1980, (one page).

"American Radionic Company's Chronology of Patents, New Products and Technology Transfer Programs—From the Present, to the Past, a Thirty-Five Year Review," online website having URL: http:/www.americamadionic.com/content/blogcategory/13/29/8/16 , accessed May 19, 2014 (undated) (3 pages).

"American Radionic Introduces Capacitors Without Compromise", color brochure, 1989, (1 page).

"AmRad Engineering: Universal Capacitor," The Air Conditioning Heating Refrigeration News, Jan. 29, 2005, Printout of website having URL: "http://www.archrnews.com/articles/print/amrad-engineering-universal-capacitor" (accessed Jun. 2, 2014) (1 page).

"Capacitors—Motor Run, Oil Filled Capacitors, AC Rated. AmRad." Online archive of website captured at http://webarchive.org/web/20041214091042/http://americanradionic.com, Dec. 14, 2004, (13 pages) (accessed May 29, 2014).

"Capacitors—Motor Run, Oil Filled Capacitors, AC Rated. AmRad." Online archive of website captured at http:/webarchive.org/web/20011126195819/http://www.americanradionic.com. Nov. 26, 2001, (13 pages) (accessed May 29, 2014).

"Capacitors—Motor Run, Oil Filled Capacitors, AC Rated. AmRad." Printout of website having URL: http://amradcapacitors.com/index.htm, Jan. 3, 2003(20 pages).

"Product of the Year Awards," Electronic Products Magazine, Jan. 1981, pp. 39-45.

"Super-Sized Show," ASHRae Journal Show Daily, 2005 International Air-Conditioning, Heating, Refrigerating Exposition, Tuesday, Feb. 8, 2005 (24 pages).

Amazon. <https://www.amazon.com/TEMCo-Capacitor-RC0120-50-Electric-Motor/dp/B01H0S87X6/ref+pd_sim_328_5> Aug. 29, 2014. TEMCo Dual Run Capacitor RC0120-50/5 nnfd 370 V 440 V VAC volt 50+5uf AC Electric Motor HVAC, 6 pages.

Amazon. <URL: https://www.amazon.com/AmRad-Turbo-200-Mini-Oval/dp/BOOKQSKDOY/ref=pd_sbs_60_4?_encoding=UTF8&pd_rd_i=BOOKQSKDOY&pd_rd_r=A6')/0E2')/080')/0A6.> May 5, 2015. AmRad Turbo 200 Mini Oval Capacitor with label and color trim, 5 pages.

Amazon. <URL: https://www.amazon.com/Amrad-Turbo-Universal-Motor-Capacitor/dp/B00B610TOM/ref=pd_rhf_dp_s_cp_0_7?_encoding=UTF8&pd_rd_i=BOOB610TOM&pd_rd_r=N5WYCAD5Y36C86DFWDEG&pd_rd_w=6tW71&pd_rd_wg=DWEJcApsc=1&refRID=N5WYCAD5Y36C86DFWDEG.> Jan. 27, 2013. Amrad Turbo 200X Universal Motor Run Capacitor.

Amazon. <URL: https://www.amazon.com/AmRad-USA2227-MFD-370-Volt/dp/BOOGSU3YV8/ref=pd_day0_328_6?_encoding=UTF8&pd_rd_i=BOOGSU3YV8&pd_rd_r%E2')/080')/0A6.> Jun. 29, 2014, AmRad Dual Run Capacitor, 6 pages.

Amazon. <URL: https://www.amazon.com/CPT00656-Trane-Roimd-Capacitor-Upgrade/dp/BOOEVTIOMC/ref=cm_cr_arp_d_product_top?ie=UTF8.> May 11, 2016. Replacement Trane Round Dual Run Capacitor, 6 pages.

Amazon. <URL: https://www.amazon.com/gp/product/B01HPK5ANO/ref=s9_dcacsd_dcoop_bw_c_x_6_w.> Aug. 21, 2016, Titan TRCFD405 Dual Rated Motor Run Capacitor, 6 pages.

Amazon. <URL: https://www.amazon.com/Labels-Protective-Backed-Clean-Remove-Adhesive/dp/BOOVIDW1C1/ref=sr_1_18?ie=UTF8&clid=1522957818&sr=8-18&keycY0E2')/080')/0A6.> Apr. 1, 2015, Labels, 7 pages.

Amazon. <URL: https://www.amazon.com/MARS-Motors-Armatures-12788-Capacitor/dp/BOOCOYS2CM/ref=pd_sim_328_6?_encoding=UTF8&pd_rd_i=BOOCOYS2CM&pd_rd_r=KEFT1DXGOAWQ1KCZDJFJ&pd_rd_w=LNF6S&pd_rd_wg=5eFTh&psc=1&refRID=KEFT1DXGOAWQ1KCZDJFJ.> Jan. 25, 2012, MARS Dual Run Capacitor, 7 pages.

Amazon. <URL: https://www.amazon.com/Packard-TRCFD405-5MFD-370VACCapacitor/dp/B009558E9U/ref=pd_sim_328_4?_encoding=UTF8&pd_rd_i=B009558E9U&pd_rd_r=SX1DRWZQZ8SH12JWHYH2&pd_rd_w=y 1jQe&pd_rd_wg=mH0n1&psc=1&refRID=SX1DRWZQZ8SH12JWHYH2&dp1D=3IIxzeyCr/0252B7L&preST=_QL70_&dpSrc=detail.> May 1, 2015, Packard Capacitor, 5 pages.

Amazon. <URL: https://www.amazon.com/Universal-Capacitor-Trane-Replacement—USA2031/dp/BOOGSU4OKW/ref=pd_sim_328_3?_encoding=UTF8&pd_rd_i=BOOGSU4OKW&pd_rd_r=YX6P84XR7NY113X4DWJG&pd_rd_w=gejaD&pd_rd_wg=NLVIY&psc=1&refRID=YX6P84XR7NY113X4DWJG.> Nov. 26, 2014. Am Rad Oval Universal Capacitor with label and color trim, 6 pages.

(56) References Cited

OTHER PUBLICATIONS

Amazon. <URL:https://www.amazon.com/dp/B00FL70C0U/ref= cm_sw_r_cp_ep_dp_qII7BbFD278ZE> Dec. 4, 2013. Amrad Engineering USA2215 Round Motor Run Capacitor, 40 MFD, 370_440 Vac—Pipe Fittings, 6 pages.

Amazon. <URL:https://www.amazon.com/dp/B01F7P8GJO/ref= sspa_dk_detail_4?psc=1.> Aug. 1, 2016, TradePro PowerWell Dual Run Round Capacitor, 6 pages.

Amazon. Link: https://www.amazon.com/Round-Universal-Capacitor-Replacement-USA2235/dpBOOGSU4401/ref=cnn_cr_arp_d_product_top?ie=UTF8. Jun. 20, 2014. Round Dual Universal Capacitor. (Year: 2014), 6 pages.

Answer and affirmative defenses to Complaint by Cornell-Dubliner Electronics, Inc. (Allaman, Melissa) (Entered: Jan. 9, 2015).

Answer and affirmative defenses to Complaint by Packard Inc. (Allaman, Melissa) (Entered: Jan. 9, 2015).

Case Management and Scheduling Order: Amended Pleadings and Joinder of Parties due by Apr. 9, 2015. Discovery due by Feb. 16, 2016. Dispositive motions due by Apr. 7, 2016. Pretrial statement due by Aug. 11, 2016. All other motions due by Jul. 28, 2016. Plaintiff disclosure of expert report due by Dec. 10, 2015. Defendant disclosure of expert report due by Jan. 14, 2016. Final Pretrial Conference set for Aug. 18, 2016 at 01:15 PM in Orlando Courtroom 4 A before Judge Roy B. Dalton, Jr., Jury Trial Set for the trial team commencing Sep. 6, 2016 at 09:00 AM in Orlando Courtroom 4 A before Judge Roy B. Dalton Jr., Conduct mediation hearing by Mar. 29, 2016. Lead counsel to coordinate dates. Signed by Judge Roy B, Dalton, Jr. on Feb. 10, 2015. (VMF). (Entered: Feb. 10, 2015).

PCT International Search Report and Written Opinion in International Appln. No. PCT/US2019/068738, dated Mar. 10, 2020 13 pages.

Complaint for Patent Infringement against Cornell-Dubliner Electronics, Inc., Packard Inc. with Jury Demand (Filing fee $400 receipt No. ORL-38930) filed by American Radionic Company, Inc. (Attachments: #1 Civil Cover sheet, #2 Exhibit A)(LMM) Modified on Nov. 19, 2014 (LMM). (Entered: Nov. 19, 2014).

Declaration of Noah C. Graubart in Support of Plaintiff's Claim Construction Brief by American Radionic Company, Inc. (Attachments: #1 Exhibit 1, #2 Exhibit 2, #3 Exhibit 3, #4 Exhibit 4, #5 Exhibit 5, #6 Exhibit 6) (Graubart, Noah) (Entered: Jun. 18, 2015).

Defendants' First Supplemental Disclosure of Non-Infringement and Invalidity Contentions *American Radionic, Inc., v. Packard, Inc.*, and *Cornell-Dubilier Electronics, Inc.*, No. 6:14-cv-01881-RBD-KRS.

Document from Defendants' First Supplemental Disclosure of Non-Infringement and Invalidity Contentions that purported to be Standard for Safety UL 810 Capacitors, Underwriters Laboratories Inc, having multiple dates ranging from 1976 to 1988 (22 pages).

Edisontechcenter. Link: http://edisontechcenter.org/batteries. html#drycell. 2014. Bright Star 1.5 V Columbia dry cell. (Year: 2014), 10 pages.

Eveready. Link: http://www.eveready.com/about-us/battery-history. Visited Nov. 30, 2018. 1950s Eveready Battery, (Year: 2018), 2 pages.

First Amended Answer and affirmative defenses to 1 Complaint by Cornell-Dubliner Electronics, Inc. (Allaman, Melissa) (Entered: Feb. 4, 2015).

First Amended Answer and affirmative defenses to 1 Complaint by Packard Inc. (Allaman, Melissa) (Entered: Jan. 9, 2015).

Grainger, "Round Motor Dual Run Capacitor, 40/5 Microfarad Rating, 370VAC Voltage," Retrieved from the Internet: URL<https:// www.grainger.com/product/5CMW3 &AL!2966!3!166587674359!!!!g!82128730437!?cm_mmc=PPC:+ Google+PLA?campaignid=719691765&s_kwcid= AL!2966!3!166587674359!!!!182128730437!&ef_id= WRSnxQAAAILWhRlb:20170824174108:s>. Visited Aug. 24, 2017, Capacitor.

Hudis, Martin et al., "Motor-Run Capacitors," Motors & Motor Control, undated (reprinted from Appliance Manufacturer, Oct. 1994) (3 pages).

Hudis, Martin, "Plastic Case Self-Protected Liquid Filled AC Capacitors for 70° Applications," Presented at CAPTECH '97, Mar. 1997, 7 pages.

Hudis, Martin, "Technology Evolution in Metallized Polymeric Film Capacitors over the Past 10 Years," Presented at CARTS Symposium in Nice, France, Oct. 1996, 9 pages.

International Search Report and Written Opinion, PCT/US2014/ 39003, dated Oct. 2, 2014, 12 pages.

Joint Pre-Hearing Statement re: Claim Construction by American Radionic Company, Inc., Packard Inc., Cornell-Dubliner Electronics, Inc. (Attachments: #1 Exhibit 1, #2 Exhibit 2) (Graubart, Noah) Modified on Jul. 24, 2015.

Macomber, Laird L., et al., "New Solid Polymer Aluminum Capacitors Improve Reliability," Electro Power Electronics, Oct. 1, 2001, 5 pages.

Macomber, Laird L., et al., "Solid Polymer Aluminum Capacitor Chips in DC-DC Converter Modules Reduce Cost and Size and Improve High-Frequency Performance,"PCIM Power Electronics 2001 Proceeding for the PowerSystems World Conference, Sep. 2001, 8 pages.

Mallory Distributor Products Co., 1967 Precision Electronic Components Catalog, 52 pages.

Minute Entry, Proceedings of Claim Construction Hearing held before Judge Roy B. Dalton, Jr. on Aug. 24, 2015, Court Report: Arnie First (VMF) (FMV), (Entered: Aug. 24, 2015).

PCT International Preliminary Report on Patentability in International Appln. No. PCT/US2019/068738, dated Jul. 8, 2021, 11 pages.

PCT International Search Report and Written Opinion in International Appln. No. PCT/US2007/89034, dated Apr. 18, 2008, 9 pages.

PCT International Preliminary Report on Patentability in International Appln. No. PCT/US2007/89034, dated Jul. 9, 2009, 6 pages.

PCT International Preliminary Report on Patentability in International Appln. No. PCT/US2014/039003, dated Dec. 3, 2015, 7 pages.

Notice of Filing of Claim Construction Evidence by American Radionic Company, Inc. (Attachments: #1 Exhibit 1, #2 Exhibit 2, #3 Exhibit 3) (Graubart, Noah) Modified on Aug. 25, 2015 (EJS). (Entered: Aug. 25, 2015).

Order granting 69 Motion for Consent Judgment and Injunction, Signed by Judge Roy B. Dalton, Jr. on Nov. 5, 2015. (CAC) (Entered Nov. 5, 2015).

Parente, Audrey, "Can-sized device the right fit," The Daytona Beach News-Journal, Jan. 3, 2005 (2 pages).

Plaintiff's Brief re 59 Declaration Plaintiff's Claim Construction Brief filed by American Radionic Company, Inc. (Graubart, Noah) (Entered May 18, 2015).

Response to Plaintiff's Claim Construction Brief re 60 Brief— Plaintiff filed by Cornell-Dubliner Electronics, Inc., Packard Inc. (Killen, Craig) Modified on Jul. 17, 2015 (EJS). (Entered Jul. 16, 2015).

Ruby Lane, SuzansTreasures.shop, Link: https://www.mbylane.com/ item/34499-CCKx20-x20205/Mazon-Cobalt-Glass-Jar-Medicine-Bottle. Visited Jul. 22, 2019. 1940s Mazon Cobalt Glass Jar Medicine Bottle.

Status report Joint Claim Construction Statement by American Radionic Company, Inc., Packard Inc., and Cornell-Dubliner Electronics, Inc. (Attachments: #1 Exhibit 1, #2 Exhibit 2) (Graubart, Noah) Modified on May 29, 2015 (SWT). (Entered: May 28, 2015).

Transacript of Markman Hearing held on Aug. 24, 2015 before Judge Roy B. Dalton, Jr., Court Reporter Amie R. First, DRD, CRR< AmieFirst.CourtReporter@gmail.com. Transcript may be viewed at the court public terminal or purchased through the Court Reporter before the deadline for Release of Transcript Restriction. After that date it may be obtained through PACER or purchased through the court Reporter, Redaction Request due Oct. 22, 2015. Redacted Transcript Deadline set for Nov. 2, 2015. Release of Transcript Restriction set for Dec. 30, 2015, (ARF) (Entered: Oct. 1, 2015).

(56)                 References Cited

OTHER PUBLICATIONS

Wikimedia Commons. Link: https://connnnons.wikimedia.org/wiki/File:PP4-PP3-batteries.jpg. Oct. 22, 2016. Eveready PP4 battery. (Year: 2016), 17 pages.
YouTube. <URL: https://www.youtube.com/watch?v=19A9IvQ611A&t=3s.> Oct. 1, 2015. GE Dual Run Capacitor, 5 pages.
YouTube. <URL: https://www.youtube.com/watch?v=R5B189BWrz0.> Jul. 29, 2011. HVAC Service : Install New Turbo 200 Capacitor.
YouTube. <URL: https://www.youtube.com/watch?v=U7h7pg12t6M.> Jul. 15, 2011. How to Install The Turbo 200 Capacitor.
YouTube. <URL: https://www.youtube.com/watch?v=Xiw_xHXJHUg.> Sep. 4, 2011. AmRad Dual Run Capacitor, 4 pages.
Amazon.com [online], "BlueStars—Hard Start Capacitor," Aug. 29, 2019, retrieved on May 17, 2023, retrieved from URL<https://www.amazon.co.uk/dp/B07X463KD1/>, 1 page.
Amazon.com [online], "BlueStars 35+3 MFD uf 370 or 440 Volt Dual Run Round Capacitor CBB65 Replacement Part," May 7, 2021, retrieved on Jul. 21, 2023, retrieved from URL<https://www.amazon.com/dp/B094C8P8NT/>, 9 pages.
Amradmanufacturing.com [online], "AmRad—Turbo Easy-Start 5," available on or before Sep. 22, 2020, retrieved on May 16, 2023, retrieved from URL<https://amradmanufacturing.com/products/turbo-easy-start-5/>, 14 pages.
Ktool.net [online], "Mars 12200 TURBO 200 2.5/5/5/10/20/25 MFD Universal Round Run Capacitor," available on or before Jul. 3, 2022, retrieved on Jul. 21, 2023, retrieved from URL<https://www.ktool.net/mars-12200-turbo-200-2-5-5-5-10-20-25-mfd-universal-round-run-capacitor/?gclid=EAlalQobChM187646ZyggAMVwX9MChOcfgwbEAQYBCABEglXV_D_BwE>, 5 pages.

Orbit.com [online], "Capacitor and relays. (Design-©Questel)," [Online PDF compilation of references selected by examiner], date ranges Dec. 1, 2004-Oct. 23, 2020, retrieved on May 24, 2023, retrieved from URL<https://www.orbit.com/export/UCZAH96B/pdf4/flfd9el a-5fbf46a1-a7a3-a0df0b968f4a-160819.pdf>, 18 pages.
Supplyhouse.com [online], "2.5-67.5 MFD, AmRad Turbo 200 Universal Capacitor (370/440V)," available on or before 2018, retrieved on Jul. 21, 2023, retrieved from URL<https://www.supplyhouse.com/MARS-12200-2-5-67-5-MFD-AmRad-Turbo-200-Universal-Capacitor-370-440V>, 4 pages.
Supplyhouse.com [online], "23-208 MFD Turbolytic JR Universal Replacement Capacitor (125-330V)," available on or before Apr. 5, 2016, retrieved on Jul. 27, 2023, retrieved from URL<https://www.supplyhouse.com/MARS-11100-23-208-MFD-Turbolytic-JR-Universal-Replacement-Capacitor-125-330V>, 4 pages.
Albmagnets.com [online], "25 x 10 x 1.5mm Block Magnets | F25x10x1.5mm-AD," available on or before 2023, retrieved on Jul. 24, 2023, retrieved from URL<https://www.albmagnets.com/block-magnets/2254-25-x-10-x-15mm-block-magnets-f401nasa.html>, 5 pages.
AnnexGlobal.com [online], "Full Line HVACR Product Catalog," 2018, retrieved on Sep. 4, 2020, retrieved from URL<https://www.annerexglobal.conn/innages/SUPCO.pdf.>, 188 pages.
[No Author Listed] [online], "Hung-Rite HVAC Equipment Hanger—HVAC horizontal installs in minutes," Dec. 4, 2012, retrieved on Dec. 3, 2024, retrieved from URL <https://www.youtube.com/watch?v=gjpiUe_wVv8>, 11 pages (with machine transcript).
Hung-rite.com [online], "Get you HVAC equipment installed in just 15 minutes with Hung-Rite HVAC Equipment Hangerz," available on or before Feb. 24, 2024, via Internet Archive: Wayback Machine URL <https://web.archive.org/web/20240224232035/https://www.hung-rite.com/>, retrieved on Dec. 3, 2024, retrieved from URL <https://www.hung-rite.com/>, 2 pages.

* cited by examiner

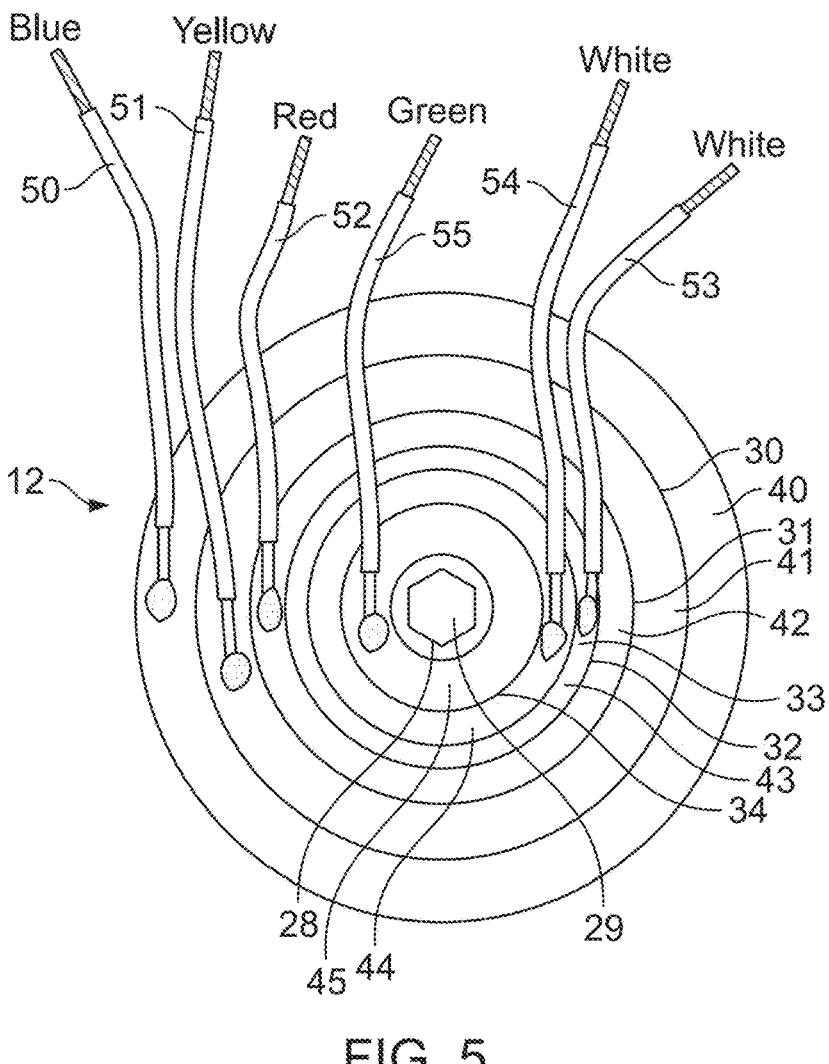
FIG. 5
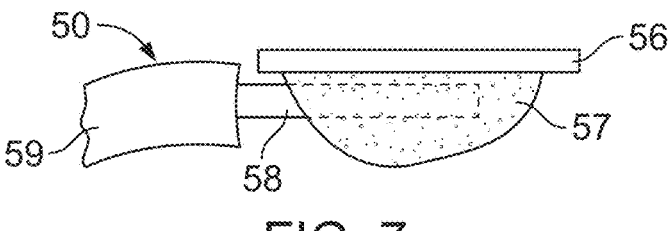
FIG. 6
FIG. 7

Single Value Capacitors

| | Green 2.5 Mfd. | White 5.0 Mfd. | White 5.0 Mfd. | Red 10.0 Mfd. | Yellow 20.0 Mfd. | Blue 25.0 Mfd. | | Total Value Mfd. |
|---|---|---|---|---|---|---|---|---|
| 1 | 2.5 | | | | | | Equals | 2.5 |
| 2 | | 5.0 | | | | | Equals | 5.0 |
| 3 | 2.5 | 5.0 | | | | | Equals | 7.5 |
| 4 | | | | 10.0 | | | Equals | 10.0 |
| 5 | 2.5 | | | 10.0 | | | Equals | 12.5 |
| 6 | | 5.0 | | 10.0 | | | Equals | 15.0 |
| 7 | 2.5 | 5.0 | | 10.0 | | | Equals | 17.5 |
| 8 | | | | | 20.0 | | Equals | 20.0 |
| 9 | 2.5 | | | | 20.0 | | Equals | 22.5 |
| 10 | | 5.0 | | | 20.0 | | Equals | 25.0 |
| 11 | 2.5 | 5.0 | | | 20.0 | | Equals | 27.5 |
| 12 | | | | 10.0 | 20.0 | | Equals | 30.0 |
| 13 | 2.5 | | | 10.0 | 20.0 | | Equals | 32.5 |
| 14 | | 5.0 | | 10.0 | 20.0 | | Equals | 35.0 |
| 15 | 2.5 | 5.0 | | 10.0 | 20.0 | | Equals | 37.5 |
| 16 | | 5.0 | | 10.0 | | 25.0 | Equals | 40.0 |
| 17 | 2.5 | 5.0 | | 10.0 | | 25.0 | Equals | 42.5 |
| 18 | | | | | 20.0 | 25.0 | Equals | 45.0 |
| 19 | 2.5 | | | | 20.0 | 25.0 | Equals | 47.5 |
| 20 | | 5.0 | | | 20.0 | 25.0 | Equals | 50.0 |
| 21 | 2.5 | 5.0 | | | 20.0 | 25.0 | Equals | 52.5 |
| 22 | | | | 10.0 | 20.0 | 25.0 | Equals | 55.0 |
| 23 | 2.5 | | | 10.0 | 20.0 | 25.0 | Equals | 57.5 |
| 24 | | 5.0 | | 10.0 | 20.0 | 25.0 | Equals | 60.0 |
| 25 | 2.5 | 5.0 | | 10.0 | 20.0 | 25.0 | Equals | 62.5 |
| 26 | | 5.0 | 5.0 | 10.0 | 20.0 | 25.0 | Equals | 65.0 |
| 27 | 2.5 | 5.0 | 5.0 | 10.0 | 20.0 | 25.0 | Equals | 67.5 |

(Item No. is the leftmost column for rows 1–27.)

These are all Parallel Connections.

← This is the Capacitor Value being Replaced.

Mfd= microfarad

Using this Chart, Add Across to Calculate the Microfarad Values Needed to Obtain the Required Final Total Which will be Equal to the Part being Replaced.

Attach the Enclosed Jumper Wires to the Various Terminals to Obtain the Desired Microfarad Value. Then, Connect One Lead from the Compressor to the Common (Black Cup - Center Terminal) and the Other Lead to the Terminal of Highest Microfarad Value that has been Selected.

FIG. 19

Dual Value Capacitors

This is the Capacitor Value being Replaced. → (Compressor Total)

This is the Capacitor Value being Replaced. → (Fan Total Green)

Mfd=microfarad

Using this Chart, Add Across to Calculate the Microfarad Values Needed to Obtain the Required Final Total Which will be Equal to the Part being Replaced.

Use the Enclosed Jumper Wires to Actually Obtain the Desired Microfarad Value.

| Item No. | Fan Total Green 2.5 Mfd. | Herm White 5.0 Mfd. | Herm White 5.0 Mfd. | Herm Red 10.0 Mfd. | Herm Yellow 20.0 Mfd. | Herm Blue 25.0 Mfd. | | Compressor Total Mfd. |
|---|---|---|---|---|---|---|---|---|
| 1 | 2.5 | 5.0 | | | | | Equals | 5.0 |
| 2 | 2.5 | | | 10.0 | | | Equals | 10.0 |
| 3 | 2.5 | 5.0 | | 10.0 | | | Equals | 15.0 |
| 4 | 2.5 | | | | 20.0 | | Equals | 20.0 |
| 5 | 2.5 | 5.0 | | | 20.0 | | Equals | 25.0 |
| 6 | 2.5 | 5.0 | | | | 25.0 | Equals | 30.0 |
| 7 | 2.5 | | | 10.0 | | 25.0 | Equals | 35.0 |
| 8 | 2.5 | 5.0 | | 10.0 | | 25.0 | Equals | 40.0 |
| 9 | 2.5 | | | | 20.0 | 25.0 | Equals | 45.0 |
| 10 | 2.5 | 5.0 | | | 20.0 | 25.0 | Equals | 50.0 |
| 11 | 2.5 | | | 10.0 | 20.0 | 25.0 | Equals | 55.0 |
| 12 | 2.5 | 5.0 | | 10.0 | 20.0 | 25.0 | Equals | 60.0 |
| 13 | 2.5 | 5.0 | 5.0 | 10.0 | 20.0 | 25.0 | Equals | 65.0 |

This 2.5mfd Capacitor can also be used as a Direct Substitute for a 3.0Mfd "fan" Capacitor.

These are all Parallel Connections.

FIG. 20

Dual Value Capacitors

This is the Capacitor Value being Replaced.

| Item No. | Fan Total White | Herm (Compressor) | | | | | | Compressor Total |
|---|---|---|---|---|---|---|---|---|
| | | Green | White | Red | Yellow | Blue | | |
| | 5.0 | 2.5 | 5.0 | 10.0 | 20.0 | 25.0 | | |
| | Mfd. | Mfd. | Mfd. | Mfd. | Mfd. | Mfd. | | Mfd. |
| 1 | 5.0 | 2.5 | | | | | Equals | 2.5 |
| 2 | 5.0 | | 5.0 | | | | Equals | 5.0 |
| 3 | 5.0 | 2.5 | 5.0 | | | | Equals | 7.5 |
| 4 | 5.0 | | | 10.0 | | | Equals | 10.0 |
| 5 | 5.0 | 2.5 | | 10.0 | | | Equals | 12.5 |
| 6 | 5.0 | | 5.0 | 10.0 | | | Equals | 15.0 |
| 7 | 5.0 | 2.5 | 5.0 | 10.0 | | | Equals | 17.5 |
| 8 | 5.0 | | | | 20.0 | | Equals | 20.0 |
| 9 | 5.0 | 2.5 | | | 20.0 | | Equals | 22.5 |
| 10 | 5.0 | | 5.0 | | 20.0 | | Equals | 25.0 |
| 11 | 5.0 | 2.5 | 5.0 | | 20.0 | | Equals | 27.5 |
| 12 | 5.0 | | | 10.0 | 20.0 | | Equals | 30.0 |
| 13 | 5.0 | 2.5 | | 10.0 | 20.0 | | Equals | 32.5 |
| 14 | 5.0 | | 5.0 | 10.0 | 20.0 | | Equals | 35.0 |
| 15 | 5.0 | 2.5 | 5.0 | 10.0 | 20.0 | | Equals | 37.5 |
| 16 | 5.0 | | 5.0 | 10.0 | | 25.0 | Equals | 40.0 |
| 17 | 5.0 | 2.5 | 5.0 | 10.0 | | 25.0 | Equals | 42.5 |
| 18 | 5.0 | | | | 20.0 | 25.0 | Equals | 45.0 |
| 19 | 5.0 | 2.5 | | | 20.0 | 25.0 | Equals | 47.5 |
| 20 | 5.0 | | 5.0 | | 20.0 | 25.0 | Equals | 50.0 |
| 21 | 5.0 | 2.5 | 5.0 | | 20.0 | 25.0 | Equals | 52.5 |
| 22 | 5.0 | | | 10.0 | 20.0 | 25.0 | Equals | 55.0 |
| 23 | 5.0 | 2.5 | | 10.0 | 20.0 | 25.0 | Equals | 57.5 |
| 24 | 5.0 | | 5.0 | 10.0 | 20.0 | 25.0 | Equals | 60.0 |
| 25 | 5.0 | 2.5 | 5.0 | 10.0 | 20.0 | 25.0 | Equals | 62.5 |

←This is the Capacitor Value being Replaced.

Mfd= microfarad

Using this Chart, Add Across to Calculate the Microfarad Values Needed to Obtain the Required Final Total Which will be Equal to the Part being Replaced.

Use the Enclosed Jumper Wires to Actually Obtain the Desired Microfarad Value.

The 5.0Mfd Capacitor (White Cup) that is Closest to the Green Cup can be used to Replace a 4.0Mfd Fan Motor Capacitor.

These are all Parallel Connections.

FIG. 21

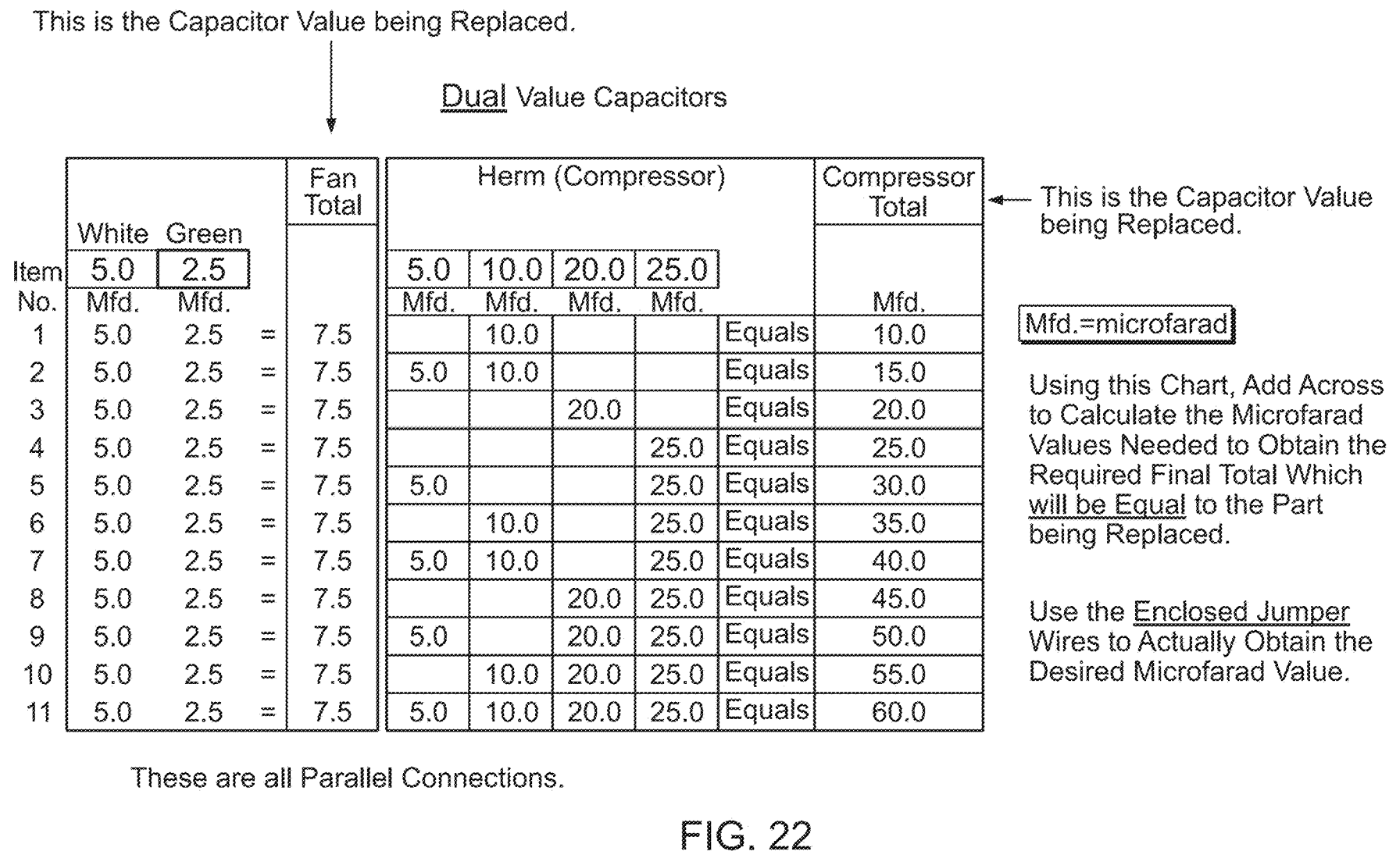

This is the Capacitor Value being Replaced.

Dual Value Capacitors

This is the Capacitor Value being Replaced.

Mfd.=microfarad

Using this Chart, Add Across to Calculate the Microfarad Values Needed to Obtain the Required Final Total Which will be Equal to the Part being Replaced.

Use the Enclosed Jumper Wires to Actually Obtain the Desired Microfarad Value.

| Item No. | White 5.0 Mfd. | Green 2.5 Mfd. | | Fan Total | Herm (Compressor) 5.0 Mfd. | 10.0 Mfd. | 20.0 Mfd. | 25.0 Mfd. | | Compressor Total Mfd. |
|---|---|---|---|---|---|---|---|---|---|---|
| 1 | 5.0 | 2.5 | = | 7.5 | | 10.0 | | | Equals | 10.0 |
| 2 | 5.0 | 2.5 | = | 7.5 | 5.0 | 10.0 | | | Equals | 15.0 |
| 3 | 5.0 | 2.5 | = | 7.5 | | | 20.0 | | Equals | 20.0 |
| 4 | 5.0 | 2.5 | = | 7.5 | | | | 25.0 | Equals | 25.0 |
| 5 | 5.0 | 2.5 | = | 7.5 | 5.0 | | | 25.0 | Equals | 30.0 |
| 6 | 5.0 | 2.5 | = | 7.5 | | 10.0 | | 25.0 | Equals | 35.0 |
| 7 | 5.0 | 2.5 | = | 7.5 | 5.0 | 10.0 | | 25.0 | Equals | 40.0 |
| 8 | 5.0 | 2.5 | = | 7.5 | | | 20.0 | 25.0 | Equals | 45.0 |
| 9 | 5.0 | 2.5 | = | 7.5 | 5.0 | | 20.0 | 25.0 | Equals | 50.0 |
| 10 | 5.0 | 2.5 | = | 7.5 | | 10.0 | 20.0 | 25.0 | Equals | 55.0 |
| 11 | 5.0 | 2.5 | = | 7.5 | 5.0 | 10.0 | 20.0 | 25.0 | Equals | 60.0 |

These are all Parallel Connections.

FIG. 22

This is the Capacitor Value being Replaced. →

→ This is the Capacitor Value being Replaced.

Mfd=microfarad

Dual Value Capacitors

| Item No. | Fan Total Red 10.0 Mfd. | Herm (Compressor) Green 2.5 Mfd. | White 5.0 Mfd. | White 5.0 Mfd. | Yellow 20.0 Mfd. | Blue 25.0 Mfd. | | Compressor Total Mfd. |
|---|---|---|---|---|---|---|---|---|
| 1 | 10.0 | | 5.0 | 5.0 | | | Equals | 10.0 |
| 2 | 10.0 | 2.5 | 5.0 | 5.0 | | | Equals | 12.5 |
| 3 | 10.0 | | | | 20.0 | | Equals | 20.0 |
| 4 | 10.0 | 2.5 | | | 20.0 | | Equals | 22.5 |
| 5 | 10.0 | | | | | 25.0 | Equals | 25.0 |
| 6 | 10.0 | 2.5 | | | | 25.0 | Equals | 27.5 |
| 7 | 10.0 | | 5.0 | | | 25.0 | Equals | 30.0 |
| 8 | 10.0 | 2.5 | 5.0 | | | 25.0 | Equals | 32.5 |
| 9 | 10.0 | | 5.0 | 5.0 | | 25.0 | Equals | 35.0 |
| 10 | 10.0 | 2.5 | 5.0 | 5.0 | | 25.0 | Equals | 37.5 |
| 11 | 10.0 | | | | 20.0 | 25.0 | Equals | 45.0 |
| 12 | 10.0 | 2.5 | | | 20.0 | 25.0 | Equals | 47.5 |
| 13 | 10.0 | | 5.0 | | 20.0 | 25.0 | Equals | 50.0 |
| 14 | 10.0 | 2.5 | 5.0 | | 20.0 | 25.0 | Equals | 52.5 |
| 15 | 10.0 | | 5.0 | 5.0 | 20.0 | 25.0 | Equals | 55.0 |
| 16 | 10.0 | 2.5 | 5.0 | 5.0 | 20.0 | 25.0 | Equals | 57.5 |

These are all Parallel Connections.

CAPACITOR WITH MULTIPLE ELEMENTS FOR MULTIPLE REPLACEMENT APPLICATIONS

CLAIM OF PRIORITY

This application is a continuation of and claims priority under 35 U.S.C. 120 to U.S. application Ser. No. 16/742,557, filed Jan. 14, 2020, which is a continuation-in-part of and claims priority under 35 U.S.C. § 120 to U.S. application Ser. No. 15/973,876, filed May 8, 2018, now U.S. Pat. No. 11,183,338, which claims the benefit of priority under 35 U.S.C. § 119(e) to U.S. Provisional Application Ser. No. 62/505,483, filed on May 12, 2017. U.S. application Ser. No. 15/973,976 also claims the benefit of priority under 35 U.S.C. 119(e) to U.S. Provisional Application Ser. No. 62/792,187, filed on Jan. 14, 2019, the entirety of each of which are hereby incorporated by reference.

FIELD OF THE INVENTION

The invention herein relates to a capacitor with multiple capacitor values selectively connectable to match the capacitance or capacitances of one or more capacitors being replaced.

BACKGROUND OF THE INVENTION

One common use for capacitors is in connection with the motors of air-conditioning systems. The systems often employ two capacitors, one used in association with a compressor motor and another smaller value capacitor for use in association with a fan motor. Air-conditioning systems of different BTU capacity, made by different manufacturers or being a different model all may use capacitors having different values. These capacitors have a finite life and sometimes fail, causing the system to become inoperative.

A serviceman making a service call usually will not know in advance whether a replacement capacitor is necessary to repair an air-conditioning system, or what value capacitor or capacitors might be needed to make the repair. One option is for the serviceman to carry a large number of capacitors of different values in the service truck, but it is difficult and expensive to maintain such an inventory, especially because there can be a random need for several capacitors of the same value on the same day. The other option is for the serviceman to return to the shop or visit a supplier to pick up a replacement capacitor of the required value. This is inefficient as the travel time to pick up parts greatly extends the overall time necessary to complete a repair. This is extremely detrimental if there is a backlog of inoperative air-conditioning systems on a hot day. This problem presents itself in connection with air-conditioning systems, but is also found in any situation where capacitors are used in association with motors and are replaced on service calls. Other typical examples are refrigeration and heating systems, pumps, and manufacturing systems utilizing compressors.

A desirable replacement capacitor would have the electrical and physical characteristics of the failed capacitor, i.e. it should provide the same capacitance value or values at the same or higher voltage rating, be connectable using the same leads and be mountable on the same brackets or other mounting provision. It should also have the same safety protection, as confirmed by independent tests performed by Underwriter Laboratories or others. Efforts have been made to provide such a capacitor in the past, but they have not resulted in a commercially acceptable capacitor adapted for replacing capacitors having a wide range of capacitance values.

My U.S. Pat. Nos. 3,921,041 and 4,028,595 disclose dual capacitor elements in the form of two concentric wound capacitor sections. My U.S. Pat. No. 4,263,638 also shows dual capacitors sections formed in a wound capacitive element, and my U.S. Pat. No. 4,352,145 shows a wound capacitor with dual elements, but suggests that multiple concentric capacitive elements may be provided, as does my U.S. Pat. Nos. 4,312,027 and 5,313,360. None of these patents show a capacitor having electrical and physical characteristics necessary to replace any one of the variety of failed capacitors that might be encountered on a service call.

An effort to provide a capacitor with multiple, selectable capacitance values is described in my U.S. Pat. No. 4,558,394. Three capacitance sections are provided in a wound capacitor element that is encapsulated in a plastic insulating material. An external terminal lug is connected with one of capacitor's sections and a second external terminal lug is provided with a common connection to all three capacitor sections. Pre-wired fixed jumper leads each connect the three capacitive sections in parallel, and the pre-wired fixed jumper leads have a portion exposed above the plastic encapsulation. This permits one or two jumper leads to be severed to remove one or two of the capacitor sections from the parallel configuration, and thereby to adjust the effective capacitance value across the terminal lugs. The '394 patent suggests that further combinations could be made with different connections, but does not provide any suitable means for doing so.

Another attempt to provide a capacitor wherein the capacitance may be selected on a service call is described in my U.S. Pat. No. 5,138,519. This capacitor has two capacitor sections connected in parallel, and has two external terminals for connecting the capacitor into a circuit. One of the terminals is rotatable, and one of the capacitor sections is connected to the rotatable terminal by a wire which may be broken by rotation of the terminal. This provides for selectively removing that capacitor section and thereby reducing the capacitance of the unit to the value of the remaining capacitor. This capacitor provides a choice of only two capacitance values in a fluid-filled case with a cover incorporating a pressure interrupter system.

In another effort to provide a universal adjustable capacitor for AC applications, American Radionic Co., Inc. produced a capacitor having five concentric capacitor sections in a cylindrical wound capacitor element. A common lead was provided from one end of the capacitor sections, and individual wire leads were provided from the other ends of the respective capacitor sections. The wound capacitor element was encapsulated in a plastic insulating material with the wire leads extending outwardly from the encapsulating material. Blade connectors were mounted at the ends of the wire leads, and sliding rubber boots were provided to expose the terminals for making connections and for shielding the terminals after connections were made. Various capacitance values could be selected by connecting various ones of the capacitor sections in parallel relationship, in series relationship, or in combinations of parallel and series relationships. In a later version, blade terminals were mounted on the encapsulating material. These capacitors did not meet the needs of servicemen. The connections were difficult to accomplish and the encapsulated structure did not provide pressure interrupter protection in case of capacitor failure, wherein the capacitors did not meet industry safety standards and did not achieve commercial acceptance or success.

Thus, although the desirability of providing a serviceman with a capacitor that is adapted to replace failed capacitors of a variety of values has been recognized for a considerable period of time, a capacitor that meets the serviceman's needs in this regard has not heretofore been achieved. This is a continuing need and a solution would be a considerable advance in the art.

SUMMARY OF THE INVENTION

It is a principal object of the invention herein to provide a capacitor that is connectable with selectable capacitance values.

It is another object of the invention herein to provide a capacitor incorporating multiple capacitance values that may be connected in the field to replace the capacitance value or values of a failed capacitor.

It is a further object of the invention herein to provide a capacitor having the objectives set forth above and which operates to disconnect itself from an electrical circuit upon a pressure-event failure.

It is also an object of the invention herein to incorporate multiple capacitance values in a single replacement capacitor that is adapted for connecting selected ones of the multiple capacitance values into a circuit.

Yet another object of the invention herein to provide a capacitor having one or more of the foregoing objectives and which provides for safely making and maintaining connections thereto.

It is a further object of the invention herein to increase the flexibility of replacing failed capacitors with capacitors incorporating multiple capacitance values by utilizing a range of tolerances in selecting the multiple capacitance values provided.

It is another principal object of the invention herein to provide a capacitor for replacing any one of a plurality of failed capacitors having different capacitance values and to meet or exceed the ratings and safety features of the failed capacitor.

In carrying out the invention herein, a replacement capacitor is provided having a plurality of selectable capacitance values. A capacitive element has a plurality of capacitor sections, each having a capacitance value. Each capacitor section has a section terminal and the capacitor sections are connected at a capacitive element common terminal. The capacitive element is received in a case together with an insulating fluid at least partially and preferably substantially surrounding the capacitive element. The case is provided with a pressure interrupter cover assembly, including a cover having a common cover terminal and a plurality of section cover terminals thereon. The section terminals of the capacitive element are respectively connected to the section cover terminals and the common terminal of the capacitive element is connected to the common cover terminal, with the pressure interrupter cover assembly adapted to break one or more connections as required to disconnect the capacitive element from an electrical circuit in the event that the capacitive element has a catastrophic pressure-event failure. The replacement capacitor is connected into an electrical circuit to replace a failed capacitor by connections to selected ones of the common cover terminal and section cover terminals, the capacitor sections and connections being selected to provide one or more capacitance values corresponding to the capacitor being replaced. Such connections may include connecting capacitor sections in parallel, connecting capacitor sections in series, connecting capacitor sections in combinations of parallel and series, and connecting one or more capacitor sections separately to provide two or more independent capacitance values.

In one preferred aspect of the invention, the capacitive element is a wound cylindrical capacitive element having a plurality of concentric wound capacitor sections, each having a capacitance value. The number of capacitor sections is preferably six, but may be four or five, or may be greater than six. The capacitor section with the largest capacitance value is one of the outer three sections of the capacitive element. The capacitor sections are separated by insulation barriers and a metallic spray is applied to the ends of the capacitor sections. The insulation barriers withstand heat associated with connecting wire conductors to the capacitor sections.

In another preferred aspect of the invention, the capacitive element is two or more wound cylindrical capacitive elements. There may be one wound cylindrical capacitive element for each capacitor section and capacitance value, and there may be four, five or six such wound cylindrical capacitive elements. Further, at least one of the two or more wound cylindrical capacitive elements may provide two or more capacitor sections. In a specific aspect, there are two wound cylindrical capacitive elements each providing three capacitor sections. The capacitor sections, however provided, are connected at a common terminal.

The case is preferably cylindrical, having a cylindrical side wall, a bottom wall and an open top, to accommodate the one wound cylindrical capacitive element or to accommodate the plurality of wound capacitive elements providing the capacitor sections.

Also, according to preferred aspects of the invention, the pressure interrupter cover assembly includes a deformable circular cover having a peripheral edge sealingly secured to the upper end of the case. The common cover terminal and section cover terminals are mounted to the cover at spaced apart locations thereon, and have terminal posts extending downwardly from the cover to a distal end. A rigid disconnect plate is supported under the cover and defines openings therethrough accommodating the terminal posts and exposing the distal ends thereof. Conductors connect the capacitor section terminals and the common element terminal to the distal ends of the respective terminal posts of the section cover terminals and common cover terminal. The conductor connections at the distal ends of the terminal posts are broken upon outward deformation of the cover. In more specific aspects, the conductors connecting the capacitor sections to the distal ends of the section cover terminal posts are insulated wires, with the ends soldered to foil tabs that are welded or soldered to the distal ends of the terminal posts adjacent the disconnect plate.

Also, according to aspects of the invention herein, the common cover terminal is positioned generally centrally on the cover, and the section cover terminals are positioned at spaced apart locations surrounding the common cover terminal. The section cover terminals include at least one blade connector, and preferably two or more blade connectors extending outwardly from the cover for receiving mating connectors for connecting selected ones of the capacitor sections into an electrical circuit. The common cover terminal preferably has four blade connectors.

Additional aspects of the invention include providing insulators for the section and common cover terminals, the insulators including cylindrical cups upstanding from the cover, with the cylindrical cup of at least the common cover terminal extending to or above the blades thereof. According to a preferred aspect of the invention, the insulators include a cover insulation barrier having a barrier cup upstanding from the cover and substantially surrounding a central common cover terminal and further having barrier fins radially extending from the barrier cup and deployed between adjacent section cover terminals.

The invention herein is carried out by connecting one or more capacitor sections into an electrical circuit, by attaching leads to the cover terminals. This includes connecting capacitor sections in parallel, connecting capacitor sections in series, connecting individual capacitor sections, or connecting capacitor sections in combinations of parallel and series, as required to match the capacitance value or values of the failed capacitor being replaced. The capacitor sections can be connected to replace multiple capacitor values, as required, to substitute the capacitor for the capacitor that has failed.

In another aspect of the invention, the capacitance values of the capacitor sections are varied within a tolerance range from a stated value, such that one capacitor section may be utilized effectively to replace one of two values, either individually or in combinations of capacitor sections.

Other and more specific objects and features of the invention herein will, in part, be understood by those skilled in the art and will, in part, appear in the following description of the preferred embodiments, and claims, taken together with the drawings.

BRIEF DESCRIPTION OF DRAWINGS

FIG. 5 is a top view of the capacitive element of the capacitor of FIG. 1, including wire conductors connected to capacitor sections thereof;

FIG. 6 is an enlarged fragmentary plan view of a distal end of a wire conductor of FIGS. 4 and 5, connected to a foil tab;

FIG. 7 is an enlarged fragmentary side view of a distal end of a wire conductor of FIGS. 4 and 5, connected to a foil tab;

FIG. 19 is a chart showing the single value capacitance values that may be provided by the capacitor of FIG. 1;

FIG. 20 is a chart showing dual value capacitances that may be provided by the capacitor of FIG. 1;

FIG. 21 is another chart showing dual value capacitances that may be provided by the capacitor of FIG. 1;

FIG. 22 is another chart showing dual value capacitances that may be provided by the capacitor of FIG. 1;

FIG. 23 is another chart showing dual value capacitances that may be provided by the capacitor of FIG. 1;

DETAILED DESCRIPTION OF THE INVENTION

Figure 1:
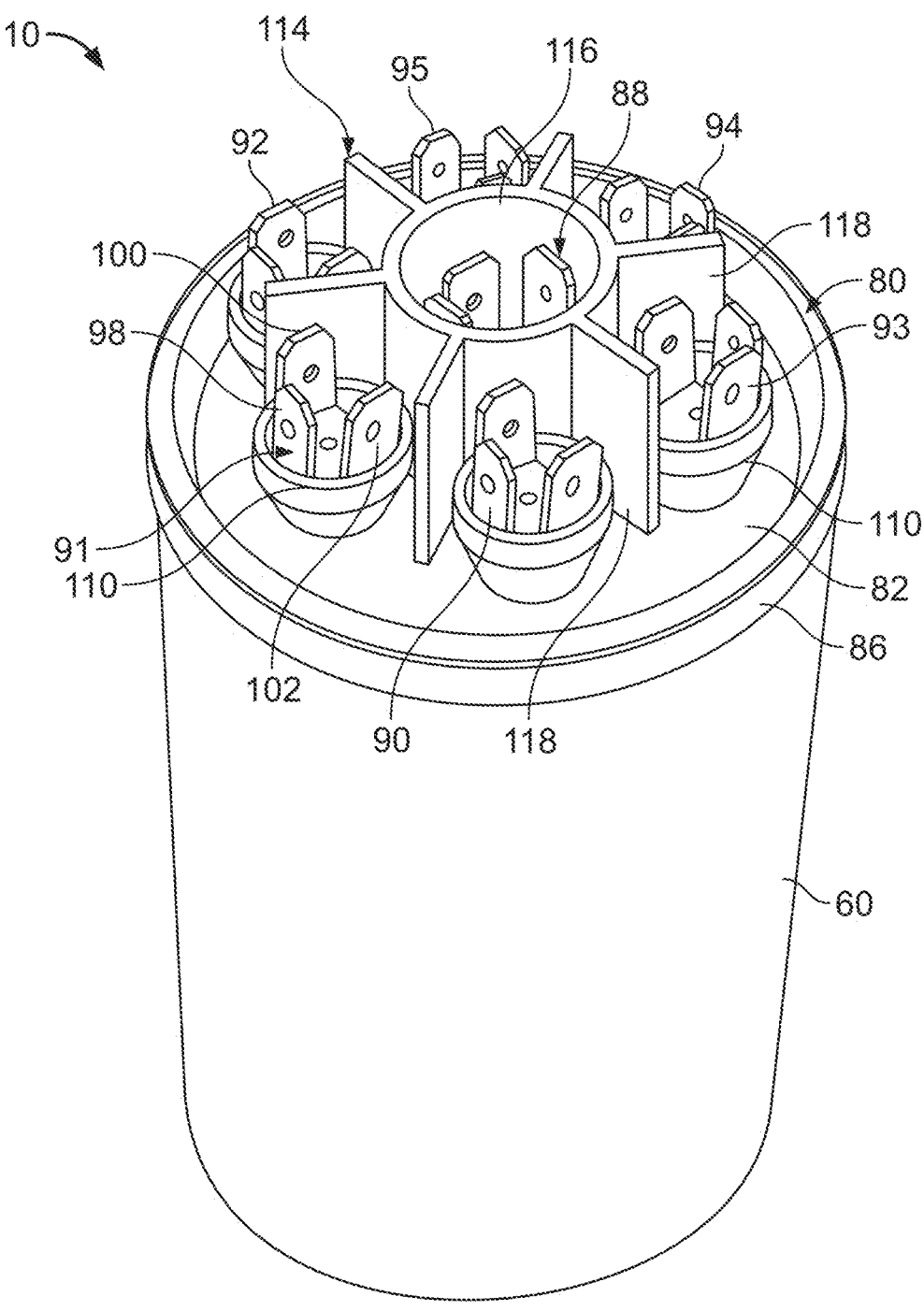
FIG. 1 is a perspective view of a capacitor according to the invention herein.
Figure 2:
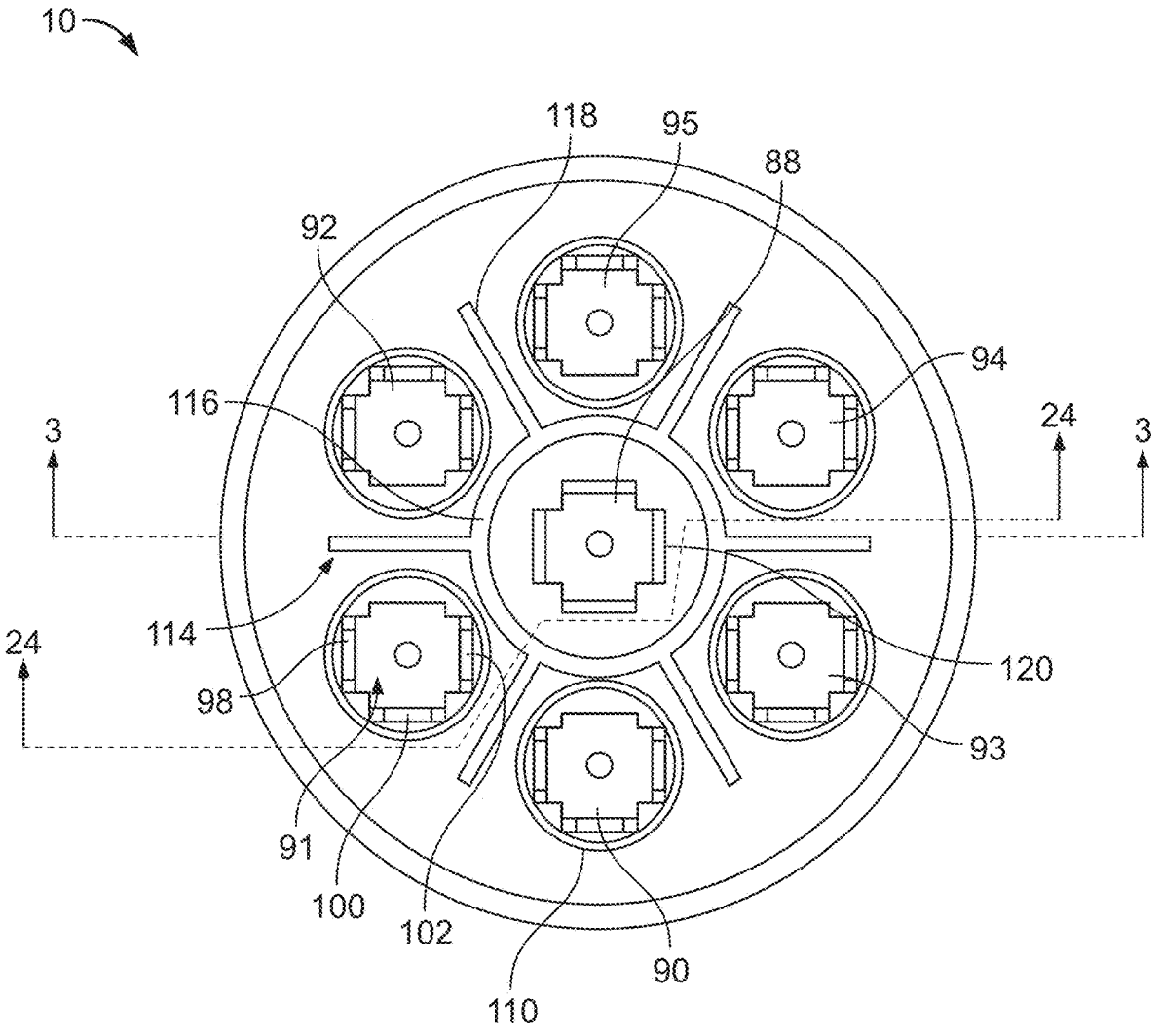
FIG. 2 is a top view of the capacitor of FIG. 1.
Figure 3:
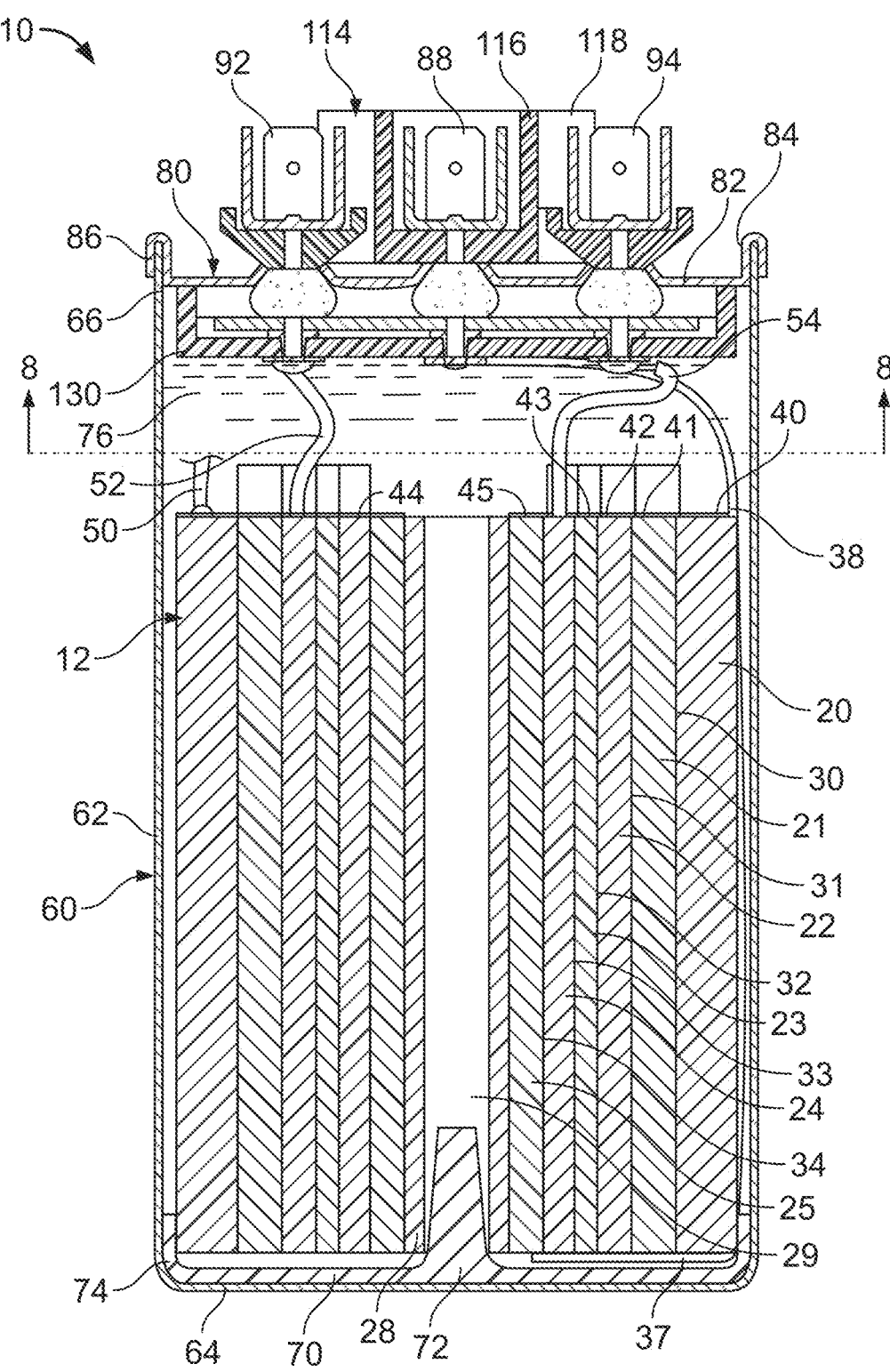
FIG. 3 is a sectional view of the capacitor of FIG. 1, taken along the lines 3-3 of FIG. 2.

A capacitor 10 is shown in FIGS. 1-3, as well as in other Figures to be described below. The capacitor 10 is adapted to replace any one of a large number of capacitors. Therefore, a serviceman may carry a capacitor 10 on a service call and, upon encountering a failed capacitor, the serviceman can utilize the capacitor 10 to replace the failed capacitor with the capacitor 10 being connected to provide the same capacitance value or values of the failed capacitor.

Figure 4:
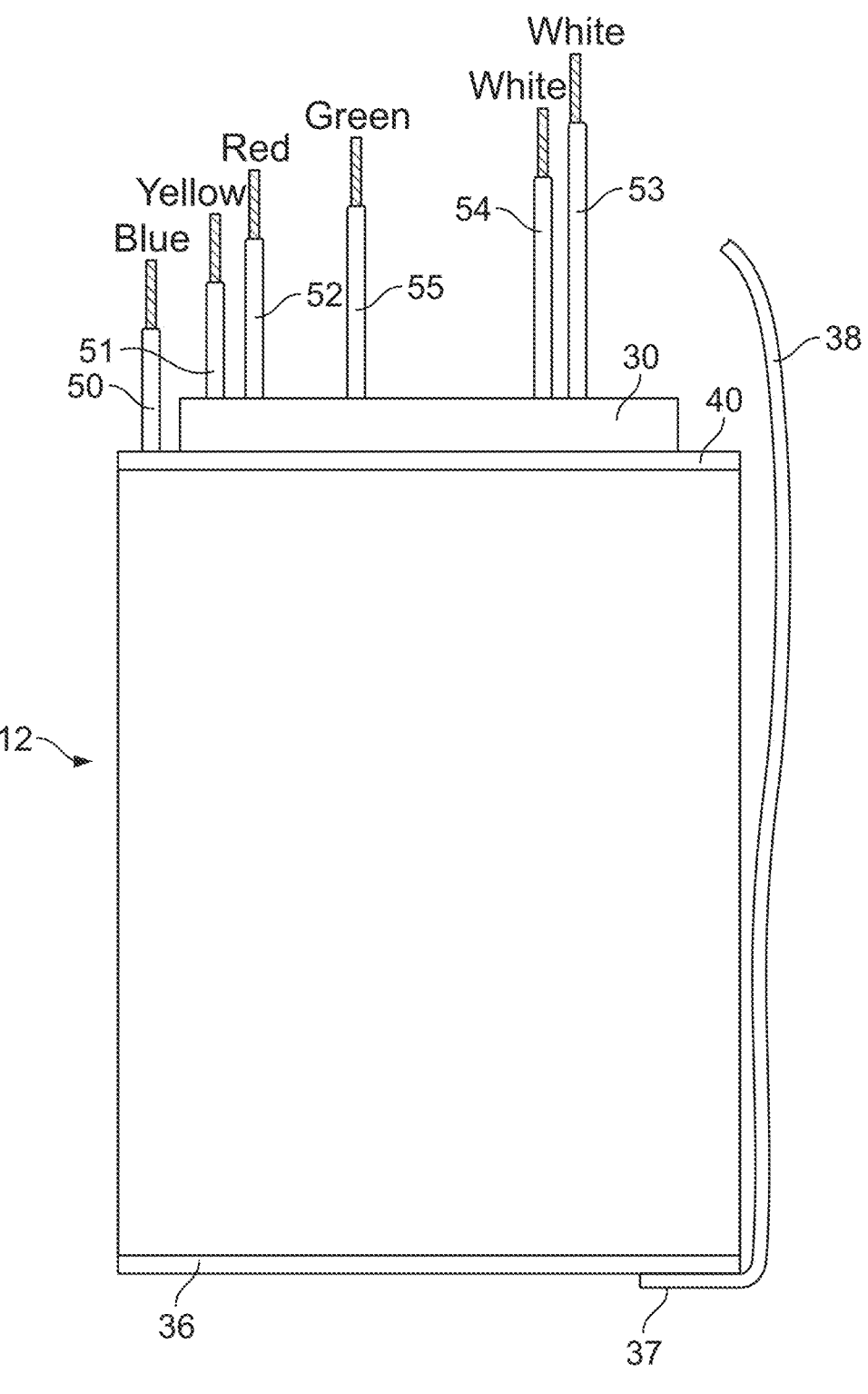
FIG. 4 is a side elevation view of the capacitive element of the capacitor of FIG. 1, including wire conductors connected to the capacitor sections thereof.
Figure 8:
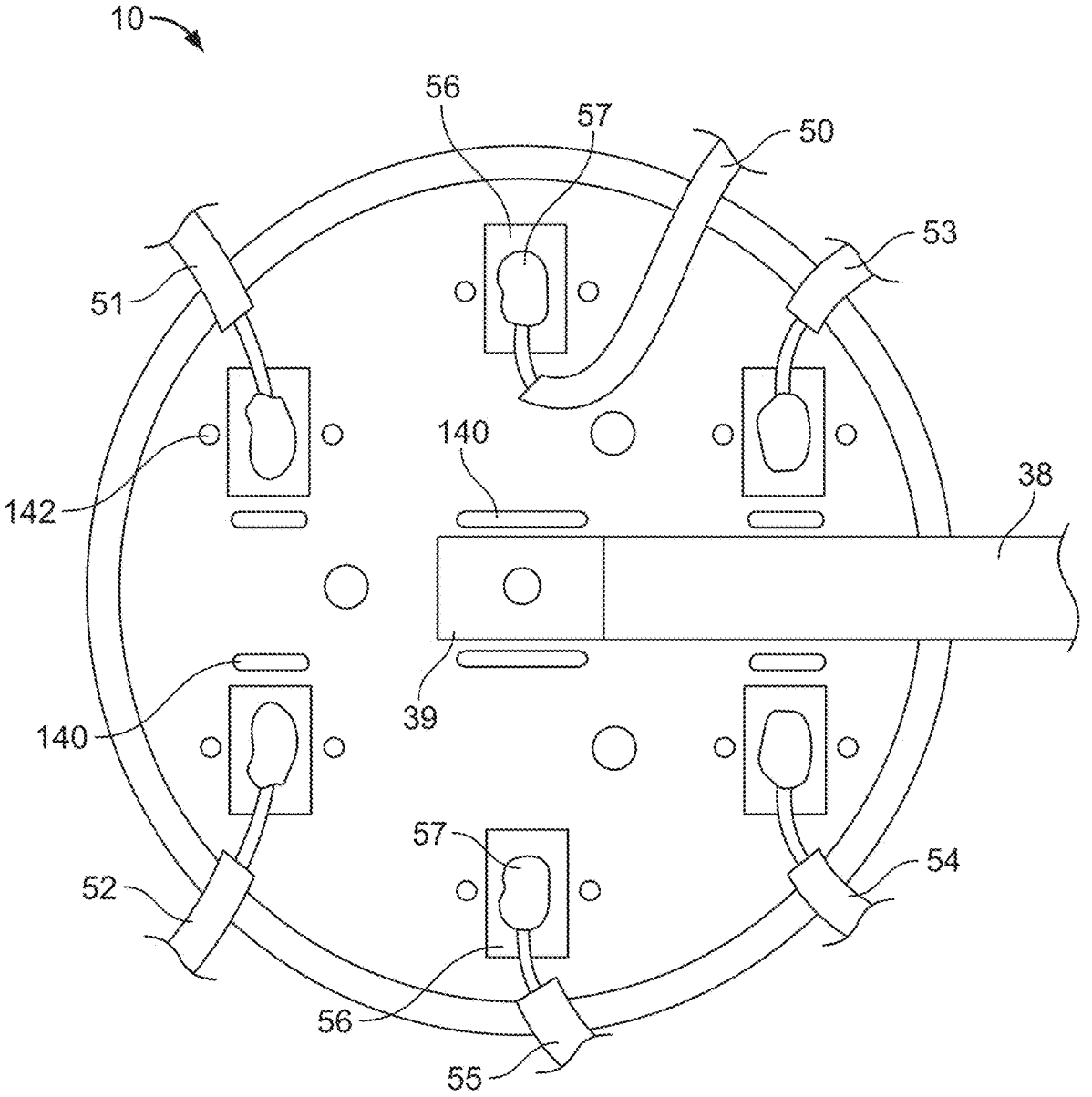
FIG. 8 is a sectional view of the capacitor of FIG. 1 taken along the lines 8-8 of FIG. 3, and showing a pressure interrupter cover assembly of the capacitor of FIG. 1.

The capacitor 10 has a capacitive element 12 having a plurality of capacitor sections, each having a capacitance value. The capacitive element 12 is also shown in FIGS. 4 and 5. In the preferred embodiment described herein, the capacitive element 12 has six capacitor sections 20-25. The capacitive element 12 is a wound cylindrical element manufactured by extension of the techniques described in my prior U.S. Pat. Nos. 3,921,041, 4,028,595, 4,352,145 and 5,313,360, incorporated herein by reference. Those patents relate to capacitive elements having two capacitor sections rather than a larger plurality of capacitor sections, such as the six capacitor sections 20-25 of the capacitive element 12. Accordingly, the capacitive element 12 has a central spool or mandrel 28, which has a central opening 29. First and second dielectric films, each having a metalized layer on one side thereof, are wound in cylindrical form on the mandrel 28 with the non-metalized side of one film being in contact with the metalized side of the other. Selected portions of one or both of the metalized layers are removed in order to provide a multiple section capacitive element. Element insulation barriers are inserted into the winding to separate the capacitor sections, the element insulation barriers also assuming a cylindrical configuration. Five element insulation barriers 30-34 are provided to separate the six capacitor sections 20-25, with element insulation barrier 30 separating capacitor sections 20 and 21, element insulation barrier 31 separating capacitor sections 21 and 22, element insulation barrier 32 separating capacitor sections 22 and 23, element insulation barrier 33 separating capacitor sections 23 and 24, and element insulation barrier 34 separating capacitor sections 24 and 25.

The element insulation barriers are insulating polymer sheet material, which in the capacitive element 12 is polypropylene having a thickness of 0.005 inches, wound into the capacitive element 12. Thickness of 0.0025 to 0.007 may be used. Other materials may also be used. The barriers each have about 2¾-4 wraps of the polypropylene sheet material, wherein the element insulation barriers have a thickness of about 0.013 to 0.020 inches. The barriers 30-34 are thicker than used before in capacitors with fewer capacitor sections. The important characteristic of the barriers 30-34 is that they are able to withstand heat from adjacent soldering without losing integrity of electrical insulation, such that adjacent sections can become bridged.

As is known in the art, the metalized films each have one unmetalized marginal edge, such that the metalized marginal edge of one film is exposed at one end of the wound capacitive element 12 and the metalized marginal edge of the other film is exposed at the other end of the capacitive element 12. With reference to FIGS. 3 and 5, at the lower end of the capacitance element 12, the barriers 30-34 do not extend from the film, and an element common terminal 36 is established contacting the exposed metalized marginal edges of one metalized film of all the capacitor sections 20-25. The element common terminal 36 is preferably a zinc spray applied onto the end of the capacitive element 12.

At the top end of the capacitive element 12 as depicted in FIGS. 3 and 5, the element insulation barriers 30-34 extend above the wound metalized film. An individual capacitor element section terminal is provided for each of the capacitive sections 20-25, also by applying a zinc or other metallic spray onto the end of the capacitive element 12 with the zinc being deployed on each of the capacitor sections 20-25 between and adjacent the element insulation barriers 30-34. The element section terminals are identified by numerals 40-45. Element section terminal 40 of capacitor section 20 extends from the outer-most element insulation barrier 30 to the outer surface of the capacitive element 12, and the element section terminal 45 of capacitor section 25 extends from the inner-most element insulation barrier 34 to the central mandrel 28. Element section terminals 41-44 are respectively deployed on the capacitor sections 21-24.

Conductors preferably in the form of six insulated wires 50-55 each have one of their ends respectively soldered to the element section terminals 40-45, as best seen in FIG. 5.

The thickness of the polypropylene barriers 30-34 resists any burn-through as a result of the soldering to connect wires 50-55 to the terminals 40-45.

The insulation of the wires 50-55 is color coded to facilitate identifying which wire is connected to which capacitor section. Wire 50 connected to element section terminal 40 of capacitor section 20 has blue insulation, wire 51 connected to element section terminal 41 of capacitor section 21 has yellow insulation, wire 52 connected to element section terminal 42 of capacitor section 22 has red insulation, wire 53 connected to element section terminal 43 of capacitor section 23 has white insulation, wire 54 connection to element section terminal 44 of capacitor section 24 has white insulation, and wire 55 connected to element section terminal 45 of capacitor section 25 has green insulation. These colors are indicated on FIG. 4.

The capacitive element 12 is further provided with foil strip conductor 38, having one end attached to the element common terminal 36 at 37. The foil strip conductor 38 is coated with insulation, except for the point of attachment 37 and the distal end 39 thereof. The conductor 50 connected to the outer capacitor element section 20 and its terminal 30 may also be a foil strip conductor. If desired, foil or wire conductors may be utilized for all connections.

In the capacitive element 12 used in the capacitor 10, the capacitor section 20 has a value of 25.0 microfarads and the capacitor section 21 has a capacitance of 20.0 microfarads. The capacitor section 22 has a capacitance of 10.0 microfarads. The capacitor section 23 has a capacitance of 5.5 microfarads, but is identified as having a capacitance of 5.0 microfarads for purposes further discussed below. The capacitor section 24 has a capacitance of 4.5 microfarads but is labeled as having a capacitance of 5 microfarads, again for purposes described below. The capacitor section 25 has a capacitance of 2.8 microfarads. The capacitor section 20 with the largest capacitance value also has the most metallic film, and is therefore advantageously located as the outer section or at least one of the three outer sections of the capacitive element 12.

The capacitor 10 also has a case 60, best seen in FIGS. 1-3, having a cylindrical side wall 62, a bottom wall 64, and an open top 66 of side wall 62. The case 60 is formed of aluminum and the cylindrical side wall 62 has an outside diameter of 2.50 inches. This is a very common diameter for capacitors of this type, wherein the capacitor 10 will be readily received in the mounting space and with the mounting hardware provided for the capacitor being replaced. Other diameters may, however, be used, and the case may also be plastic or of other suitable material.

The capacitive element 12 with the wires 50-55 and the foil strip 38 are received in the case 60 with the element common terminal 36 adjacent the bottom wall 64 of the case. An insulating bottom cup 70 is preferably provided for insulating the capacitive element 12 from the bottom wall 64, the bottom cup 70 having a center post 72 that is received in the center opening 29 of the mandrel 28, and an up-turned skirt 74 that embraces the lower side wall of the cylindrical capacitive element 12 and spaces it from the side wall 62 of the case 60.

An insulating fluid 76 is provided within the case 60, at least partly and preferably substantially surrounding the capacitive element 12. The fluid 76 may be the fluid described in my U.S. Pat. No. 6,014,308, incorporated herein by reference, or one of the other insulating fluids used in the trade, such as polybutene.

Figure 9:
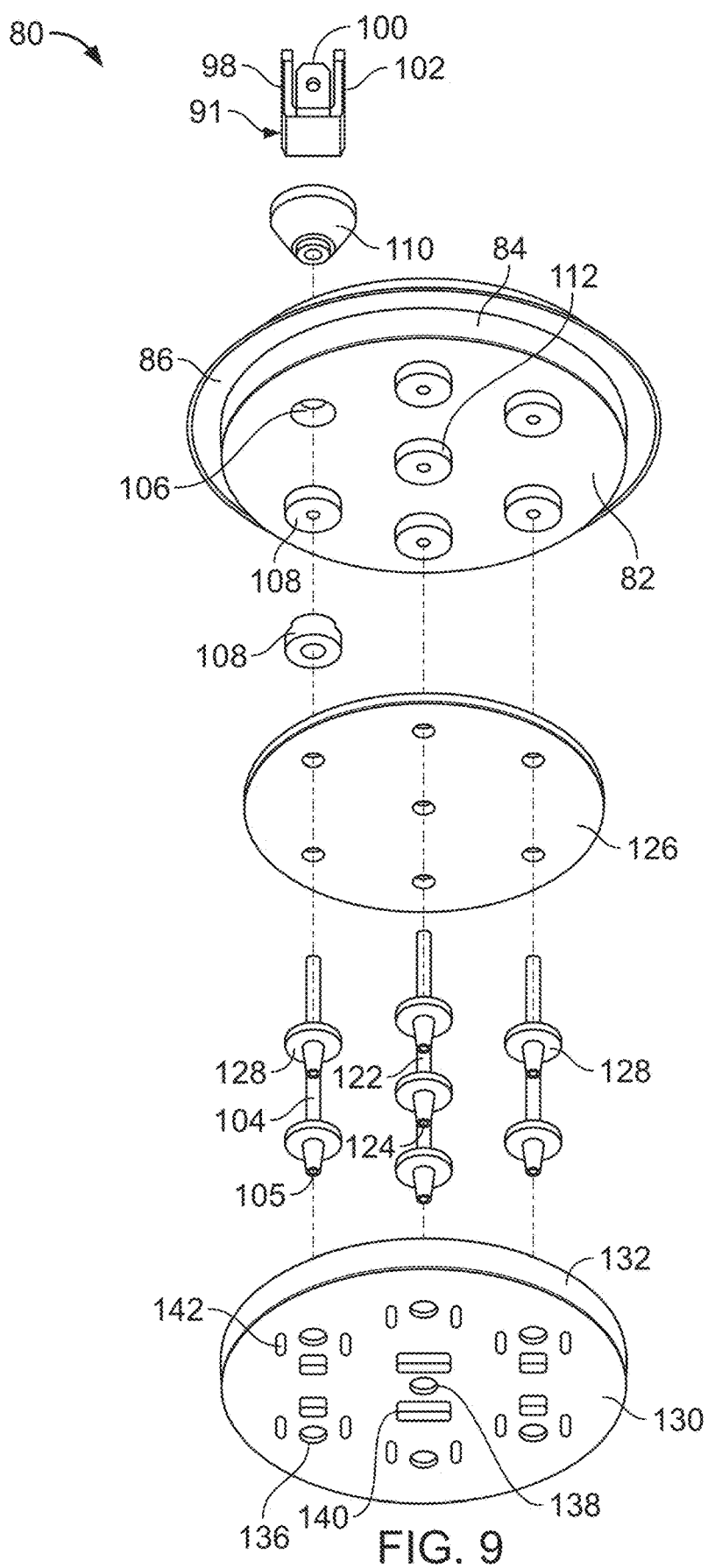
FIG. 9 is an exploded perspective view of the pressure interrupter cover assembly of the capacitor of FIG. 1.
Figure 10:
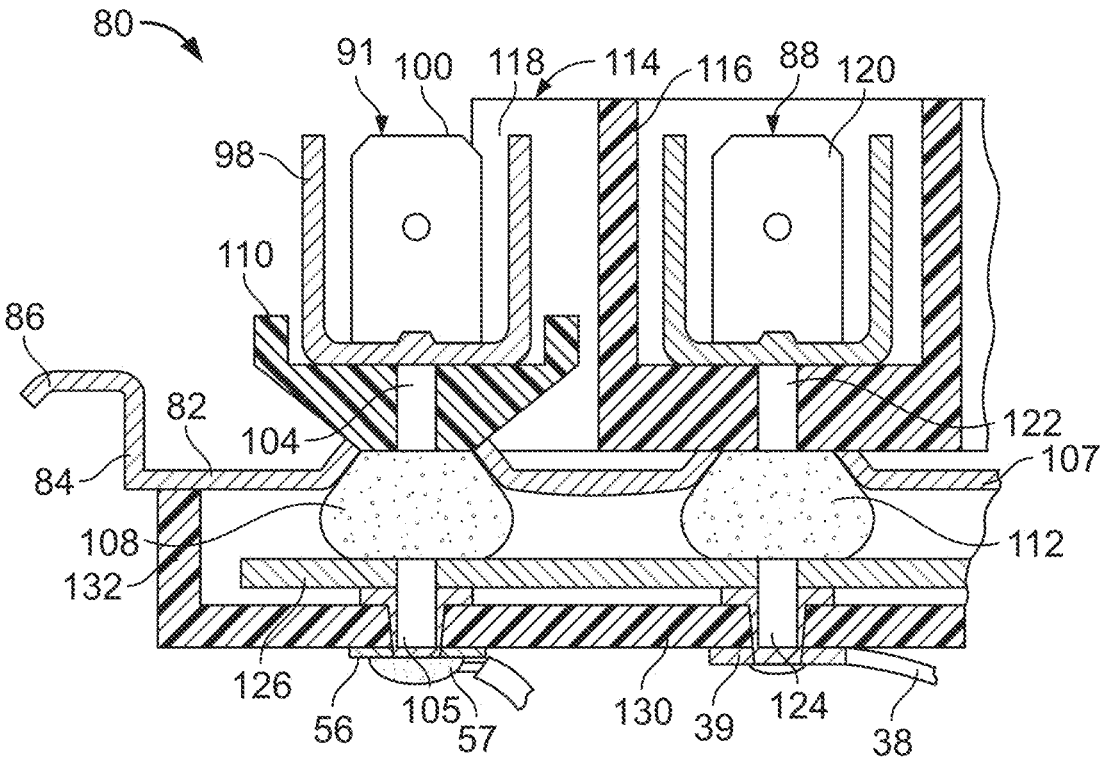
FIG. 10 is an enlarged fragmentary view of the pressure interrupter cover assembly of the capacitor of FIG. 1.

The capacitor 10 also has a pressure interrupter cover assembly 80 best seen in FIGS. 1-3, 8-10 and 24. The cover assembly 80 includes a deformable circular cover 82 having an upstanding cylindrical skirt 84 and a peripheral rim 86 as best seen in FIGS. 9 and 10. The skirt 84 fits into the open top 66 cylindrical side wall 62 of case 60, and the peripheral rim 86 is crimped to the open top 66 of the case 60 to seal the interior of the capacitor 10 and the fluid 76 contained therein, as shown in FIGS. 1 and 3.

The pressure interrupter cover assembly 80 includes seven cover terminals mounted on the deformable cover 82. A common cover terminal 88 is mounted generally centrally on the cover 82, and section cover terminals 90-95, each respectively corresponding to one of the capacitor sections 20-25, are mounted at spaced apart locations surrounding the common cover terminal 88. With particular reference to FIGS. 1, 2, 9 and 10, the section cover terminal 91 has three upstanding blades 98, 100 and 102 mounted on the upper end of a terminal post 104. Terminal post 104 has a distal end 105, opposite the blades 98, 100 and 102. The cover 82 has an opening 106 for accommodating the terminal post 104, and has a beveled lip 107 surrounding the opening. A shaped silicone insulator 108 fits snuggly under the cover in the beveled lip 107 and the terminal post 104 passes through the insulator 108. On the upper side of the cover, an insulator cup 110 also surrounds the post 104, and the insulator cup 110 sits atop the silicone insulator 108; thus, the terminal 91 and its terminal post 104 are well insulated from the cover 82. The other cover section terminals 92-95 are similarly mounted with an insulator cup and a silicone insulator.

The common cover terminal 88 has four blades 120, and a terminal post 122 that passes through a silicone insulator 112. The common cover terminal 88 mounts cover insulator barrier 114 that includes an elongated cylindrical center barrier cup 116 surrounding and extending above the blades 120 of the cover common terminal 88, and six barrier fins 118 that extend respectively radially outwardly from the elongated center barrier cup 116 such that they are deployed between adjacent section cover terminals 90-95. This provides additional protection against any arcing or bridging contact between adjacent section cover terminals or with the common cover terminal 88. Alternatively, the common cover terminal 88 may be provided with an insulator cup 116, preferably extending above blades 120 but with no separating barrier fins, although the barrier fins 118 are preferred. The terminal post 122 extends through an opening in the bottom of the base 117 of the insulating barrier cup 116, and through the silicone insulator 112, to a distal end 124.

The pressure interrupter cover assembly 80 has a fiberboard disc 126 through which the terminal posts 122, terminal post 104 and the terminal posts of the other section cover terminals extend. The disc 126 may be also fabricated of other suitable material, such as polymers. The terminal posts 104, 122, etc. are configured as rivets with rivet flanges 128 for assembly purposes. The terminal posts 104, 122, etc. are inserted through the disc 126, insulators 108, 112, insulator cups 110 and barrier cup 116, and the cover terminals 88, 90-95 are spot welded to the ends of the rivets opposite the rivet flanges 128. Thus, the rivet flanges 128 secure the cover terminals 88, 90-95 in the cover 82, together with the insulator barrier 114, insulator cups 110 and silicone insulators 108, 112. The fiberboard disc 126 facilitates this assembly, but may be omitted, if desired. The distal ends of the terminal posts are preferably exposed below the rivet flanges 128.

The cover assembly 80 has a disconnect plate 130, perhaps best seen in FIGS. 3, 9 and 10. The disconnect plate 130 is made of a rigid insulating material, such as a phenolic, is spaced below the cover 82 by a spacer 134 in the form of a skirt. The disconnect plate 130 is provided with openings accommodating the distal ends of the terminal posts, such as opening 136 accommodating the distal end 105 of terminal post 104 and opening 138 accommodating the distal end 124 of the terminal post 122. With particular reference to FIG. 9, the disconnect plate 130 may be provided with raised guides, such as linear guides 140 and dimple guides 142, generally adjacent the openings accommodating the distal ends of terminal posts. These guides are for positioning purposes as discussed below.

In prior capacitors having three or fewer capacitor sections, the conductors between the capacitor sections and the terminal posts were generally foil strips, such as the one used for the common element terminal 36 of the capacitive element 12 herein. The foil strips were positioned on a breaker plate over the distal ends of terminal posts, and were welded to the distal ends of the terminal posts. In capacitor 10, the distal end 39 of the foil strip 38 is connected to the distal end 124 of terminal post 122 by welding, as in prior capacitors.

The wires 50-55 are not well-configured for welding to the distal ends of the terminal posts of the cover section terminals. However, the wires 50-55 are desirable in place of foil strips because they are better accommodated in the case 60 and have good insulating properties, resist nicking and are readily available with colored insulations. In order to make the necessary connection of the wires 50-55 to their respective terminal posts, foil tabs 56 are welded to each of the distal ends of the terminal posts of the section cover terminals 90-95, and the guides 140, 142 are helpful in positioning the foil tabs 56 for the welding procedure. The attachment may be accomplished by welding the distal end of a foil strip to the terminal post, and then cutting the foil strip to leave the foil tab 56. Thereafter, and as best seen in FIGS. 6, 7 and 10, the conductor 58 of wire 50 is soldered to the tab 56, by solder 57. The insulation 59 of wire 50 has been stripped to expose the conductor 58. The other wires 51-55 are similarly connected to their respective cover section terminals. Alternatively, the foil tabs may be soldered to the wires and the tabs may then be welded to the terminal posts, if desired, or other conductive attachment may be employed.

Accordingly, each of the capacitor sections 20-25 is connected to a corresponding section cover terminal 90-95 by a respective one of color coded wires 50-55. The insulator cups 110 associated with each of the section cover terminals 90-95 are also color coded, using the same color scheme as used in the wires 50-55. This facilitates assembly, in that each capacitor section and its wire conductor are readily associated with the correct corresponding section cover terminal, so that the correct capacitor sections can be identified on the cover to make the desired connections for establishing a selected capacitance value.

The connections of the wires 50-55 and the foil 38 to the terminal posts are made prior to placing the capacitive element 12 in the case 60, adding the insulating fluid 76, and sealing the cover 82 of cover assembly 80 to the case 60. The case 60 may be labeled with the capacitance values of the capacitance sections 20-25 adjacent the cover terminals, such as on the side of case 60 near the cover 82 or on the cover 82.

The capacitor 10 may be used to replace a failed capacitor of any one of over two hundred different capacitance values, including both single and dual applications. Therefore, a serviceman is able to replace virtually any failed capacitor he may encounter as he makes service calls on equipment of various manufacturers, models, ages and the like.

As noted above, the capacitor 10 is expected to be used most widely in servicing air conditioning units. Air conditioning units typically have two capacitors; a capacitor for the compressor motor which may or may not be of relatively high capacitance value and a capacitor of relatively low capacitance value for a fan motor. The compressor motor capacitors typically have capacitances of from 20 to about 60 microfarads. The fan motor capacitors typically have capacitance values from about 2.5 to 12.5 microfarads, and sometimes as high as 15 microfarads, although values at the lower end of the range are most common.

Figure 11:
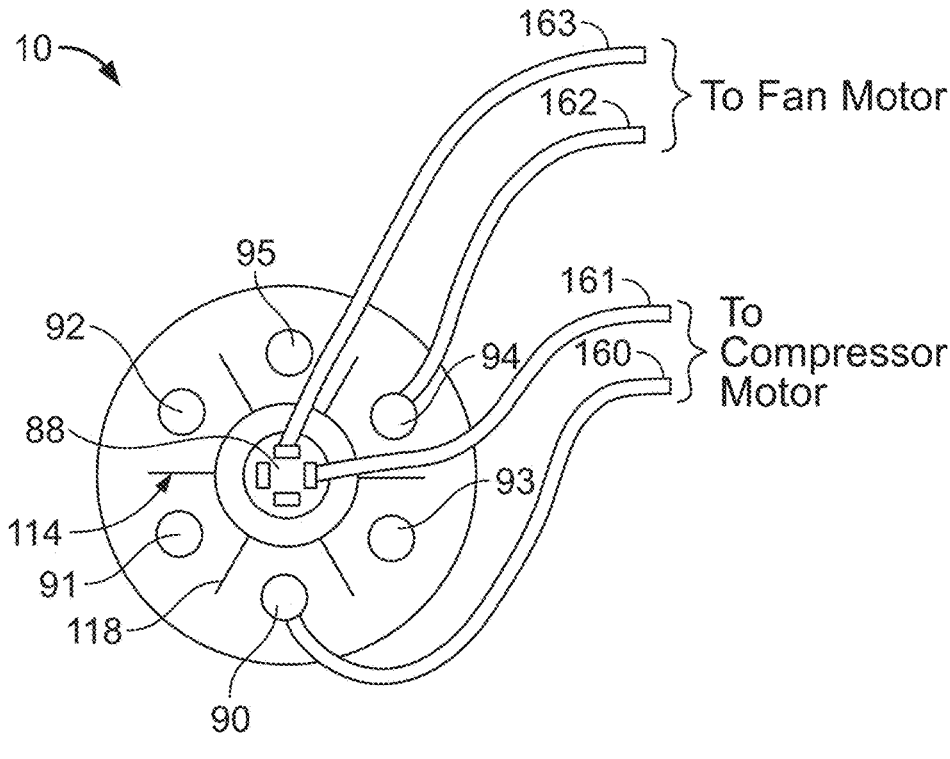
FIG. 11 is a top view of the capacitor of FIG. 1, shown with selected capacitor sections connected to a fan motor and a compressor motor.
Figure 12:
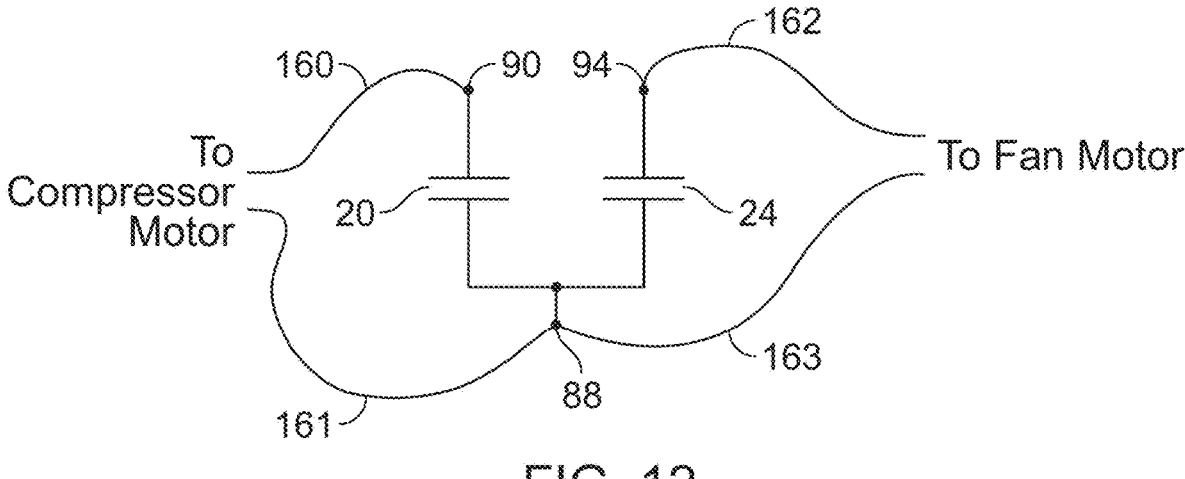
FIG. 12 is a schematic circuit diagram of the capacitor of FIG. 1 connected as shown in FIG. 11.

With reference to FIG. 11, capacitor 10 is connected to replace a compressor motor capacitor and a fan motor capacitor, where the compressor motor capacitor has a value of 25.0 microfarads and the fan motor capacitor has a value of 4.0 microfarads. The 25.0 microfarad replacement capacitance for the compressor motor is made by one of the compressor motor leads 160 being connected to one of the blades of the blue section cover terminal 90 of capacitor section 20, which has a capacitance value of 25.0 microfarads, and the other compressor motor lead 161 being connected to one of the blades 120 of common cover terminal 88. The lead 162 from the fan motor is connected to the white section cover terminal 94 of capacitor section 24, and the second lead 163 from the fan motor is also connected to the common cover terminal 88. As set forth above, the actual capacitance value of the capacitor section 24 that is connected to the section cover terminal 94 is 4.5 microfarads, and the instructions and/or labeling for the capacitor 10 indicate that the capacitor section 24 as represented at terminal 94 should be used for a 4.0 microfarad replacement. Preferred labeling for this purpose can be "5.0 (4.0) microfarads" or similar. The 4.5 microfarad capacitance value is within approximately 10% of the specified 4.0 microfarad value, and that is within acceptable tolerances for proper operation of the fan motor. Of course, the capacitor section 24 and terminal 94 may be connected to replace a 5.0 microfarad capacitance value as well, whereby the 4.5 microfarad actual capacitance value of capacitor section 24 gives added flexibility in replacing failed capacitors. Similarly, the 5.5 microfarad capacitor section 23 can be used for either 5.0 microfarad or 6.0 microfarad replacement, and the 2.8 microfarad capacitor section 25 can be used for a 3.0 microfarad replacement or for a 2.5 microfarad additive value. FIG. 12 schematically illustrates the connection of capacitor sections 20 and 24 to the compressor motor and fan motor shown in FIG. 11.

Figure 13:
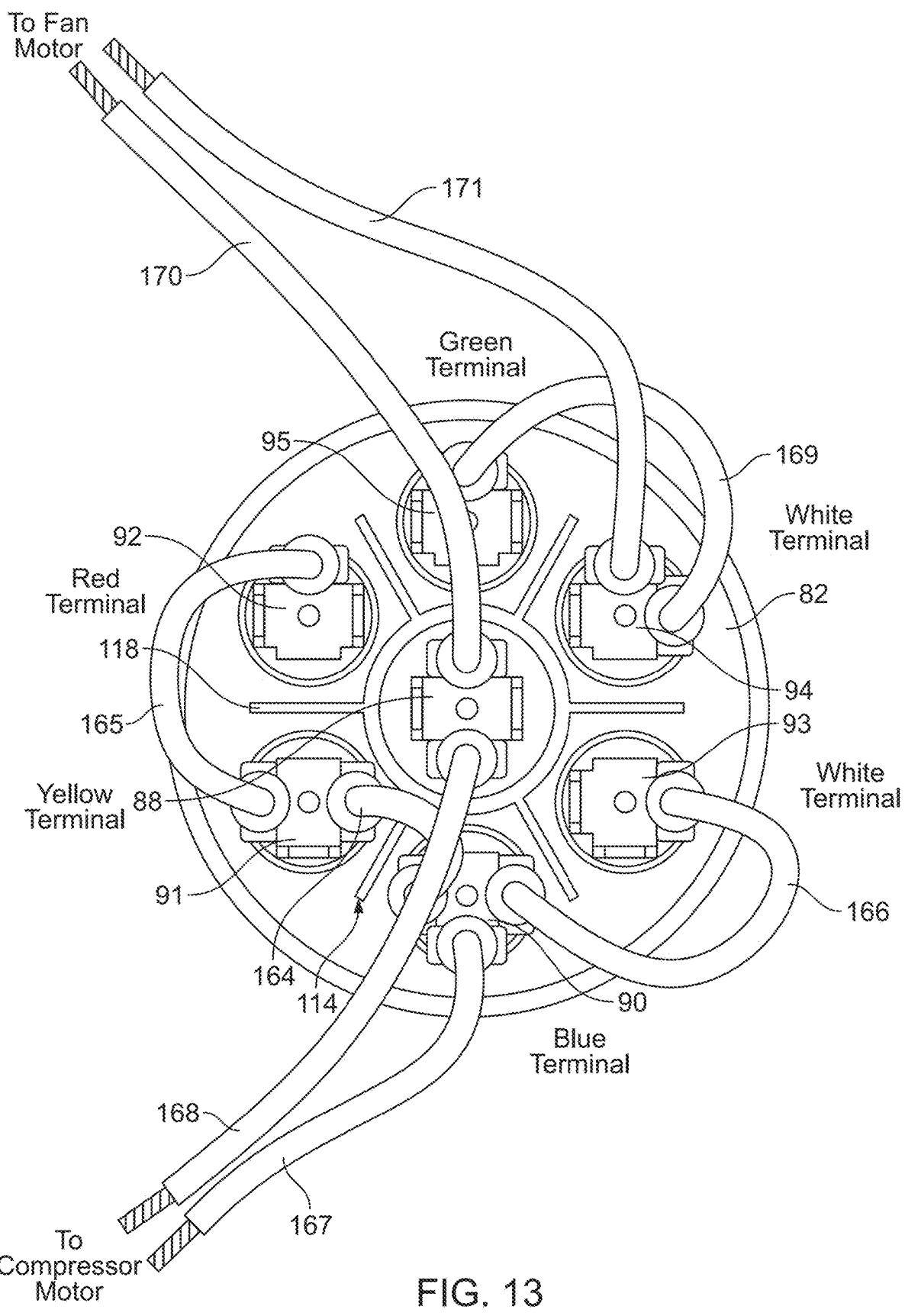
FIG. 13 is a top view of the capacitor of FIG. 1 with jumper wires connecting selected capacitor sections in parallel, and also shown connected in an electrical circuit to a fan motor and a compressor motor.

FIG. 13 illustrates another connection of the capacitor 10 for replacing a 60.0 microfarad compressor motor capacitor and a 7.5 microfarad fan motor capacitor. The formula for the total capacitance value for capacitors connected in parallel is additive namely: $C_t=C_1+C_2+C_3$ Therefore, with reference to FIG. 13, a 60.0 microfarad capacitance value for the compressor motor is achieved by connecting in parallel the section cover terminal 90 (capacitor section 20 at a value of 25.0 microfarads), section cover terminal 91 (capacitor section 21 at a value of 20.0 microfarads), section cover terminal 92 (capacitor section 22 at a value of 10.0 microfarads) and section cover terminal 93 (capacitor section 23 at a nominal value of 5.0 microfarads). The foregoing connections are made by means of jumpers 164, 165 and 166, which may be supplied with the capacitor 10. Lead 167 is connected from the section cover terminal 90 of the capacitor section 20 to the compressor motor, and lead 168 is connected from the common cover terminal 88 to the compressor motor. This has the effect of connecting the specified capacitor sections 20, 21, 22 and 23 in parallel, giving a total of 60.0 microfarad capacitance; to wit: 25+20+10+5=60. It is preferred but not required to connect the lead from the compressor motor or the fan motor to the highest value capacitor section used in providing the total capacitance.

Figure 14:
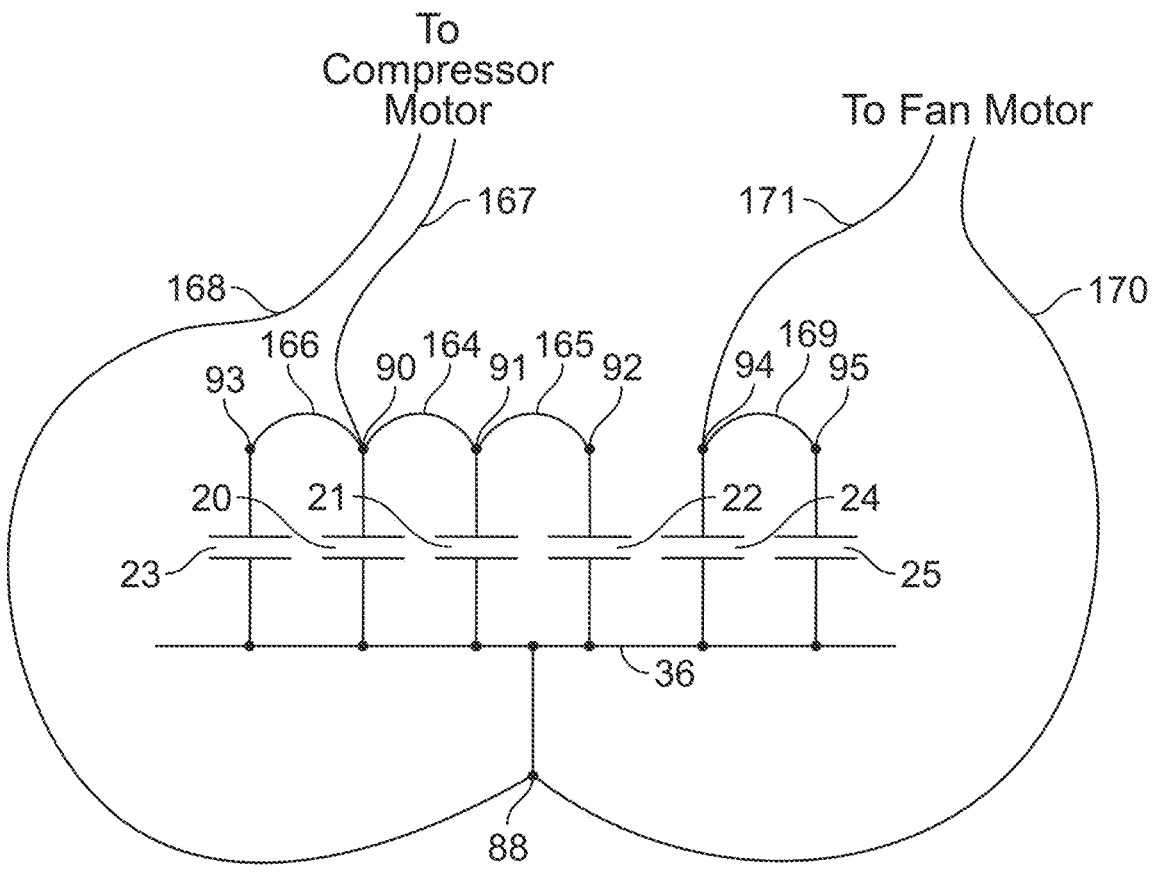
FIG. 14 is a schematic circuit diagram of the capacitor of FIG. 1 connected as shown in FIG. 13.

Similarly, a 7.5 microfarad capacitance is provided to the fan motor by connecting section cover terminal 94 of the 5.0 microfarad capacitor section 24 and the section cover terminal 95 of the nominal 2.5 microfarad capacitor section 25 in parallel via jumper 169. Leads 170 and 171 connect the fan motor to the common cover terminal 88 and the section cover terminal 95 of the capacitor section 25. FIG. 14 diagrammatically illustrates the connection of the capacitor 10 shown in FIG. 13.

It will be appreciated that various other jumper connections between section cover terminals can be utilized to connect selected capacitor sections in parallel, in order to provide a wide variety of capacitance replacement values.

The capacitor sections can also be connected in series to utilize capacitor 10 as a single value replacement capacitor. This has the added advantage of increasing the voltage rating of the capacitor 10 in a series application, i.e. the capacitor 10 can safely operate at higher voltages when its sections are connected in series. As a practical matter, the operating voltage will not be increased as it is established by the existing equipment and circuit, and the increased voltage rating derived from a series connection will increase the life of the capacitor 10 because it will be operating well below its maximum rating.

Figure 15:
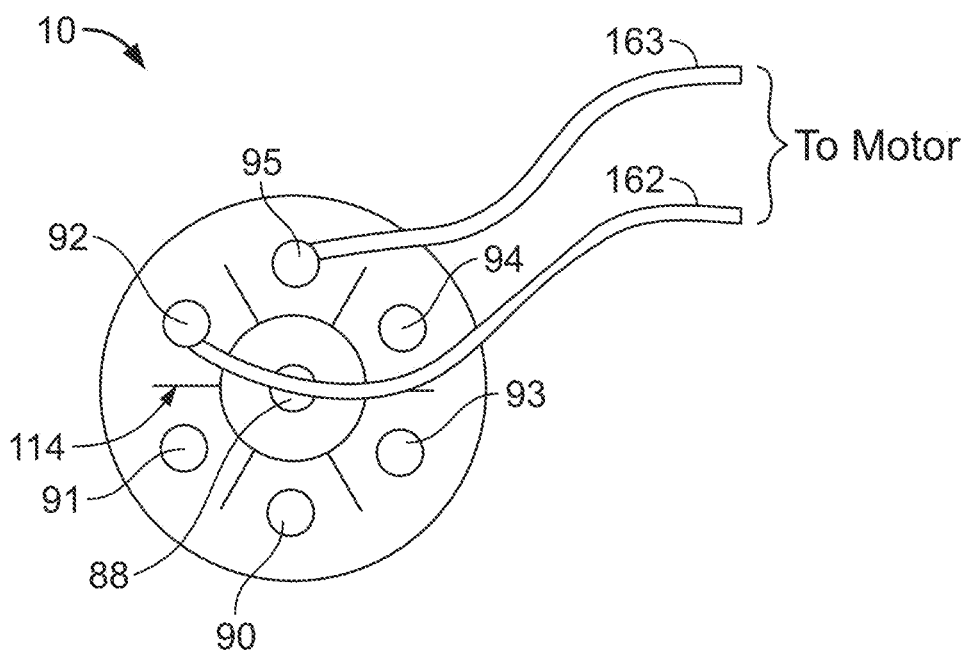
FIG. 15 is a top view of the capacitor of FIG. 1 connecting selected capacitor sections in series, and also shown connected in an electrical circuit to a motor.
Figure 16:
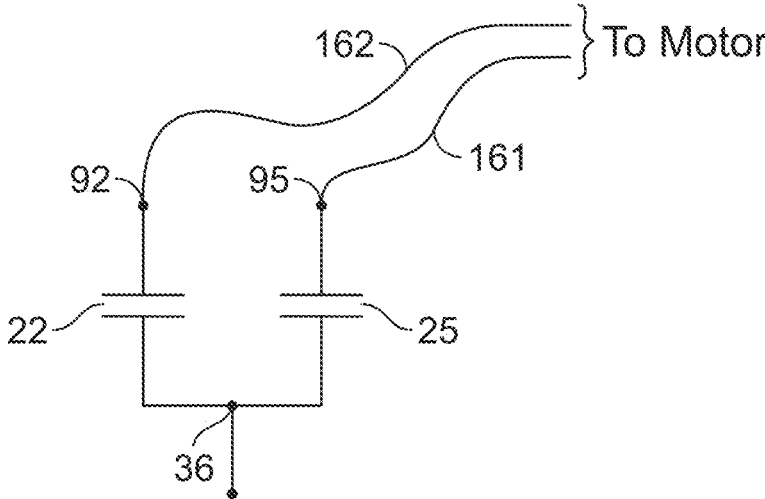
FIG. 16 is a schematic circuit diagram of the capacitor of FIG. 1 as connected shown in FIG. 15.

With reference to FIG. 15, the capacitor 10 is shown with capacitor section 22 (terminal 92) having a value of 10.0 microfarads connected in series with capacitor section 25 (terminal 95) having a nominal value of 2.5 microfarads to provide a replacement capacitance value of 2.0 microfarads. Leads 175 and 176 make the connections from the respective section cover terminals 92 and 95 to the motor, and the element common terminal 36 connects the capacitor sections 22 and 25 of capacitive element 12. With reference to FIG. 16, the connection of capacitor 10 shown in FIG. 15 is illustrated diagrammatically. In both FIGS. 15 and 16, it will be seen that the cover common terminal 88 is not used in making series connections.

The formula for capacitance of capacitors connected in series is $$\frac{1}{C_T} = \frac{1}{C_1} + \frac{1}{C_2} + \frac{1}{C_3}\cdots$$
$$\text{Therefore, } C_T = \frac{C_1 \times C_2}{C_1 + C_2},$$

and the total capacitance of the capacitor sections 22 and 25 connected as shown in FIGS. 15 and 16 is $$C_T = \frac{10.0 \times 2.5}{10.0 + 2.5} = \frac{25}{12.5} = 2.0$$

microfarads. The capacitance of each of the capacitor sections 20-25 is rated at 440 volts. However, when two or more capacitor sections 20-25 are connected in series, the applied voltage section is divided between the capacitor sections in inverse proportion to their value. Thus, in the series connection of FIGS. 15 and 16, the nominal 2.5 microfarad section sees about 80% of the applied voltage and the 10.0 microfarad section sees about 20% of the applied voltage. The net effect is that the capacitor 10 provides the 2.0 microfarad replacement value at a higher rating, due to the series connection. In this configuration, the capacitor 10 is lightly stressed and is apt to have an extremely long life.

Figure 17:
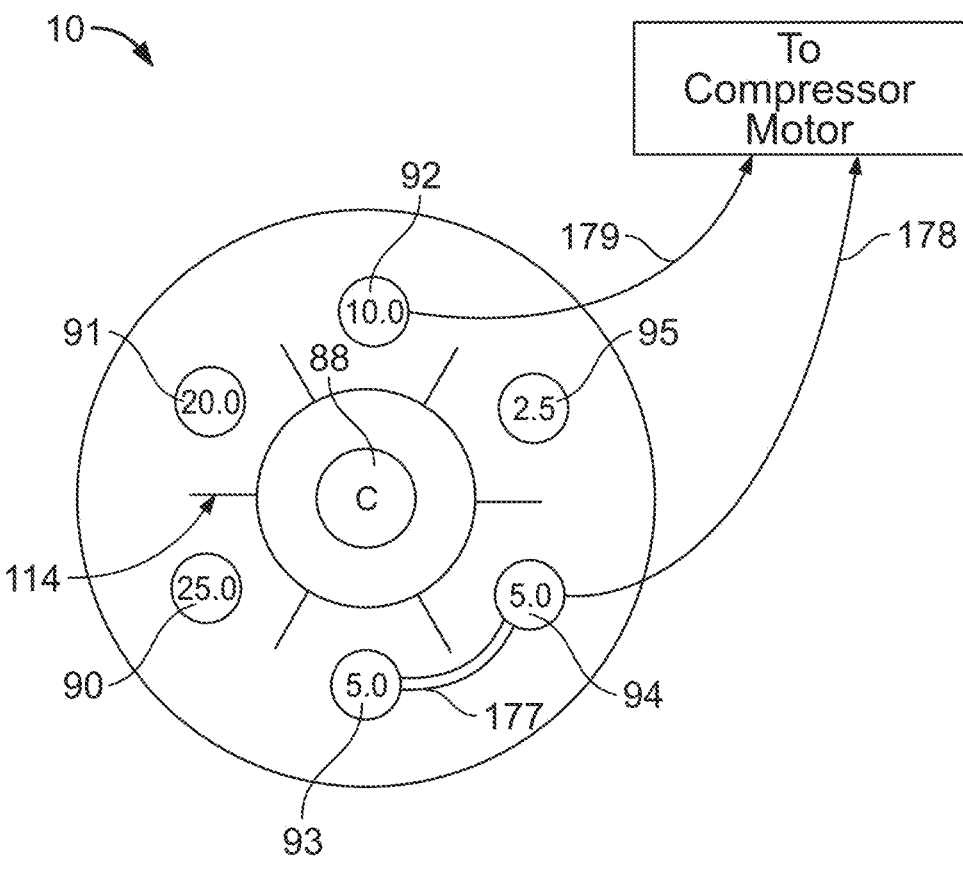
FIG. 17 is a top view of the capacitor of FIG. 1 with a jumper wire connecting selected capacitor sections in series, and also shown connected in an electrical circuit to a compressor motor.
Figure 18:
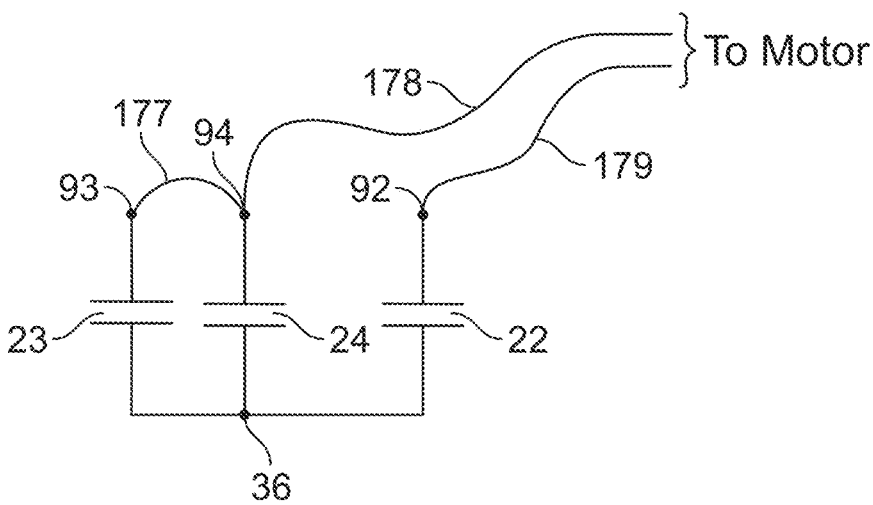
FIG. 18 is a schematic circuit diagram of the capacitor of FIG. 1 connected as shown in FIG. 17.

With reference to FIG. 17, the capacitor sections of the capacitor 10 are shown connected in a combination of parallel and series connections to provide additional capacitive values at high voltage ratings, in this case 5.0 microfarads. The two capacitor sections 23 and 24 each having a nominal value of 5.0 microfarads are connected in parallel by jumper 177 between their respective cover section terminals 93 and 94. The leads 178 and 179 from a compressor motor are connected to the section cover terminal 92 of capacitor section 22 having a value of 10.0 microfarads, and the other lead is connected to cover section terminal 94 of capacitor section 24. Thus, a capacitance value of 5.0 microfarads is provided according to the following formula $$\frac{1}{C_T} = \frac{1}{C_1} + \frac{1}{C_2},$$

where $C_1$ is a parallel connection having the value C+C, in this case 5.0+5.0 for a $C_1$ of 10.0 microfarads. With that substitution, the total value is $$C_T = \frac{10.0 \times 10.0}{10 + 10} = \frac{100}{20} = 5.0$$

microfarads. The connection of capacitor 10 illustrated in FIG. 17 is shown diagrammatically in FIG. 18.

FIG. 19 is a chart showing single capacitance values that can be provided by the capacitor 10 connected in parallel. The values are derived by connecting individual capacitor sections into a circuit, or by parallel connections of capacitor sections. The chart should be interpreted remembering that the 2.8 microfarad capacitor section can be used as a 2.5 or 3.0 microfarad replacement, and that the two 5.0 microfarad values are actually 4.5 and 5.5 microfarad capacitor sections, also with possibilities for more replacements.

FIGS. 20-23 are charts showing applications of capacitor 10 in replacing both a fan motor capacitor and a compressor motor capacitor. This is an important capability, because many air conditioning systems are equipped with dual value capacitors and when one of the values fails, another dual value capacitor must be substituted into the mounting space bracket. The chart of FIG. 20 shows dual value capacitances that can be provided by capacitor 10 wherein the nominal 2.5 microfarad capacitor section 25 is used for one of the dual values, usually the fan motor. Fan motors are generally not rigid in their requirements for an exact capacitance value, wherein the capacitor section 25 may also be used for fan motors specifying a 3.0 microfarad capacitor. The remaining capacitor sections 20-24 are available for connection individually or in parallel to the compressor motor, providing capacitance values from 5.0 to 65.0 microfarads in 5.0 microfarad increments.

The chart of FIG. 21 also shows dual value capacitances that can be provided by capacitor 10. In the chart of FIG. 21, one of the dual values is 5.0 microfarads that can be provided by either capacitor section 23 having an actual capacitance value of 5.5 microfarads or by capacitor section 24 having an actual capacitance of 4.5 microfarads. As discussed above, the capacitor section 24 can also be used for a 4.0 microfarad replacement value, and capacitor section 23 could be used for a 6.0 microfarad replacement value. Thus, the FIG. 21 chart represents more dual replacement values than are specifically listed. The other capacitor section may be used in various parallel connections to achieve the second of the dual capacitance values.

The chart of FIG. 22 illustrates yet additional dual value capacitances that can be provided by capacitor 10. Capacitor section 25 (nominal 2.5 microfarads) is connected in parallel with one of capacitor section 23 (5.5 microfarads) or capacitor section 24 (4.5 microfarads) to provide a 7.5 microfarad capacitance value as one of the dual value capacitances. The remaining capacitor sections are used individually or in parallel to provide the second of the dual value capacitances.

The FIG. 23 chart illustrates yet additional dual value capacitances that can be provided by capacitor 10, where capacitor section 22 (10 microfarads) is dedicated to provide one of the dual values. The remaining capacitor sections are used individually or in parallel for the other of the dual values.

It will be appreciated that any one or group of capacitor sections may be used for one of a dual value, with a selected one or group of the remaining capacitor sections connected to provide another capacitance value. Although there are no known applications, it will also be appreciated that the capacitor 10 could provide six individual capacitance values corresponding to the capacitor sections, or three, four or five capacitance values in selected individual and parallel connections. Additional single values can be derived from series connections.

The six capacitor sections 20-25 can provide hundreds of replacement values, including single and dual values. It will further be appreciated that if fewer replacement values are required, the capacitor 10 can be made with five or even four capacitor sections, and that if more replacement values were desired, the capacitor 10 could be made with more than six capacitor sections. It is believed that, at least in the intended field of use for replacement of air conditioner capacitors, there should be a minimum of five capacitor sections and preferably six capacitor sections to provide an adequate number of replacement values.

As is known in the art, there are occasional failures of capacitive elements made of wound metalized polymer film. If the capacitive element fails, it may do so in a sudden and violent manner, producing heat and outgassing such that high internal pressures are developed within the housing. Pressure responsive interrupter systems have been designed to break the connection between the capacitive element and the cover terminals in response to the high internal pressure, thereby removing the capacitive element from a circuit and stopping the high heat and overpressure condition within the housing before the housing ruptures. Such pressure interrupter systems have been provided for capacitors having two and three cover terminals, including the common terminal, but it has not been known to provide a capacitor with four or more capacitor sections and a pressure interrupter cover assembly.

Figure 24:
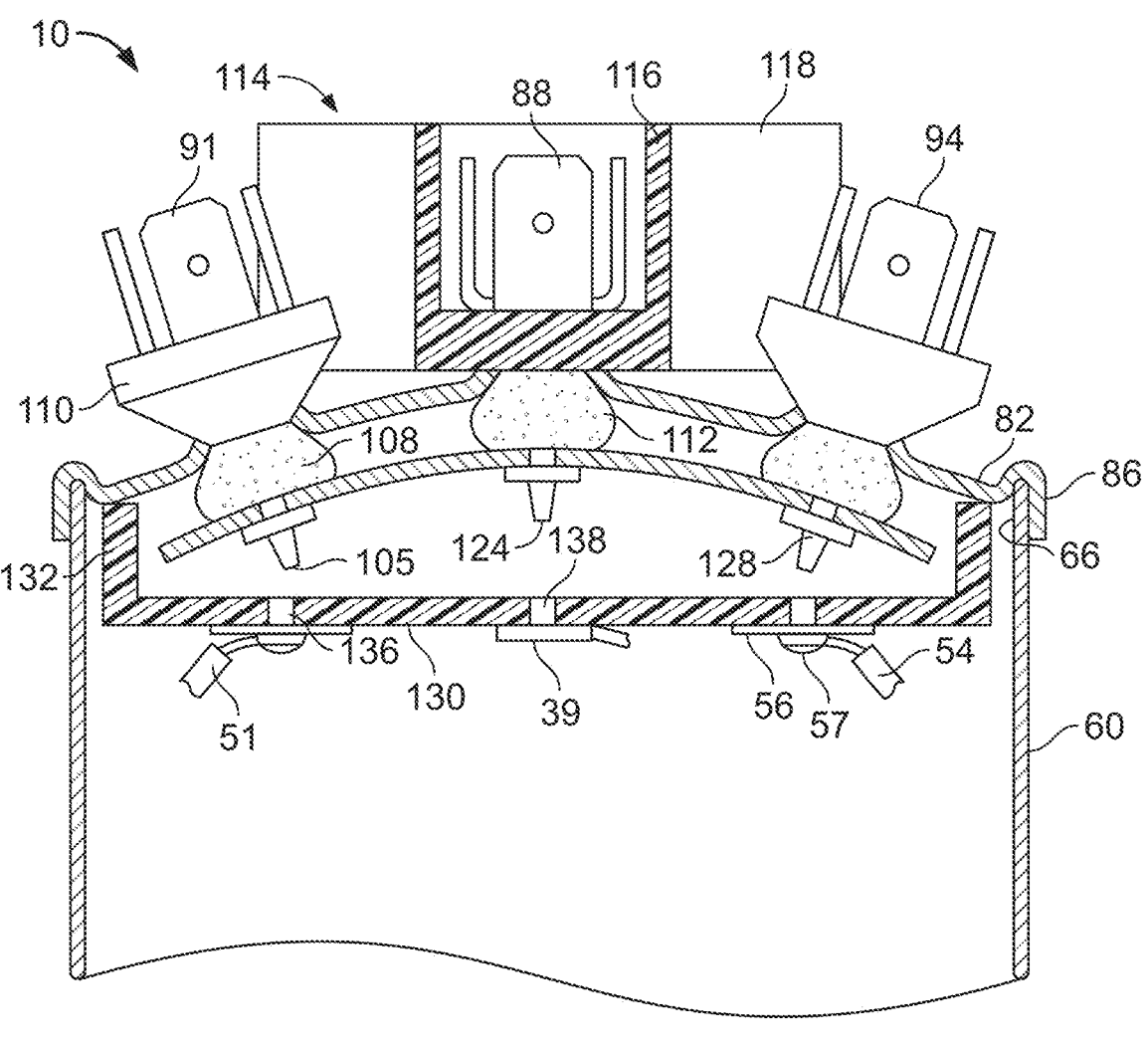
FIG. 24 is a sectional view of the capacitor of FIG. 1, taken generally along the lines 24-24 of FIG. 2, but showing the capacitor after failure of the capacitive element.

The pressure interrupter cover assembly 80 provides such protection for the capacitor 10 and its capacitive element 12. With reference to FIG. 24, the capacitor 10 is shown after failure. Outgassing has caused the circular cover 82 to deform upwardly into a generally domed shape. When the cover 82 deforms in the manner shown, the terminal posts 104, 122 are also displaced upwardly from the disconnect plate 130, and the weld connection of the distal end 124 of common cover terminal post 122 to the distal end 39 foil lead 38 from the element common terminal 36 of the capacitive element 12 is broken, and the welds between the foil tabs 56 and the terminal posts 104 of the section cover terminals 90-95 are also broken, the separation at section cover terminals 91 and 94 being shown.

Although the preferred pressure interrupter cover assembly includes the foil lead 38 and foil tabs 56, frangibly connected to the distal ends of the terminal posts, the frangible connections both known in the art and to be developed may be used. As an example, the terminal posts themselves may be frangible.

It should be noted that although it is desirable that the connections of the capacitive element and all cover terminals break, it is not necessary that they all do so in order to disconnect the capacitive element 12 from a circuit. For all instances in which the capacitor 10 is used with its capacitor sections connected individually or in parallel, only the terminal post 122 of common cover terminal 88 must be disconnected in order to remove the capacitive element 12 from the circuit. Locating the cover common terminal 88 in the center of the cover 82, where the deformation of the cover 82 is the greatest, ensures that the common cover terminal connection is broken both first and with certainty in the event of a failure of the capacitive element 12.

If the capacitor sections of the capacitor 10 are utilized in a series connection, it is necessary that only one of the terminal posts used in the series connection be disconnected from its foil tab at the disconnect plate 130 to remove the capacitive element from an electrical circuit. In this regard, it should be noted that the outgassing condition will persist until the pressure interrupter cover assembly 80 deforms sufficiently to cause disconnection from the circuit, and it is believed that an incremental amount of outgassing may occur as required to cause sufficient deformation and breakage of the circuit connection at the terminal post of one of the section cover terminal. However, in the most common applications of the capacitor 10, the common cover terminal 88 will be used and the central location of the common cover terminal 88 will cause fast and certain disconnect upon any failure of the capacitive element.

Two other aspects of the design are pertinent to the performance of the pressure interrupter system. First, with respect to series connections only, the common cover terminal 88 may be twisted to pre-break the connection of the terminal post 122 with the foil strip 38, thus eliminating the requirement of any force to break that connection in the event of a failure of the capacitive element 12. The force that would otherwise be required to break the connection of cover common terminal post 122 is then applied to the terminal posts of the section cover terminals, whereby the section cover terminals are more readily disconnected. This makes the pressure interrupter cover assembly 80 highly responsive in a series connection configuration.

Second, the structural aspects of welding foil tabs to the distal ends of the terminal posts corresponding to the various capacitor sections and thereafter soldering the connecting wires onto the foil tabs 56 is also believed to make the pressure interrupter cover assembly 80 more responsive to failure of the capacitive element 12. In particular, the solder and wire greatly enhance the rigidity of the foil tabs 56 wherein upon deformation of the cover 82, the terminal posts break cleanly from the foil tabs 56 instead of pulling the foil tabs partially through the disconnect plate before separating. Thus, the capacitor 10, despite having a common cover terminal and section cover terminals for six capacitor sections, is able to satisfy safety requirements for fluid-filled metalized film capacitors, which is considered a substantial advance in the art.

Figure 25:
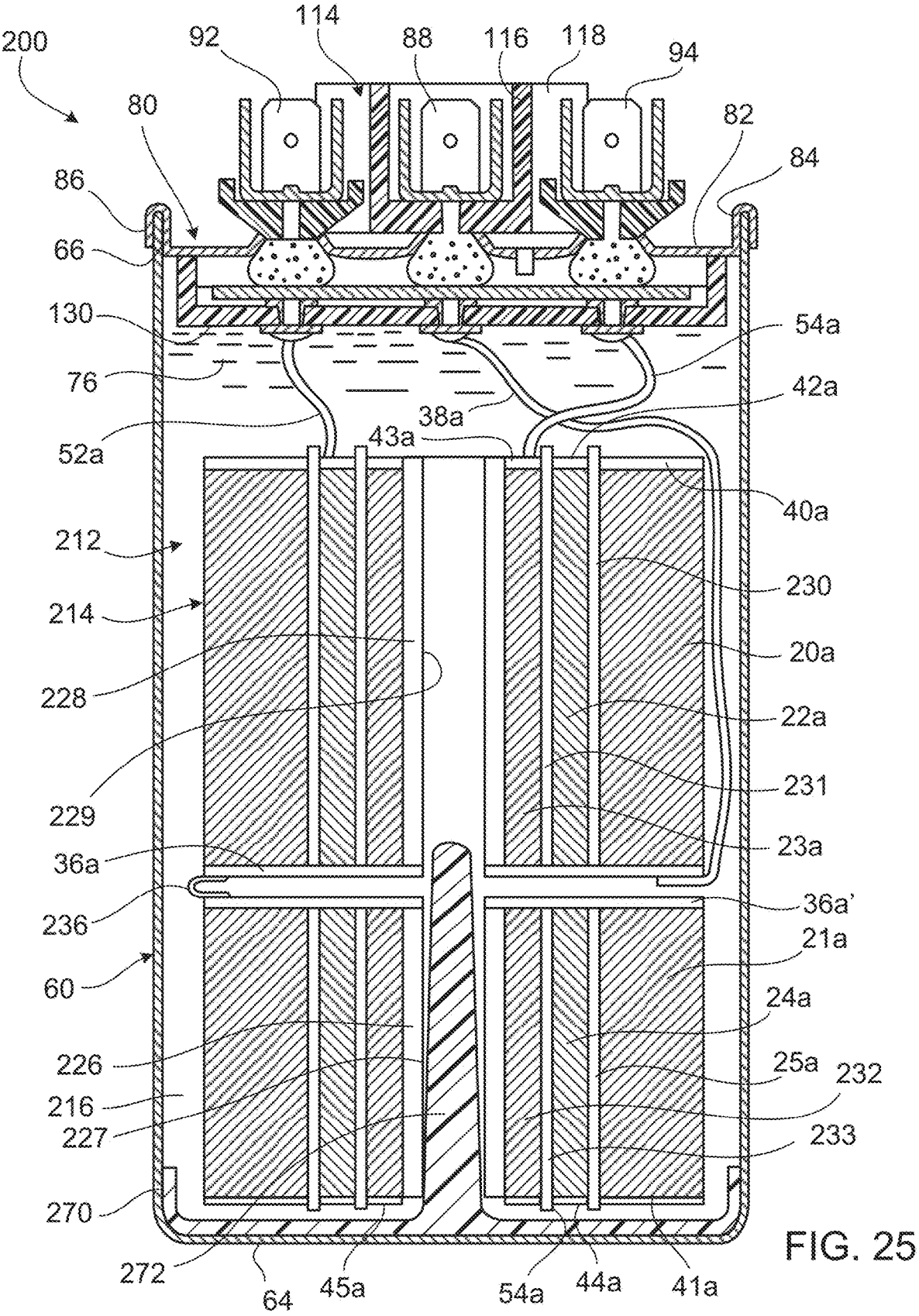
FIG. 25 is a sectional view of a capacitor according to the invention herein.
Figures 26, 27:
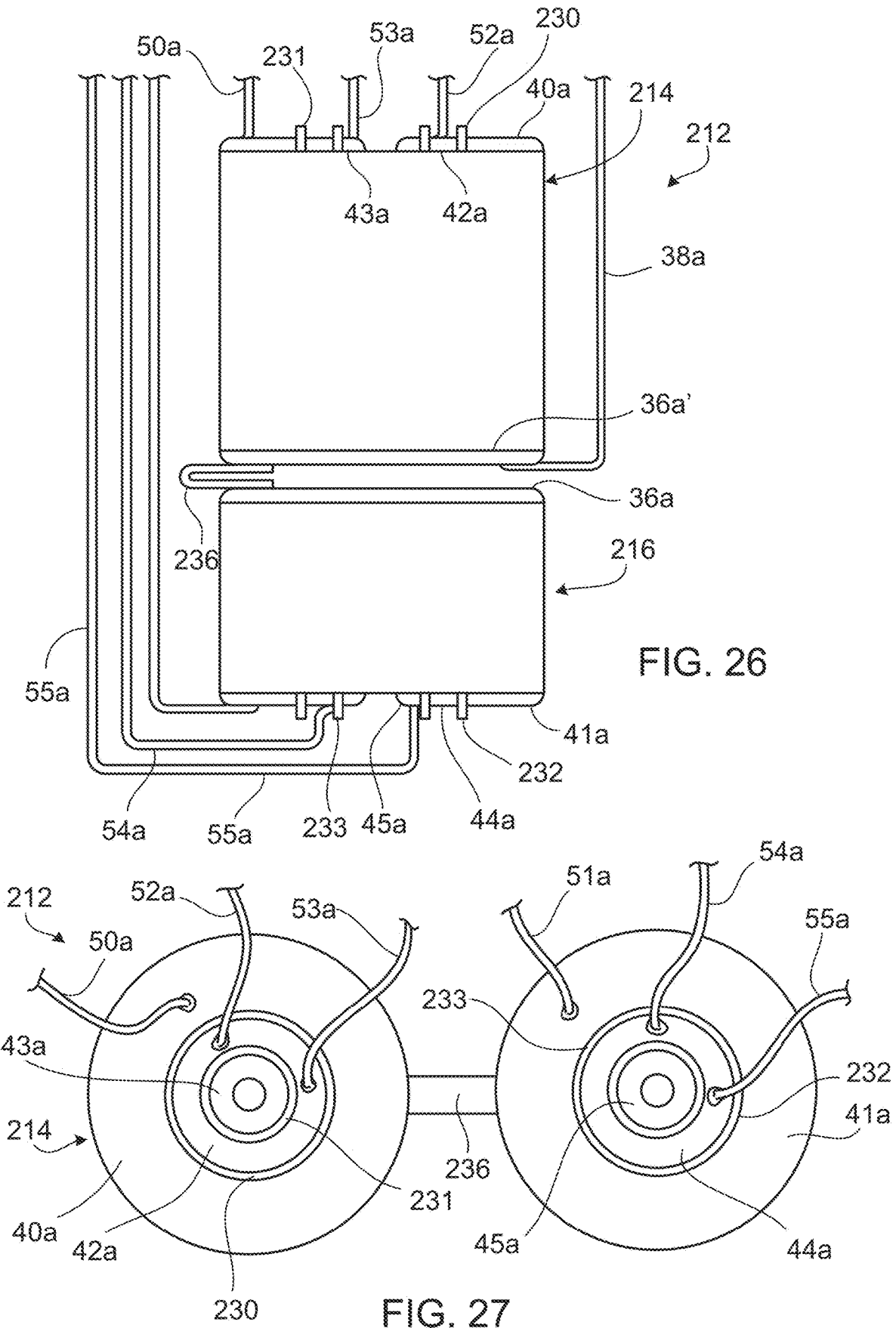
FIG. 26 is a side elevation view of the capacitive element of the capacitor of FIG. 25, including conductors connected to the capacitor sections thereof.
FIG. 27 is a folded top and bottom view of the capacitive element of the capacitor of FIG. 26 including conductors connected to capacitor sections thereof.

Another capacitor 200 according to the invention herein is illustrated in FIGS. 25-27. The capacitor 200 has the same or similar external appearance and functionality as capacitor 10, and is adapted to replace any one of a large number of capacitors with the capacitor 200 connected to provide the same capacitance value or values of a failed capacitor.

The capacitor 200 is characterized by a capacitive element 212 having two wound cylindrical capacitive elements 214 and 216 stacked in axial alignment in case 60. The first wound cylindrical capacitive element 214 provides three capacitor sections 20a, 22a and 23a, and the second wound cylindrical element 216 provides an additional three capacitive sections 21a, 24a and 25a. These capacitor sections correspond in capacitance value to the capacitor sections 20-25 of capacitor 10, i.e. capacitor sections 20 and 20a have the same capacitance value, capacitor sections 21 and 21a have the same capacitance value, etc.

The wound cylindrical capacitive element 214 has a central spool or mandrel 228, which has a central opening 229. First and second dielectric films, each having metalized layer on one side thereof, are wound in cylindrical form on the mandrel 228 with the non-metalized size of one film being in contact with the metalized side of the other. Selected portions of one or both of the metalized layers are removed in order to provide multiple sections in the wound cylindrical capacitive element. Element insulation barriers 230 and 231 are inserted into the winding to separate the capacitor sections, the element insulation barriers also assuming a cylindrical configuration, with the element insulation barrier 230 separating capacitor sections 20a and 22a, and element insulation barrier 231 separating capacitor sections 22a and 23a. Zinc or other metal spray is applied between the barriers to form section terminals 40a, 42a and 43a at one end of wound cylindrical capacitive element 214, and first common element terminal 36a.

The second wound cylindrical capacitive element 216 is similarly formed, on a mandrel 226 with central opening 227, providing three capacitor sections 21a, 24a and 25a, with insulation barriers 232 and 233 separating the sections. The insulation barriers may be as described above with respect to capacitive element 12, i.e. polypropylene barriers sufficient to withstand heat from adjacent soldering without loosing the integrity of electrical insulation. The capacitor sections 21a, 24a and 25a are also metal sprayed to form section terminals 41a, 44a and 45a with capacitance values respectively corresponding to sections 41, 44 and 45 of capacitive element 12.

Element common terminal 36a' is also formed. Element common terminal 36a of wound cylindrical capacitive element 214 connects the sections 20a, 22a and 23a thereof, and an element common terminal 36a' of wound cylindrical capacitive element 216 electrically connects the capacitor sections 21a, 24a and 25a. The element common terminals 36a and 36a' are connected by a foil strip 236, wherein they become the common terminal for all capacitor sections. The wound cylindrical capacitive elements 214 and 216 are stacked vertically in the case 60, with the common element terminals 36a, 36a' adjacent to each other such that any contact between these common element terminals is normal and acceptable because they are connected as the common terminal for all capacitor sections. An insulator cup 270 is positioned in the bottom of case 60, to protect element section terminals 21a, 24a and 25a from contact with the case 60 and a post 272 keeps the wound cylindrical elements 214 and 216 aligned and centered in case 60.

Conductors 50a-55a, preferably in the form of six insulated foil strips or insulated wires, each have one of their respective ends soldered to corresponding element section terminals 20a-25a, and have their other respective ends connected to the corresponding terminal posts of pressure interrupter cover assembly 80. One of the element common terminals 36a, 36a' is connected to the cover common terminal post 122 by conductor 38a. When the conductors are foil strips, all of the conductors may be connected as described above with respect to the foil strip 38, and if the conductors are insulated wire conductors they may be connected as described above with respect to the insulated wires 50-55. The case 60 is filled with an insulating fluid 76.

The length L of the two wound cylindrical capacitives 214 and 216, i.e. the length of the mandrels 226 and 228 on which the metalized dielectric sheet is wound, is selected in part to provide the desired capacitance values. The outer capacitor sections having the greater circumferential dimension contain more metalized dielectric film than the capacitor sections more closely adjacent to the mandrels, and therefore provide a larger capacitance value. Thus, the longer wound cylindrical capacitive element 214 provides the 25 microfarad capacitor section 20a and the 10 microfarad capacitor section 22a, with the 5.5 microfarad capacitor section 23a adjacent mandrel 238. The shorter wound cylindrical capacitive element 216 provides the 20 microfarad capacitor section 21a, the 4.5 microfarad capacitor section 24a and the 2.8 microfarad capacitor section 25a.

A capacitive element 212 made up of two wound cylindrical capacitive elements 214 and 216 therefore provides the same capacitance values in its various capacitor sections as capacitive element 12 and, when connected to the cover section terminals 90-95, may be connected in the same way as described above with respect to the capacitor 10 and to provide the same replacement capacitance values shown in the charts of FIGS. 19-23.

Figure 28:
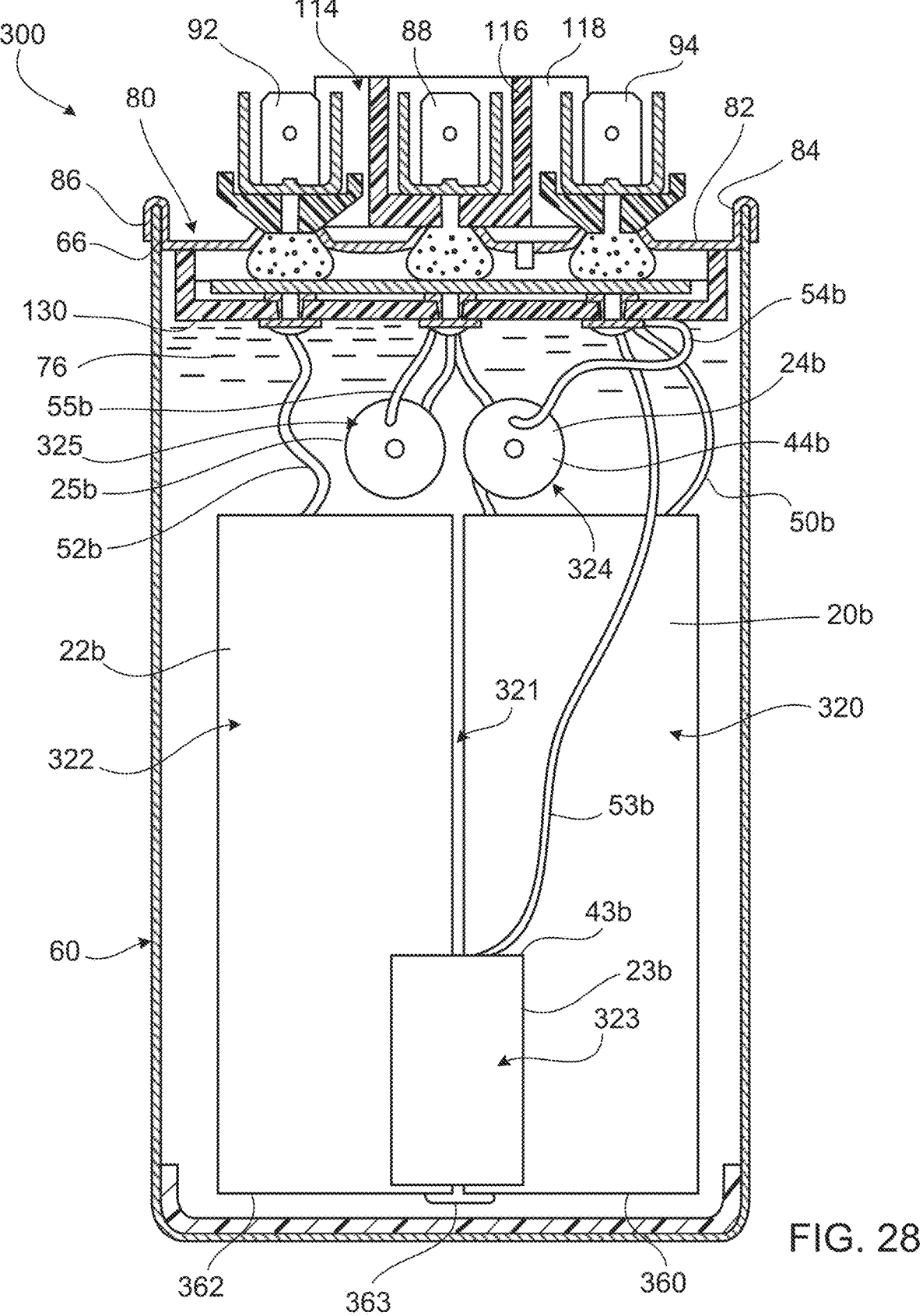
FIG. 28 is a sectional view of a capacitor according to the invention herein.
Figures 29, 30:
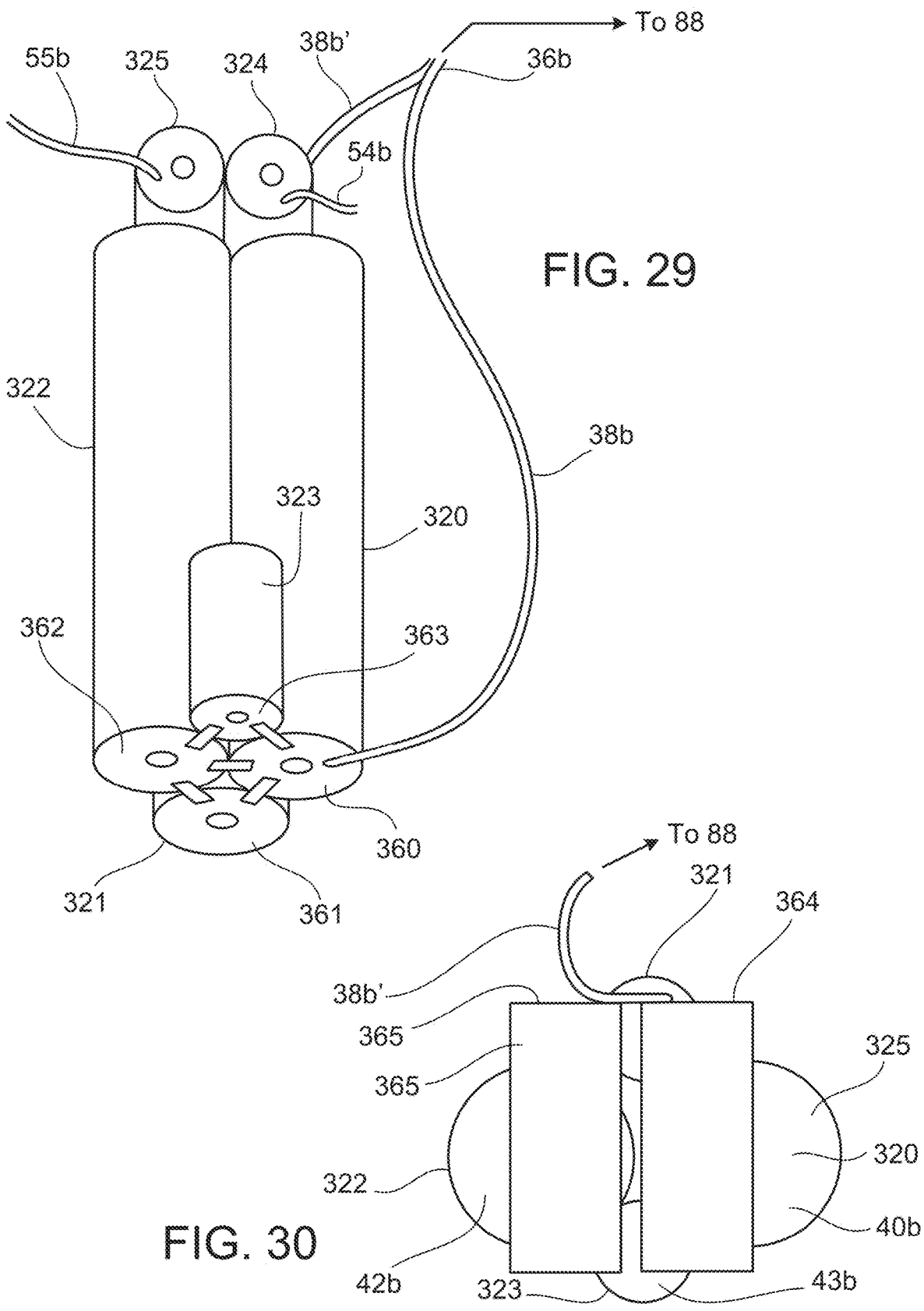
FIG. 29 is a perspective view of the capacitive element of the capacitor of FIG. 28, including some of the conductors connected to the capacitor sections thereof.
FIG. 30 is a top view of the capacitive element of the capacitor of FIG. 28, including conductors connected to capacitor sections thereof.

With reference to FIGS. 28-30, another capacitor 300 is shown, also having the same or similar exterior appearance as the capacitor 10 and having the same functionality and replacing failed capacitors of varying values. The capacitor 300 includes case 60 and pressure interrupter cover assembly 80, and the capacitor 300 is characterized by a capacitive element provided in six separate wound cylindrical capacitive elements 320-325, each wound cylindrical capacitive element providing one capacitor section 20b-25b of the total capacitive element 312.

Accordingly, the capacitive element includes a first wound cylindrical capacitive element 320 which provides a capacitive section 20b, preferably having a capacitance value of 25 microfarads. The capacitive section 20b has a section terminal 40b which is connected by conductor 50b to section cover terminal 90 of the cover assembly 80, and has bottom common terminal 360. Wound cylindrical capacitor element 321 provides the capacitor section 21b having a value of 20 microfarads, having a section terminal 41b connected to the cover section terminal 91 by a conductor 51b. This section also has a bottom terminal 361. Similarly, a wound cylindrical capacitive element 322 provides the capacitor section 22b of capacitance value 10 microfarads, with section terminal 42b connected to the corresponding section cover terminal 92 by conductor 52c, and has a bottom terminal 362. Wound cylindrical capacitive element 325 provides capacitor section 25b having sectional terminal 45b connected to the section cover terminal 95 by insulated wire conductor 55b. It also has a bottom terminal 325. The wound cylindrical capacitive element 325, providing only 2.8 microfarads of capacitance value, is quite small compared to the wound cylindrical capacitive elements 320, 321 and 322.

The four wound cylindrical capacitive elements 320, 321, 322 and 325 are oriented vertically within the case 60, but provide sufficient head room to accommodate two additional wound cylindrical capacitive elements 323 and 324, which are placed horizontally under the cover assembly 80. The wound capacitive element 323 provides capacitor section 23b, preferably having a value of 4.5 microfarads, and the wound cylindrical capacitive element 324 provides capacitor section 24b having a value of 5.5 microfarads. These capacitor sections have, respectively, section terminals 43b and 44b connected to cover terminals 93 and 94 by conductors 53b and 54b and bottom terminals 323 and 324.

All of the bottom terminals 320-325 are connected together to form common element terminal 36b, and are connected to the common cover terminal 88. As best seen in FIG. 29, the bottom terminals 320, 321, 322 and 325 of the capacitor sections 20b, 21b, 22b and 25b are connected together by strips soldered or welded thereto, these strips providing both an electrical connection and a mechanical connection holding the assemblies together. Additionally, they may be wrapped with insulating tape. An insulated foil strip 38b connects the aforesaid bottom terminals to the common cover terminal. The bottom terminals 323 and 324 of capacitor sections 23b and 24b are also connected together, and are further connected to the common cover terminal by an insulated foil strip 38b'.

The wound cylindrical capacitive elements 320-325 are placed in case 60 with an insulating fluid 76. The capacitor 300 may be used in the same way as described above with respect to capacitor 10, to provide selected replacement values for a large number of different failed capacitors.

It will be noted that the wound cylindrical capacitive elements 320-325 occupy less space in the case 60 than the single wound cylindrical capacitive element 12 of capacitor 10. This is achieved by using thinner dielectric film wherein the capacitance values can be provided in less volume; however, the voltage rating of the wound cylindrical capacitive elements 320-325 is correspondingly less because of the thinner dielectric material. Thus, the capacitors made with this technique may have a shorter life, but benefit from a lower cost of manufacture.

Figure 31:
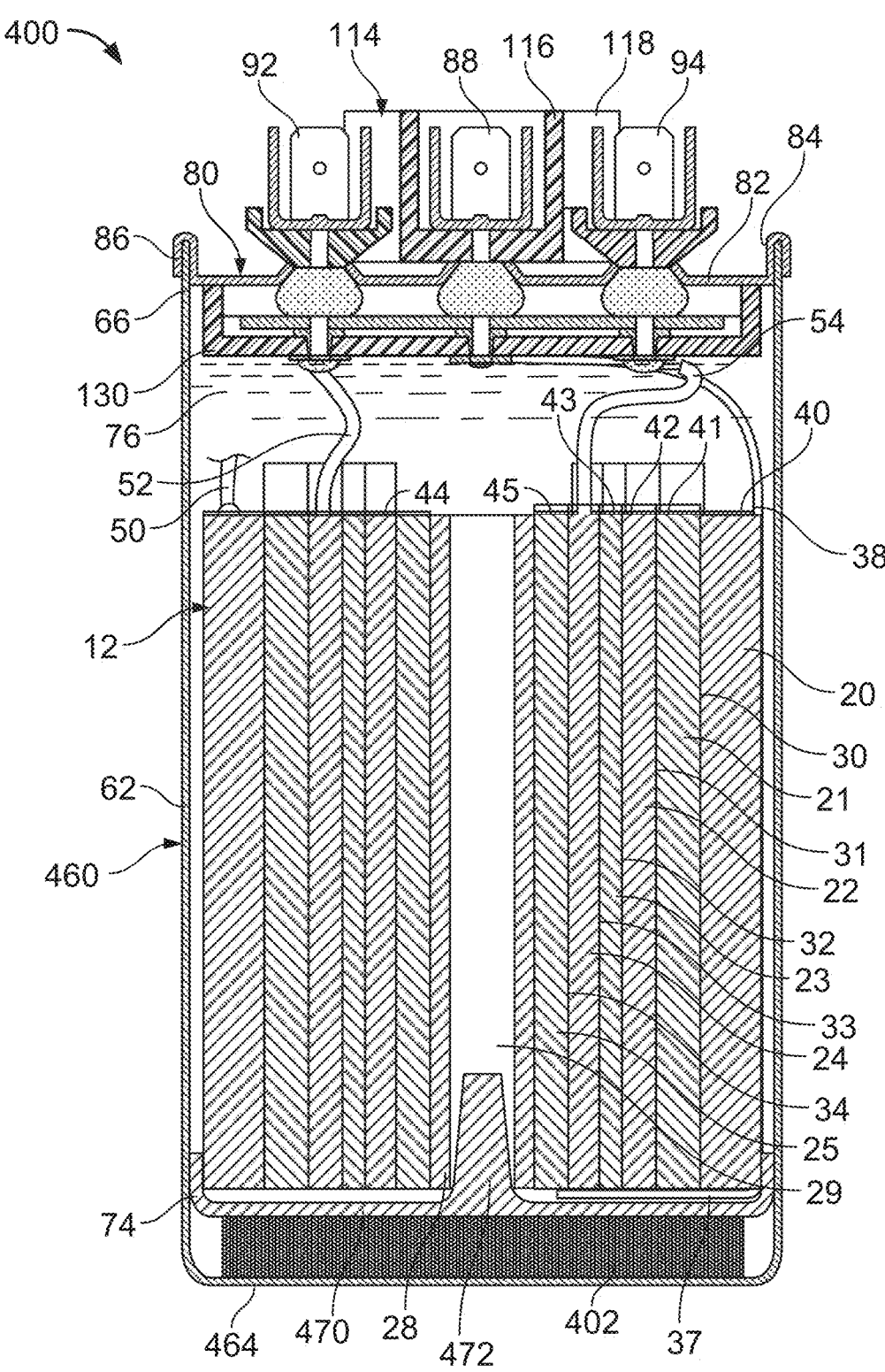
FIG. 31 is a sectional view of an example of a capacitor and a magnet.

Another capacitor 400 according to the invention herein is illustrated in FIG. 31. The capacitor 400 may have the same or similar external appearance and functionality as capacitor 10, and may be adapted to replace any one of a large number of capacitors with the capacitor 400 connected to provide the same capacitance value or values of a failed capacitor.

The capacitor 400 may include one or more magnetic elements for assisting in mounting of the capacitor 400 (e.g., to an air conditioning system). In the illustrated example, a magnet 402 is positioned toward a bottom end of the capacitor 400. In particular, the magnet 402 is positioned between a bottom wall 464 of a case 460 of the capacitor 400 and a bottom cup 470 of the capacitor 400 (e.g., beneath a center post 472 of the bottom cup 470). The magnet 402 is configured to create magnetic attraction between the magnet 402 and a magnetic surface in proximity to the capacitor 400. For example, the magnet 402 may cause the bottom wall 464 of the case 460 to be attracted to a metallic surface of an air conditioning system, thereby improving the integrity of a mounting between the capacitor 400 and the air conditioning system after installation. The magnet 402 may be designed such that the strength of magnetic attraction between the magnet 402 and the air conditioning system is such that the magnet 402 may remain firmly in place in response to possible vibration and/or other movement of the air conditioning system during operational use. In some implementations, the strength of magnetic attraction between the magnet 402 and the air condition system is such that a user (e.g., a technician installing or uninstalling the capacitor 400) can remove the capacitor from the surface of the air conditioning system without requiring excessive effort.

While the magnet 402 is illustrated as being positioned interior to the case 460 of the capacitor 400, in some implementations, the magnet 402 may be positioned outside of the case 460 on an exterior of the bottom wall 464 of the case 460. For example, the magnet 402 may have a disk shape that is positioned outside of the case 460 at an outer surface of a base of the case 460.

In some examples, the magnet 402 may have a rectangular shape. For example, the magnet 402 may be a rectangular strip that runs along the bottom wall 464 of the case 460 of the capacitor 400. In particular, the rectangular strip may have a particular thickness, a first dimension that runs from the left side of the capacitor 400 to the right side of the capacitor 400 as illustrated in FIG. 31, and a second dimension that is perpendicular to the first dimension and smaller than the first dimension. In some implementations, the magnet 402 may have a square shape (e.g., such that the first dimension is equal to or substantially equal to the second dimension). In some implementations, the magnet 402 may have a rod shape. In some implementations, the magnet 402 may have a circular shape (e.g., a disk shape) or a hollow circular shape (e.g., a ring shape). For example, in some implementations, the magnet 402 may have dimensions equal to or substantially equal to the dimensions of a disk-shaped battery (e.g., a watch battery such as a CR2032 battery). In some implementations, the magnet 402 is a disk-shape with a thickness of approximately 4 mm and a diameter of approximately 160 mm. In some implementations, the magnet 402 is a disk-shape with a thickness of approximately 4 mm and a diameter of approximately 40 mm. In some implementations, the magnet 402 is a disk-shape with a thickness of approximately 4.5-5 mm and a diameter of about 60 mm. In some implementations, the magnet 402 is a disk-shape with a thickness of approximately 5 mm and a diameter of about 60 mm.

The particular shape and/or dimensions of the magnet 402 may be chosen to achieve the desired strength of magnetic attraction. For example, the magnet 402 may be designed with a particular shape and/or larger dimensions and/or larger thicknesses to achieve a relatively higher strength of magnetic attraction with a magnetic surface. In some implementations, increased surface area of the magnet 402 toward the bottom wall 464 of the case 460 of the capacitor 400 may increase the strength of magnetic attraction.

In some implementations, the magnet 402 has a strength of approximately 30-40 milliTeslas (mT) or a strength of approximately 65-75 mT. In some implementations, the strength of magnetic attraction can be increased by stacking multiple magnets 402 (e.g., on top of each other). In some implementations, two stacked magnets 402 can have a strength of approximately 70-80 mT, 60-80 mT, or 130-150 mT, although other ranges are also possible. In some implementations, the magnet 402 may be a D40×4 ferrite ceramic magnet manufactured by Hangzhou Honesun Magnet Co., Ltd.

In some implementations, the magnet 402 may be magnetized using one or more of a plurality of techniques. For example, in some implementations, the magnet 402 may be magnetized such that a north and a south pole of the magnet 402 is located at a particular position of the magnet 402. For example, the techniques for magnetizing the magnet 402 may cause the north and/or south pole to be located at various thicknesses of the magnet 402, various axial positions of the magnet 402, various diametric positions of the magnet 402, and/or various radial positions of the magnet 402. In some implementations, the magnet 402 may be a multi-pole magnet.

In some implementations, the magnet 402 is a permanent magnet that is made from a material that is magnetized and creates its own persistent magnetic field. For example, the magnet 402 may be made from a ferromagnetic material that can be magnetized, such as iron, nickel, cobalt, and/or an alloy of rare-earth metals, among others. In some implementations, the magnet 402 is a ferrite and/or ceramic magnet. In some implementations, the magnet 402 may include one or more of ferric oxide, iron oxide, barium, barium carbonate, strontium, and/or strontium carbonate. The magnet 402 may include one or more magnetically "hard" materials (e.g., materials that tend to stay magnetized). Alternatively or additionally, the magnet 402 may include one or more magnetically "soft" materials.

In some implementations, the magnet 402 may be a rare-earth magnet. A rare-earth magnet is typically a relatively strong permanent magnet that is made from one or more alloys of rare-earth elements. Example of rare-earth elements that can be used in a rare-earth magnet include elements in the lanthanide series, scandium, and yttrium, although other elements may also or alternatively be used. In some implementations, the rare-earth magnet may produce a magnetic field of greater than 1.0 T (teslas). In some implementations, the rare-earth magnet may include one or both of samarium-cobalt and neodymium.

In some implementations, the magnet 402 may be made from one or more ceramic compounds (e.g., ferrite) that can be produced by combining iron oxide and one or more metallic elements. In some implementations, such ceramic compounds may be electrically nonconductive. The use of such ceramic compounds for the magnet 402 may eliminate the inclusion of electrically conductive elements in the capacitor 400 that may otherwise affect the operation of the capacitor 400.

In some implementations, the magnet 402 may have a grade that corresponds to a particular standard (e.g., a National and/or International standard). In some implementations, the grade of the magnet 402 corresponds to the Chinese ferrite magnet nomenclature system. For example, in some implementations, the magnet 402 is grade Y10 T, Y25, Y30, Y33, Y35, Y30BH, or Y33BH, although other grades are also possible. In some implementations, the grade corresponds to a working temperature of 250° C. In some implementations, the grade of the magnet 402 corresponds to a Feroba, an American (e.g., "C"), or a European (e.g., "HF") grading standard.

In some implementations, the magnet 402 may be an electromagnet that produces a magnetic field by introducing an electric current. In some implementations, the electromagnet may include a magnetic core and a wire (e.g., an insulated wire) wound into a coil around the magnetic core. The magnetic core may be made from a ferromagnetic or a ferrimagnetic material such as iron or steel. The magnetic core may be made from a "soft" magnetic material (e.g., a magnetic material that can allow magnetic domains in the material to align upon introduction of the current through the coil).

By using an electromagnet as the magnet 402, the strength of magnetic attraction can be turned on and off and/or customized according to the current passed through the coil. For example, current can be applied through the coil to cause the electromagnet to generate a magnetic field, and the current can be removed from the coil to cause the electromagnetic to cease generating the magnetic field. In some implementations, the strength of the magnetic field (and, e.g., the strength of magnetic attraction created by the electromagnet) can be adjusted based on the magnitude of electrical current passed through the coil. For example, relatively higher magnitudes of electrical current correspond to higher magnetic field strengths and therefore higher strengths of magnetic attraction (e.g., with a magnetic surface), and relatively lower magnitudes of electrical current correspond to lower magnetic field strengths and therefore lower strength of magnetic attraction.

In some implementations, the particular material used for the core of the electromagnet and/or the dimensions of the core may be chosen to achieve the desired strength of magnetic attraction. The core may be made from a material such as one or both of iron and steel. In some implementations, the dimensions of the coil and/or the number of turns of the coil may also be chosen to achieve the desired strength of magnetic attraction.

In some implementations, the current that is provided through the coil may be provided by a connection with one or more of the section cover terminals 90-95 and the common cover terminal 88 of the capacitor 400. For example, a conductor (e.g., a wire) may be used to connect one or more of the section cover terminals 90-95 to a first end of the coil and a conductor may be used to connect another one of the section cover terminals 90-95 or the common cover terminal 88 to a second end of the coil. In this way, the current that otherwise runs through the electrical components of the capacitor 400 can also be used to power the electromagnetic, thereby causing the electromagnet to generate a magnetic field.

In some implementations, the capacitor 400 may include one or more different and/or additional electrical components that can be used by the electromagnet to generate the magnetic field. For example, the capacitor 400 may include a separate capacitor that is configured to store a charge to be used to subsequently apply current through the coil of the electromagnetic. In this way, the electromagnet may have a separate power source that can be used when generation of a magnetic field is desired.

In some implementations, the capacitor 400 may include a switch that can be toggled by a user (e.g., a technician or an operator of the capacitor 400) to cause the electromagnetic to generate or cease generating the magnetic field. The switch may cause an electrical connection in the coil to be temporarily broken and restored. In some implementations (e.g., implementations in which the coil is connected to one or more of the section cover terminals 90-95 and/or the common cover terminal 88), the switch may cause the conductor that connects the coil to one or more of the section cover terminals 90-95 and/or the conductor that connects the coil to the common cover terminal 88 to be temporarily broken and restored, such that the magnetic field generated by the electromagnet can be toggled on and off. In this way, the user can toggle the magnetic field on when mounting of the capacitor 400 is desired (e.g., at the time of installation) and toggle the magnetic field off when mounting of the capacitor 400 is not desired (e.g., when the capacitor 400 is not in use and/or being stored) or when magnetic attraction is not desired (e.g., when mounting the capacitor 400 at a location that does not include a magnetic surface).

In some implementations, one or more of the capacitive elements of the capacitor 400 and/or the capacitor sections of the capacitor 400 may be used to store the charge that is provided to the coil to cause the magnetic field to be generated. For example, the capacitive element 12 and/or one or more of the capacitor sections 20-25 may be configured to store a charge that is subsequently provided to the coil of the electromagnetic. In this way, electrical charge that is otherwise stored by the capacitor 400 during typical use can also be used to power the electromagnet.

While the capacitor 400 shown in the illustrated example includes one magnet 402, additional magnets may also be provided. For example, a plurality of magnets 402 may be positioned between the bottom wall 464 of the case 460 of the capacitor 400 and the bottom cup 470 of the capacitor 400. The plurality of magnets 402 may have dimensions that are relatively smaller than dimensions that may be chosen for implementations in which only a single magnet 402 is used. The plurality of magnets 402 may have dimensions substantially similar to dimensions of a watch battery, such as a CR2032 battery. The plurality of magnets 402 may be positioned at various locations at the bottom wall 464 of the case 460. For example, the plurality of magnets 402 may be arranged in a ring around a perimeter of the bottom wall 464 such that the plurality of magnets 402 are spaced approximately equidistant from one another. In some implementations, the plurality of magnets 402 may be arranged in groups of two, three, etc. magnets 402. Any number of magnets 402 may be provided to achieve the desired strength of magnetic attraction.

In some implementations, the capacitor 400 includes two magnets 402 positioned between the bottom wall 464 of the case 460 of the capacitor 400 and the bottom cup 470 of the capacitor 400. In some implementations, the two magnets 402 are each circular shape (e.g., disk shaped). The two magnets 402 may have a stacked configuration such that a first disk shaped magnet is stacked on top of a second disk shaped magnet. In some implementations, the two magnets 402 may have a combined strength of approximately 70-80 mT, 60-80 mT, or 130-150 mT, although other ranges are also possible. The two magnets 402 may have the same or different diameters. In some implementations, the two magnets 402 may be positioned at a location that is misaligned with a center of the bottom wall 464 of the case 460. For example, the center of the magnets 402 may be misaligned with the center of the bottom wall 464 of the case 460 such that the magnets 402 are positioned proximate to a side wall of the case 460. In some implementations, the center of the magnets 402 may be aligned with the center of the bottom wall 464 of the case 460. In some implementations, the centers of the two magnets 402 may be misaligned relative to each other. In other words, a center of one of the magnets may be misaligned with a center of the other magnet.

Figure 32:
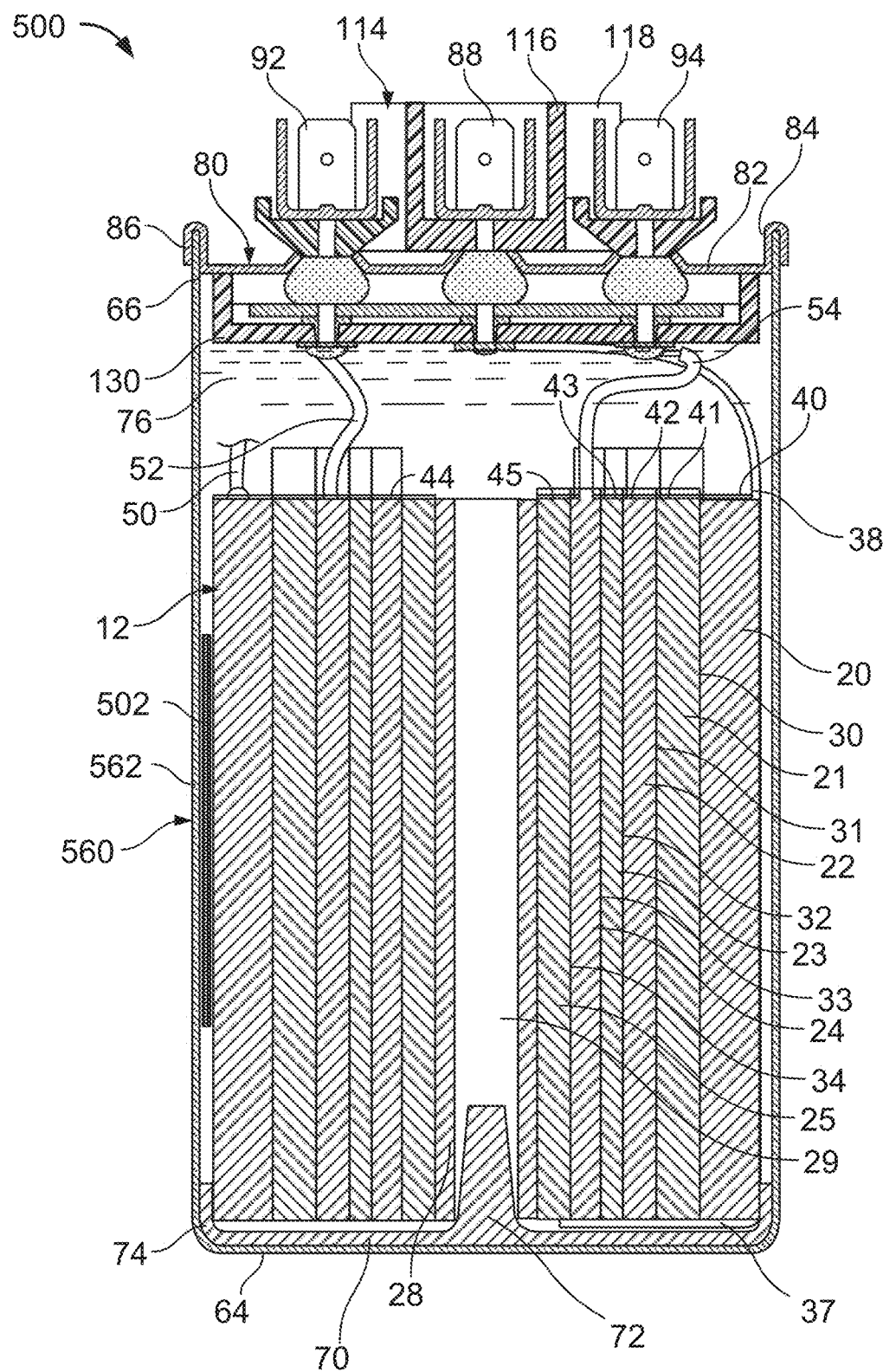
FIG. 32 is a sectional view of an example of a capacitor and a magnet.

Another capacitor 500 according to the invention herein is illustrated in FIG. 32. The capacitor 500 may have the same or similar external appearance and functionality as capacitors 10 and 400, and may be adapted to replace any one of a large number of capacitors with the capacitor 500 connected to provide the same capacitance value or values of a failed capacitor.

The capacitor 500 may include one or more magnets for assisting in mounting of the capacitor 500 (e.g., to an air conditioning system). In the illustrated example, a magnet 502 is positioned inside a side wall 562 of a case 560 (e.g., sometimes referred to as a container) of the capacitor 500.

The magnet 502 is configured to create magnetic attraction between the magnet 502 and a magnetic surface in proximity to the capacitor 500. For example, the magnet 502 may cause the side wall 562 of the case 560 to be attracted to a metallic surface of an air conditioning system, thereby improving the integrity of a mounting between the capacitor 500 and the air conditioning system after installation. The magnet 502 may be designed such that the strength of magnetic attraction between the magnet 502 and the air conditioning system is such that the magnet 502 may remain firmly in place in response to possible vibration and/or other movement of the air conditioning system during operational use. In some implementations, the strength of magnetic attraction between the magnet 502 and the air condition system is such that a user (e.g., a technician installing or uninstalling the capacitor 500) can remove the capacitor from the surface of the air conditioning system without requiring excessive effort.

In some examples, the magnet 502 may have a rectangular shape. For example, the magnet 502 may be a rectangular strip that runs from top to bottom along the side wall 562 of the case 560 of the capacitor 500. In particular, the rectangular strip may have a particular thickness, a first dimension that runs from the top end of the capacitor 500 to the bottom end of the capacitor 500, and a second dimension that is perpendicular to the first dimension and smaller than the first dimension. In some implementations, the magnet 502 may have a square shape (e.g., such that the first dimension is equal to or substantially equal to the second dimension). In some implementations, the magnet 502 may have a rod shape. In some implementations, the magnet 502 may have a circular shape (e.g., a disk shape) or a hollow circular shape (e.g., a ring shape). For example, in some implementations, the magnet 502 may have dimensions equal to or substantially equal to the dimensions of a disk-shaped battery (e.g., a watch battery such as a CR2032 battery). In some implementations, other shapes, a combination of shapes, etc. may be employed; for example, various types of curves may be incorporated into one or more magnetic strips (e.g., elongated oval shaped strips). Patterns of magnetic material may used; for example two crossed magnetic strips, a pattern of crosses, circles, etc. may be attached, incorporated into the bottom wall, side wall 562, etc. of the capacitor 500.

In some implementations, the magnet 502 may have a curved shape that matches or substantially matches a curve of the case 560 of the capacitor 500. For example, the magnet 502 may have a curve that allows the magnet 502 to make continuous contact with the side wall 562 of the case 560 of the capacitor 500. In some implementations, the magnet 502 may have dimensions of approximately 1 inch×1 inch and a thickness of about ¹⁄₁₀ of an inch. Such a magnet 502 may be curved such that the magnet 502 is configured to interface with an inner wall of the case 560 of the capacitor 500 (e.g., interior to the case 560).

As described in more detail below, in some implementations, the magnet 502 (e.g., the curved magnet) may be positioned exterior to the case 560 of the capacitor 500. In some implementations, a first surface of the magnet 502 may be curved such that the first surface of the magnet 502 interfaces with an exterior wall of the case 560 of the capacitor 500, and a second surface opposite of the first surface may have a substantially flat shape that is configured to interface with a flat surface of a separate object (e.g., a surface or wall of an air conditioning system). In some implementations, multiple curved magnets 502 may be provided in one or more of the configurations described herein (e.g., including multiple curved magnets, a curved and a non-curved magnet, etc.).

In some implementations, the magnet 502 may run along (e.g., make continuous contact) with the full perimeter of the side wall 562 of the case 560. That is, the magnet 502 may have a sleeve shape with a diameter that is slightly less than a diameter of the capacitor 500. In this way, substantially all of the side wall 562 of the case 560 of the capacitor 500 may be magnetic such that the user can affix any portion of the side wall 562 of the capacitor 500 to a magnetic surface (e.g., without needing to rotate the capacitor 500 to find a surface that is in line with the magnet 502, as may be the case in implementations in which a magnet 502 having a strip shape is used).

The particular shape and/or dimensions of the magnet 502 may be chosen to achieve the desired strength of magnetic attraction. For example, the magnet 502 may be designed with a particular shape and/or larger dimensions and/or larger thicknesses to achieve a relatively higher strength of magnetic attraction with a magnetic surface. In some implementations, increased surface area of the magnet 502 toward the side wall 562 of the case 560 of the capacitor 500 may increase the strength of magnetic attraction.

In some implementations, the magnet 502 has a strength of approximately 30-40 milliTeslas (mT) or a strength of approximately 65-75 mT. In some implementations, the strength of magnetic attraction can be increased by stacking multiple magnets 502 (e.g., one beside the other). In some implementations, two stacked magnets 502 can have a strength of approximately 70-80 mT, 60-80 mT, or 130-150 mT, although other ranges are also possible. In some implementations, the magnet 502 may be a D40×4 ferrite ceramic magnet manufactured by Hangzhou Honesun Magnet Co., Ltd.

In some implementations, the magnet 502 may be magnetized using one or more of a plurality of techniques. For example, in some implementations, the magnet 502 may be magnetized such that a north and a south pole of the magnet 502 is located at a particular position of the magnet 502. For example, the techniques for magnetizing the magnet 502 may cause the north and/or south pole to be located at various thicknesses of the magnet 502, etc. In some implementations, the magnet 502 may be a multi-pole magnet.

In some implementations, the magnet 502 is a permanent magnet that is made from a material that is magnetized and creates its own persistent magnetic field. For example, the magnet 502 may be made from a ferromagnetic material that can be magnetized, such as iron, nickel, cobalt, and/or an alloy of rare-earth metals, among others. In some implementations, the magnet 502 is a ferrite and/or ceramic magnet. In some implementations, the magnet 502 may include one or more of ferric oxide, iron oxide, barium, barium carbonate, strontium, and/or strontium carbonate. The magnet 502 may include one or more magnetically "hard" materials (e.g., materials that tend to stay magnetized). Alternatively or additionally, the magnet 502 may include one or more magnetically "soft" materials.

In some implementations, the magnet 502 may be a rare-earth magnet. A rare-earth magnet is typically a relatively strong permanent magnet that is made from one or more alloys of rare-earth elements. Example of rare-earth elements that can be used in a rare-earth magnet include elements in the lanthanide series, scandium, and yttrium, although other elements may also or alternatively be used. In some implementations, the rare-earth magnet may produce a magnetic field of greater than 1.0 T. In some implementations, the rare-earth magnet may include one or both of samarium-cobalt and neodymium.

In some implementations, the magnet 502 may be made from one or more ceramic compounds (e.g., ferrite) that can be produced by combining iron oxide and one or more metallic elements. In some implementations, such ceramic compounds may be electrically nonconductive. The use of such ceramic compounds for the magnet 502 may eliminate the inclusion of electrically conductive elements in the capacitor 500 that may otherwise affect the operation of the capacitor 500.

In some implementations, the magnet 502 may have a grade that corresponds to a particular standard (e.g., a National and/or International standard). In some implementations, the grade of the magnet 502 corresponds to the Chinese ferrite magnet nomenclature system. For example, in some implementations, the magnet 502 is grade Y10 T, Y25, Y30, Y33, Y35, Y30BH, or Y33BH, although other grades are also possible. In some implementations, the grade corresponds to a working temperature of 250° C. In some implementations, the grade of the magnet 502 corresponds to a Feroba, an American (e.g., "C"), or a European (e.g., "HF") grading standard.

While the capacitor 500 shown in the illustrated example includes one magnet 502, additional magnets may also be provided. For example, a plurality of magnets 502 may be positioned proximate to the side wall 562 of the case 560 of the capacitor 500. The plurality of magnets 502 may have dimensions that are relatively smaller than dimensions that may be chosen for implementations in which only a single magnet 502 is used. The plurality of magnets 502 may have dimensions substantially similar to dimensions of a watch battery, such as a CR2032 battery. The plurality of magnets 502 may be positioned at various locations proximate to the side wall 562 of the case 560. For example, the plurality of magnets 502 may be arranged in a ring around a perimeter of the side wall 562 such that the plurality of magnets 502 are spaced approximately equidistant from one another. In some implementations, the plurality of magnets 502 may be arranged in groups of two, three, etc. magnets 502. Any number of magnets 502 may be provided to achieve the desired strength of magnetic attraction.

Like the magnet 402 described above with respect to FIG. 31, the magnet 502 illustrated in FIG. 32 can also be an electromagnet that includes a core and a coil wrapped around the core, in which the materials, dimensions, configuration, and/or operating characteristics of the electromagnet can be chosen to achieve the desired strength of magnetic attraction.

In some implementations, the capacitors 400, 500 may be configured to accept the magnet 402, 502 after manufacture of the capacitor 400, 500. For example, the capacitor 400, 500 may include one or more movable surfaces (e.g., doors or compartments) that can be opened by the user such that the user can place the magnet 402, 502 inside the capacitor 400, 500. In this way, the user can add and/or remove the magnet 402, 502 if magnetic attraction is desired or on longer desired. Further, the user can add additional magnets or remove magnets if a lesser strength of magnetic attraction is desired. For example, if a surface to which the capacitor 400, 500 is mounted is highly magnetic, the strength of magnetic attraction provided by the configuration of the magnets 402, 502 may be excessive. As such, the user can remove one or more of the magnets 402, 502 from the capacitor 400, 500 until the desired strength of magnetic attraction is achieved. On the other hand, if a surface to which the capacitor 400, 500 is mounted is relatively non-magnetic, the strength of magnetic attraction provided by the configuration of the magnets 402, 502 may be too low. As such, the user can add one or more additional magnets to the capacitor 400, 500 until the desired strength of magnetic attraction is achieved.

In some implementations, a bottom end of the capacitor 400 (e.g., an area proximate to and including the bottom wall 464 of the case 460) may be removable from the rest of the case 460 of the capacitor. In some implementations, the bottom end of the capacitor 400 may be attached by threading such that the bottom end of the capacitor 400 may be removed by twisting the bottom end of the capacitor 400 away from the rest of the case 460. Removing the bottom end of the capacitor 400 may reveal a compartment within which the magnet 400 (and, e.g., additional magnets) can be placed and/or removed. In some implementations, the side wall 562 of the case 560 of the capacitor 500 may include a slidable and/or otherwise openable door that reveals a compartment of the capacitor 500 within which the magnet 502 (and, e.g., additional magnets) can be placed and/or removed.

In some implementations, the case 460, 560 of the capacitor 400, 500 may be made from a magnetic material (e.g., a metallic material). The magnet 402, 502 may be held in place at least in part by magnetic attraction between the magnet 402, 502 and the case 460, 560. For example, the magnet 402 may be magnetically attracted to the bottom wall 464 of the case 460 of the capacitor 400, and the magnet 502 may be magnetically attracted to the side wall 562 of the case 560 of the capacitor 500. In some implementations, the case 460, 560 may be made from a non-magnetic material such as a plastic material. In such implementations, one or more other mechanisms or techniques may be used to fix the magnet 402, 502 in place, as described below.

In some implementations, the magnet 402, 502 may be affixed to a surface of the capacitor 400, 500 by one or more mounting mechanisms. For example, one or more brackets may be used to affix the magnet 402 to the bottom wall 464 of the case 460. In some implementations, a bracket may be positioned around a surface of the magnet 402, and one or more fasteners may be used to affix the bracket against the bottom wall 464 of the case 460. Similarly, one or more brackets may be used to affix the magnet 502 to the side wall 562 of the case 560. In some implementations, a bracket may be positioned around a surface of the magnet 502, and one or more fasteners may be used to affix the bracket against the side wall 562 of the case 560. In some implementations, an adhesive may be used to affix the magnet 402, 502 to the bottom wall 464 of the case 460 and/or the bottom cup 470 and the side wall 562 of the case 560.

In some implementations, the magnet 402, 502 may be held sufficiently in place by being wedged between the bottom wall 464 of the case 460 and the bottom cup 470, or by being wedged between the side wall 562 of the case 560 and other components of the capacitor 500. In some implementations, magnetic attraction between the magnet 402, 502 and other components of the capacitor 400, 500 (e.g., the case 460, 560) may assist in holding the magnet 402, 502 in place.

In some implementations, the magnet 402, 502 may be held in place at least in part by an epoxy. For example, once the magnet 402, 502 is positioned at its desired position within the case 460, 560 of the capacitor 400, 500, an epoxy can be introduced in proximity to the magnet 402, 502. Upon curing, the epoxy can provide sufficient strength for holding the magnet 402, 502 in its desired mounting location.

In some implementations, a cutout (e.g., a recess) may be provided in which the magnet 402, 502 can be seated (e.g., to assist in holding the magnet 402, 502 in place at its desired mounting location). The cutout may be provided in the case 460, 560 of the capacitor 400, 500 and/or in the bottom cup 470 of the capacitor 400. The cutout may provide a ridge that surrounds a perimeter of the magnet 402, 502 to keep the magnet 402, 502 in place. In this way, the magnet 402, 502 is prevented from sliding to other locations within the case 460, 560 of the capacitor 400, 500.

While the magnets 402, 502 have been illustrated as being positioned within the case 460, 560 of the capacitor 400, 500, in some implementations, the magnet 402, 502 may be mounted to an exterior of the case 460, 560. For example, in some implementations, the magnet 402 may be mounted to a bottom surface of the bottom wall 464 of the case 460 of the capacitor 400. The magnet 402 may have a shape that substantially matches the shape of the bottom surface of the bottom wall 464. In this way, when the capacitor 400 is mounted to a magnetic object (e.g., an air conditioning system), the capacitor 400 can be positioned flush with the surface of the object. Similarly, in some implementations, the magnet 502 may be mounted to an outside surface of the side wall 562 of the case 560 of the capacitor 500. In some examples, the magnet 502 may be wrapped around or substantially around the outside surface of the side wall 562 of the case 560 such that substantially all outside surfaces of the case 560 are magnetic. The magnet 402, 502 may be mounted using one or more mounting mechanisms (e.g., brackets), an adhesive, an epoxy, one or more fasteners, etc. For example, one or more brackets may be used to mount the magnet 402, 502 in an interior of the case 460, 560 or at an exterior of the case 460, 560. In some implementations, the magnet 402, 502 may be a magnetic film that is applied to a portion of the case 460, 560 of the capacitor 400, 500. For example, the magnet 402, 502 may be a magnetic film applied to the exterior of the case 460, 560.

In some implementations, the magnet 402, 502 may have a thickness of approximately 4 mm. For example, in implementations in which the magnet 402 is mounted to the bottom surface of the bottom wall 464 of the case 460 of the capacitor 400, a width of approximately 4 mm for the magnet 402 may provide sufficient strength of magnetic attraction without making the capacitor 400 unwieldy (e.g., by adding excessive height to the capacitor 400). Therefore, the capacitor 400 does not take up excessive volume at its mounting location (e.g., at or within an air conditioning system).

In some implementations, one or more portions of the case 460, 560 of the capacitor 400, 500 are themselves magnetic, and/or the bottom cup 70, 470 is magnetic. For example, the capacitor 400, 500 may be designed such that the case 460, 560 is made from a magnetic material. In this way, the capacitor 400, 500 can be mounted in a variety of configurations as required for the particular application. For example, the bottom wall 464 of the case 460 of the capacitor 400 and/or the bottom cup 70, 470 of the capacitor 400 may be made from a magnetic material such that the bottom wall 464 of the capacitor 400 can be magnetically attracted to a magnetic object, and/or the side wall 562 of the case 560 of the capacitor 500 may be made from a magnetic material such that the side wall 562 of the capacitor 500 may be magnetically attracted to a magnetic object.

While the magnets 402, 502 have been illustrated and described as belonging to different capacitors 400, 500, in some implementations, the magnet 402 of FIG. 31 and/or the magnet 502 of FIG. 32 may be incorporated into other capacitors described herein. For example, in some implementations, the magnet 502 may also be incorporated into the capacitor 400 (e.g., instead of or in addition to the magnet 402), and vice versa. In some implementations, one or both of the magnet 402 and the magnet 502 may be incorporated into the capacitor 10 and/or the capacitor 200 and/or the capacitor 300.

While many implementations have been described above (e.g., such as the implementations described with respect to FIGS. 31 and 32), other implementations are also possible. In some implementations, the capacitors described herein (e.g., the capacitor 10, 200, 300, 400, and/or 500) may include multiple stacked magnets toward the bottom of the capacitor (e.g., similar to the capacitor 400 of FIG. 31, and as described above, between the bottom wall 464 of the case 460 and the bottom cup 470). For example, two magnets having a circular shape (e.g. disk shape) may be stacked on top of each other such that the centers of the two magnets are in alignment. In some implementations, the two magnets may be made from one or more ceramic compounds (e.g., ferrite), for example, which can be produced by combining iron oxide and one or more metallic elements.

In some implementations (e.g., in addition to implementations that include the two stacked magnets described above), multiple magnets may be provided at the side wall of the capacitor (e.g., the side wall 62, 562 of the capacitor 400, 500). For example, two magnets may be provided inside the side wall 62, 562 of the capacitor 400, 500. The two magnets may have a curved shape (e.g., as described above). In some implementations, each of the curved magnets may be configured to interface with an inner wall of the case 460, 560. In some implementations, the curved magnets may have dimensions of approximately 1 inch×1 inch and a thickness of approximately ¹⁄₁₀ of an inch. In some implementations, the two curved magnets are stacked vertically. For example, a first curved magnet may be provided at a first height between the side wall 62, 562 of the capacitor 400, 500 and the capacitive element 12, and a second curved magnet may be provided at a second height (e.g., above or below the first height) between the side wall 62, 562 of the capacitor 400, 500 and the capacitive element 12. In some implementations, each of the curved magnets may run around a full circumference of the side wall 62, 562 of the capacitor 400, 500 (e.g., such that the magnets have a ring or sleeve shape). In some implementations, one of the magnets may run around a full circumference while the other magnet runs around less than an entirety (e.g., a portion) of the circumference. In yet additional implementations, both of the magnets may run around less than an entire circumference (e.g., a portion of the circumference of the side wall 62, 562). In some implementations, the two curved magnets are positioned at the same vertical height along the length of the side wall 62, 562. In such implementations, the two curved magnets may each run less than the entire circumference of the side wall 62, 562. In some implementations, one or both of the two curved magnets may be a rare-earth magnet that includes neodymium.

In some implementations, one or both of the magnets placed inside the side wall 62, 562 may be positioned between an inside surface of the side wall 62, 562 and a portion of the bottom cup 70, 470. For example, one or both of the curved magnets may be positioned between the side wall 62, 562 and the up-turned skirt 74 that embraces the lower side wall of the cylindrical capacitive element 12 and spaces it from the side wall 62, 562 of the case 460, 560. In some implementations, the up-turned skirt 74 may run further up the side wall 62, 562 an additional length than what is illustrated in the figures (e.g., in FIGS. 31 and 32). The multiple curved magnets may be stacked vertically or located at the same vertical height in a manner similar to that described above.

In some implementations, a liner may be positioned between the two curved magnets and the capacitive element 12. For example, in implementations in which the curved magnets are not positioned between the side wall 62, 562 and the up-turned skirt 74, a liner may be applied over one or both of the curved magnets to separate the curved magnets from the capacitive element 12. The liner may include a non-conductive material or any other material suitable for separating the magnets from the capacitive element 12 (e.g., for minimizing effects of the magnet on the performance of the capacitive element 12 and/or other components). In some implementations, the liner is a plastic adhesive material that can be applied over a surface of one or both of the curved magnets to separate the curved magnets from other components of the capacitor 400, 500. In some implementations, the liner can assist in holding the one or both of the curved magnets in place at the side wall 62, 562 of the capacitor 400, 500.

In some implementations, one or both of the two curved magnets may be positioned between the bottom cup 70, 470 of the capacitor 400, 500 and the bottom wall 64, 464 of the capacitor 400, 500. For example, one or both of the curved magnets may be placed in a position between the bottom cup 470 and the bottom wall 464 of the capacitor 400 shown in FIG. 31. The curved magnets may be placed instead of or in addition to the magnet 402 of FIG. 31. The one or both of the curved magnets may be positioned in one or more of the configurations described in the preceding paragraphs. For example, the two curved magnets may be stacked vertically (e.g., one on top of the other, with the two curved magnets optionally making contact with one another) or the two curved magnets may be positioned at the same vertical height of the capacitor 400, 500 (e.g., such that each of the curved magnets runs along less than an entire circumference of the side wall 62, 562, or such that each of the curved magnets runs along half of the circumference of the side wall 62, 562 such that the sides of the two magnets make contact with each other). As mentioned above, one or more of the curved magnets may be a rare-earth magnet that include neodymium, while the disk shaped magnets may be made from one or more ceramic compounds (e.g., ferrite), although other materials are also possible. In some implementations, the neodymium curved magnets may have a relative higher (e.g., a substantially higher) degree of magnetic attraction as compared to that of the disk shaped ceramic magnets.

While the various disc shapes magnets and curved magnets have largely been described as being placed inside of the case 460, 560 of the capacitor 400, 500, in some implementations, one or more of the magnets described herein may be placed outside of the case 460, 560. For example, one or more of the disk shaped magnets may be positioned on a bottom (e.g., outside) surface of the bottom wall 64, 464 of the case 460, 560. The magnets may be affixed to the outside of the case 460, 560 by the strength of magnetic attraction. In some implementations, one or more mounting mechanisms (e.g., brackets), an adhesive, an epoxy, one or more fasteners, etc. may be used to assist in mounting the magnets to the outside of the case 460, 560. For example, one or more brackets may be used to mount the one or more magnets to the exterior of the case 460, 560. In some implementations, a liner (e.g., such as the liner described above) may be used to assist in mounting the one or more magnets to the case 460, 560.

Similarly, one or more of the curved magnets may be positioned on an outside surface of the side wall, 62, 562 of the case 460, 560. The magnets may be affixed to the outside of the case 460, 560 by the strength of magnetic attraction. In some implementations, one or more mounting mechanisms (e.g., brackets), an adhesive, an epoxy, one or more fasteners, etc. may be used to assist in mounting the magnets to the outside of the case 460, 560. For example, one or more brackets may be used to mount the one or more magnets to the exterior of the case 460, 560. In some implementations, a liner (e.g., such as the liner described above) may be used to assist in mounting the one or more magnets to the case 460, 560.

While the curved magnets have been described as having a curved shape that substantially interfaces with the side wall 62, 562 of the case 460, 560, in some implementations, a first wall of one or more of the curved magnets may have a curved shape that interfaces with the side wall 62, 562 of the case 460, 560, and an opposite wall (e.g., a wall opposite of the curved wall of the one or more magnet) may have a substantially flat shape. The substantially flat shape may allow the case 460, 560 to interface with a flat surface of a separate object (e.g., an air conditioning system). For example, in some implementations, one or more of the curved magnets may be positioned on an exterior of the side wall 62, 562 of the case 460, 560 (e.g., as described above). The opposite surface of the curved magnet may have a flat shape that can substantially interface with a flat magnetically-attractive surface, such as a metal wall of an air conditioning unit or system. The flat shape of the opposite surface of the one or more magnets may allow the capacitor 400, 500 to create a sufficient magnetic bond with the air conditioning unit or system, such that the capacitor cannot become inadvertently dislodged or misaligned from its intended mounting position.

In some implementations, one or more of the curved magnets may be configured to interface with both an outside of the side wall 62, 562 of the capacitor 400, 500 and the bottom wall 64, 464 of the capacitor 400, 500. For example, one or more of the curved magnets may include at least five relevant surfaces: a first curved surface (e.g., inside surface) that is configured to interface with the outside surface of the side wall 62, 562, a second flat surface (e.g., inside surface) that is configured to interface with the bottom wall 64, 464, and three additional flat surfaces (e.g., outside surfaces) that are configured to interface with one or more mounting location (e.g., of one or more surfaces of an air conditioning unit or system). The inside surfaces can allow the magnet to make intimate contact with the case 460, 560 of the capacitor 400, 500, thereby allowing the one or more magnets to maintain contact with the capacitor 400, 500 using one or more of the techniques described above. The three outside surfaces may allow the one or more magnets to make intimate contact with a mounting location, such as a corner mounting location that allows a bottom outside surface of the magnet to interface with a bottom mounting location, a first side outside surface perpendicular to the bottom outside surface to interface with a side mounting location, and a second side outside surface perpendicular to the bottom outside surface and the first side surface to interface with another side mounting location, thereby allowing the capacitor 400, 500 to be mounted in a corner target area while being placed on a bottom surface of the target area.

In some implementations, the magnet may include two outside surfaces (e.g., without a bottom outside surface) that allows the capacitor 400, 500 to be mounted in a corner target area without the capacitor 400, 500 necessarily being placed on (e.g., magnetically attracted to) a bottom surface of the mounting area. In this way, the capacitor 400, 500 can be mounted to a corner target area of an air conditioning unit or system while being suspended (e.g., without being placed on a bottom surface of the mounting area).

As described above, in some implementations, one or more of the curved magnets may be a rare-earth magnet that include neodymium, while the disk shaped magnets may be made from one or more ceramic compounds (e.g., ferrite), although it should be understood that other materials can additional or alternatively be used for any of the magnets described herein. In some implementations, the neodymium curved magnets may have a relatively higher (e.g., a substantially higher) degree of magnetic attraction as compared to that of the disk shaped ceramic magnets. Such a configuration may, for example, provide additional magnetic mounting strength for implementations in which the capacitor 400, 500 is side mounted (e.g., mounted to a side surface of a target mounting location without the bottom wall 64, 464 of the case 460, 560 making contact with a bottom surface of the mounting location), sometimes referred to herein as a suspended mounting configuration. The relatively higher degree of magnetic attraction provided by one or more of the curved magnets may allow the capacitor 400, 500 to be mounted in such configurations without becoming dislodged or misplaced from the target location. For example, the relatively higher degree of magnetic attraction may prevent the capacitor 400, 500 from sliding down a wall of the mounting location due to the effects of gravity. In contrast, in implementations in which the bottom wall 64, 464 of the capacitor 400, 500 is mounted to a bottom surface of the target mounting location (e.g., on a bottom surface of an air conditioning unit or system), such additional strength of magnetic attraction may not be necessary to maintain the capacitor 400, 500 in proper mounting configuration. Nonetheless, additional curved magnets may also be included to provide additional and/or redundant magnetic attraction for mounting purposes.

Figure 33A:
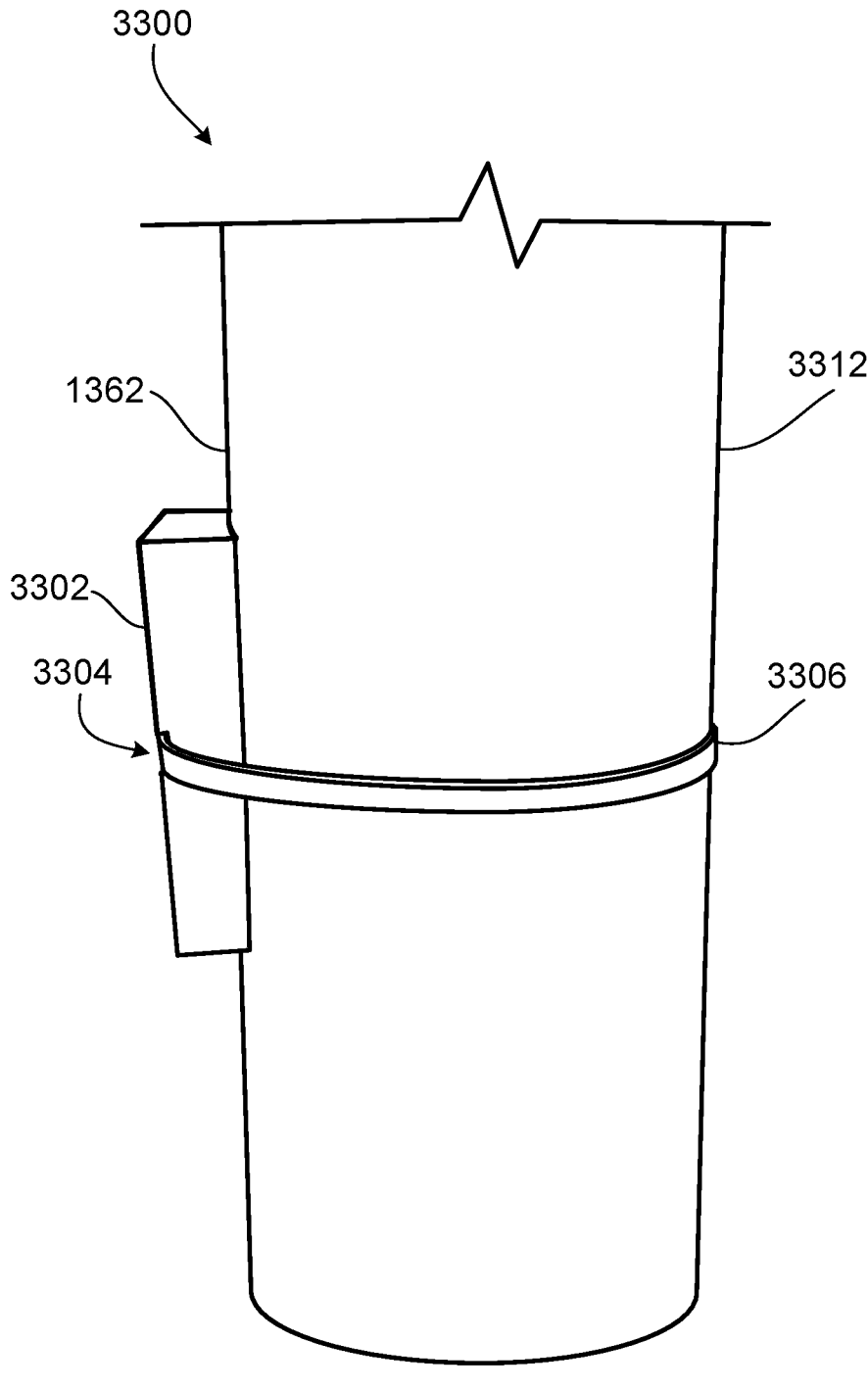
FIGS. 33A-C show an example of a capacitor and a magnet configured to be mounted to a case of the capacitor.
Figure 33B:
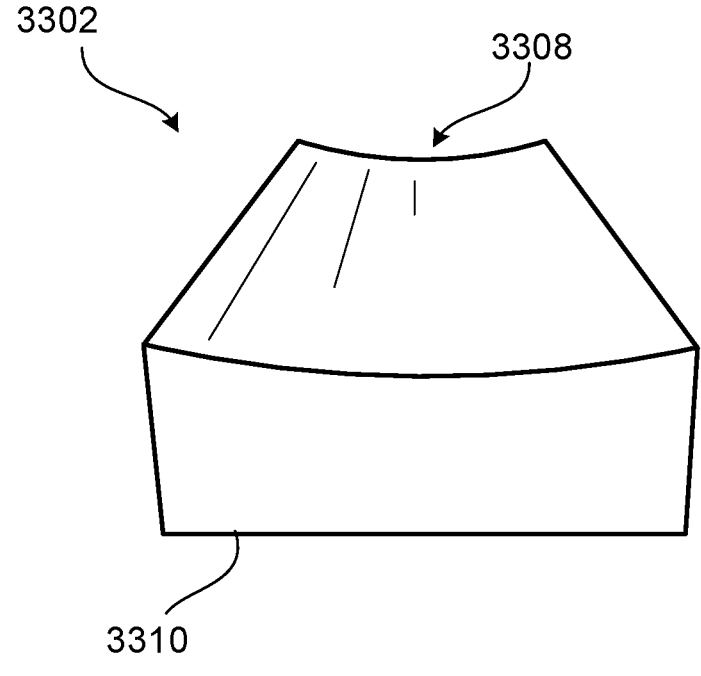
Figure 33C:
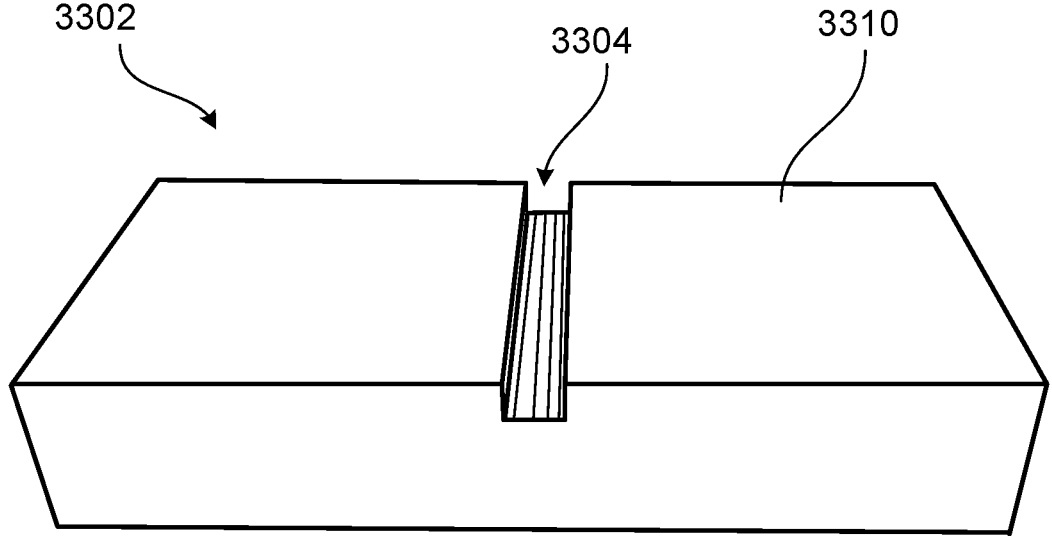

FIGS. 33A-C show an example of a capacitor 3300 and a magnet 3302 mounted to an outside surface of the capacitor 3300. In particular, FIG. 33A shows a curved magnet 3302 that is mounted to an outside surface of a side wall 3362 of a case 3312 of the capacitor 3300 by a fastener. In the illustrated example, the fastener is a cable tie 3306 (e.g., a zip tie). When the magnet 3302 is in a mounted position (e.g., as shown in FIG. 33A), a portion of the cable tie 3306 resides in an elongated recess 3304 of the magnet 3302. The recess 3304 is configured to accept the portion of the cable tie 3306 and prevent the magnet 3302 from sliding upward or downward and out from underneath the cable tie 3306. A remainder of the cable tie 3306 wraps around an outer circumference of the case 3312 and applies an inward radial force to the magnet 3302, thereby holding the magnet 3302 in place on the outside surface of the side wall 3362 of the case 3312. In some implementations, the magnet 3302 may additionally be affixed to the case 3312 with the assistance of magnetic attraction. For example, the case 3312 may be made from a material that is magnetically attractive, and additional mounting strength can be provided by the strength of magnetic attraction between the magnet 3302 and the case 3312.

Referring to FIGS. 33B and 33C, the magnet 3302 includes the elongated recess 3304 that provides a track in which a portion of the cable tie 3306 may reside. In the illustrated example, the recess 3304 includes a plurality of grooves that interface with the cable tie 3306 when the cable tie 3306 is positioned therein.

The magnet 3302 also includes an inner curved surface 3308 that is configured to interface with the side wall 3362 of the case 3312, and an opposite outer flat surface 3310 (e.g., opposite to the curved surface 3308) that has a substantially flat shape. The flat surface 3310 can allow the case 3312 to interface with a surface (e.g., a substantially flat surface) of a separate object, such as an air conditioning system. For example, in some implementations, the magnet 3302 may be positioned on the exterior of the side wall 3362 of the case 3312 (e.g., as illustrated in FIG. 33A). The flat surface 3310 of the magnet 3302 can interface with a magnetically-attractive surface, such as a metal wall of an air conditioning unit or system. The strength of magnetic attraction between the flat surface 3310 and the magnetically-attractive surface may allow the capacitor 3300 to create a sufficient magnetic bond with the air conditioning unit or system such that the capacitor 3300 cannot become inadvertently dislodged or misaligned from its intended mounting position.

While the magnet 3302 is illustrated as being mounted directly to the case 3312 in FIG. 33A, in some implementations, one or more structures may be included to assist with and/or facilitate the mounting. For example, in some implementations, one or more mount-assist structures may be interfaced between the exterior of the side wall 3362 of the case 3312 and the magnet 3302. The structure(s) may interface with the exterior of the side wall 3362 of the case 3312 via one or more recesses, grooves, cutouts, slots, patterns, etc. that are provided on the case 3312 and/or the structure. For example, one or more recesses, grooves, cutouts, slots, patterns, etc. may be incorporated into an inner surface of the structure and configured to interface with the case 3312. In some implementations, corresponding (e.g., complementing, inverse, mirror, etc.) recesses, grooves, cutouts, slots, patterns, etc. on the case 3312 are also or alternatively provided to assist with the interfacing. For example, the case 3312 may include a recess that is configured to accept the inner surface of the mount-assist structure. The structure may include a curved surface that interfaces with the case 3312 (e.g., similar to the curved surface 3308 of the magnet 3302). Such recesses, grooves, cutouts, slots, patterns, etc. may assist in maintaining the structure in place (e.g., by guiding the structure into a particular position on the exterior of the side wall 3362 of the case 3312).

Similarly, the magnet 3302 may interface with an outer surface of the mount-assist structure (e.g., a surface that is opposite to the inner surface that interfaces with the case 3312) via one or more recesses, grooves, cutouts, slots, patterns, etc. that are provided on the structure and/or the magnet 3302. For example, one or more recesses, grooves, cutouts, slots, patterns, etc. may be incorporated into the outer surface of the structure and configured to interface with the magnet 3302. In some implementations, corresponding (e.g., complementing, inverse, mirror, etc.) recesses, grooves, cutouts, slots, patterns, etc. on the magnet 3302 are also or alternatively provided to assist with the interfacing. For example, the mount-assist structure may include a recess that is configured to accept the magnet 3302. In some implementations, a magnet other than the magnet 3302 illustrated in FIGS. 33A-C may be used. For example, a rectangular magnet with flat sides may be used. In this way, the structure may include a rectangular recess with a flat surface that is sized and shaped to match the rectangular magnet, and the rectangular magnet may be configured to fit into the recess. Such recesses, grooves, cutouts, slots, patterns, etc. may assist in maintaining the magnet in place (e.g., by guiding the magnet into a particular position on the mount-assist structure, and thus into a particular position with respect to the exterior of the side wall 3362 of the case 3312). In some implementations, one or more materials (e.g., adhesive, epoxy, etc.) can be used to assist in affixing the structure(s) to the case 3312 and/or the magnet to the structure(s).

In some implementations, rather than one or more mount-assist structures being used to facilitate the mounting of the magnet 3302 (or a different magnet) to the case 3312, one or more of the recess, groove, cutout, slot, pattern, etc. techniques described above may be applied to the case 3312 and/or the magnet 3302 directly to assist with the mounting. For example, one or more recesses, grooves, cutouts, slots, patterns, etc. may be incorporated into the exterior of the side wall 3362 of the case 3312 and configured to interface with the magnet 3302. In some implementations, corresponding (e.g., complementing, inverse, mirror, etc.) recesses, grooves, cutouts, slots, patterns, etc. on the magnet 3302 are also or alternatively provided to assist with the interfacing. For example, the exterior of the side wall 3362 of the case 3312 may include a recess that is configured to accept the magnet 3302. In some implementations, the recess may be sized and shaped to accept the curved surface 3308 of the magnet 3302 such that the magnet 3302 resides at least partially within the recess. Such recesses, grooves, cutouts, slots, patterns, etc. may assist in maintaining the magnet 3302 in place (e.g., by guiding the magnet 3302 into a particular position on the exterior of the side wall 3362 of the case 3312). In some implementations, one or more materials (e.g., adhesive, epoxy, etc.) can be used to assist in affixing the magnet 3302 to the case 3312.

Similarly, in some implementations, one or more of the recess, groove, cutout, slot, pattern, etc. techniques described above may be applied to another surface of the magnet 3302 (e.g., the flat surface 3310 of the magnet 3302) to assist with interfacing the magnet 3302 with the surface of the separate object (e.g., the air conditioning system). For example, one or more recesses, grooves, cutouts, slots, patterns, etc. may be incorporated into the flat surface 3310 of the magnet 3302 and configured to interface with the surface of the air conditioning system. As described above, the strength of magnetic attraction between the magnet 3302 and a magnetically-attractive surface of the air conditioning system may improve the bond between the two. However, in some implementations, the inclusion of one or more recesses, grooves, cutouts, slots, patterns, etc. may improve the integrity of the interface between the magnet 3302 and the surface and therefore minimize the need to rely on any magnetic attraction to assist with the interface. In this way, in some implementations, the magnet 3302 (and the capacitor 3300) may be mounted to surfaces that have little or no magnetic attraction to the magnet 3302. In some implementations, corresponding (e.g., complementing, inverse, mirror, etc.) recesses, grooves, cutouts, slots, patterns, etc. on the mounting surface (e.g., of the air conditioning system) can also or alternatively be provided to assist with the interfacing. For example, the mounting surface may include a recess that is configured to accept the magnet 3302. In some implementations, the recess may be sized and shaped to accept the flat surface 3310 of the magnet 3302 such that the magnet 3302 resides at least partially within the recess. Such recesses, grooves, cutouts, slots, patterns, etc. may assist in maintaining the magnet 3302 in place (e.g., by guiding the magnet 3302 into a particular position on the mounting surface of the air conditioning system). In some implementations, one or more materials (e.g., adhesive, epoxy, etc.) can be used to assist in affixing the magnet 3302 to the mounting surface, although it should be understood that such materials are not necessary. Further, it should be understood that the recess, groove, cutout, slot, pattern, etc. techniques described above can be implemented in addition to the cable tie 3306 or, in some cases, without the cable tie 3306 to assist in the mounting.

In some implementations, the magnet 3302 may be mounted toward a middle portion of the capacitor 3300 (e.g., toward the middle in an axial direction) as shown in FIG. 33A. However, in some implementations, the magnet 3302 may be mounted elsewhere. For example, in some implementations, the magnet 3302 may be mounted toward a top portion or a bottom portion of the capacitor 3300.

Figure 34A:
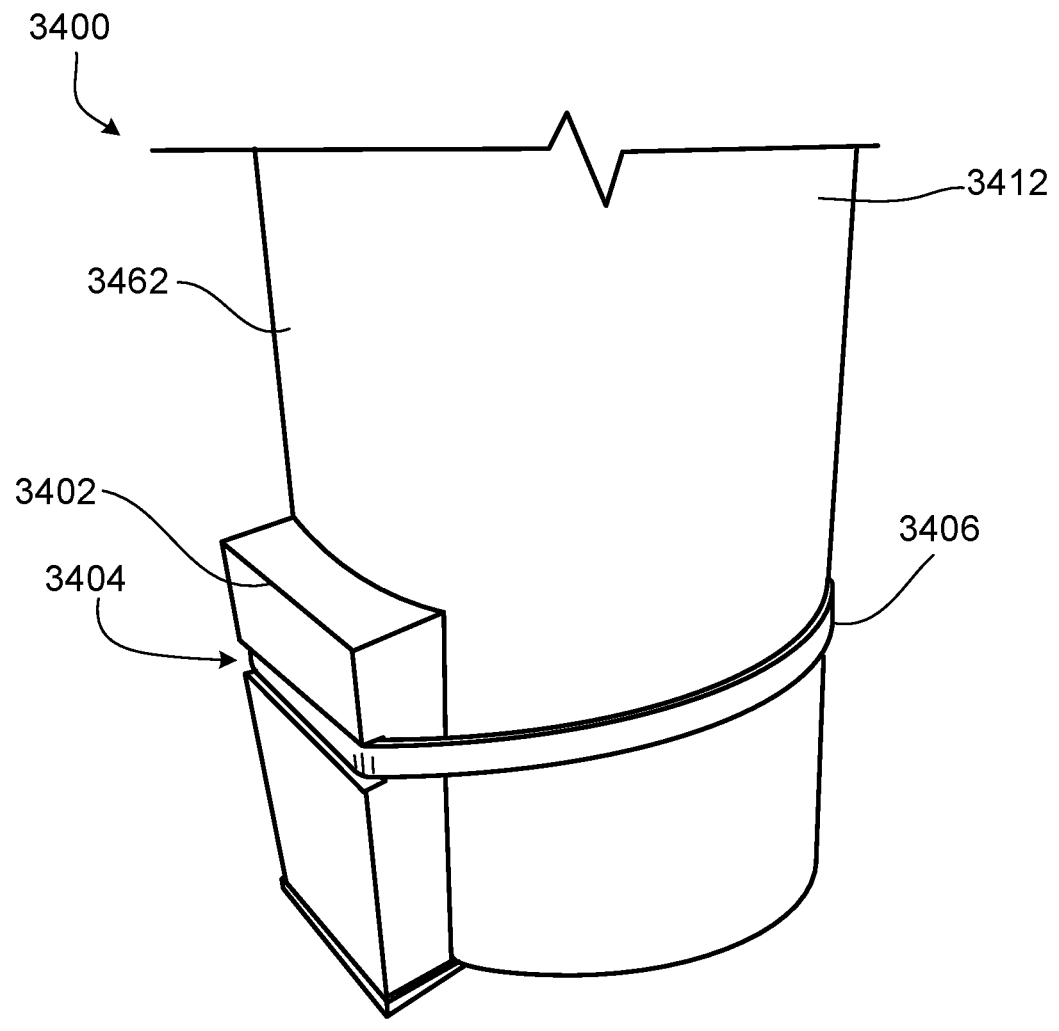
FIGS. 34A-C show another example of a capacitor and a magnet configured to be mounted to a case of the capacitor.
Figure 34B:
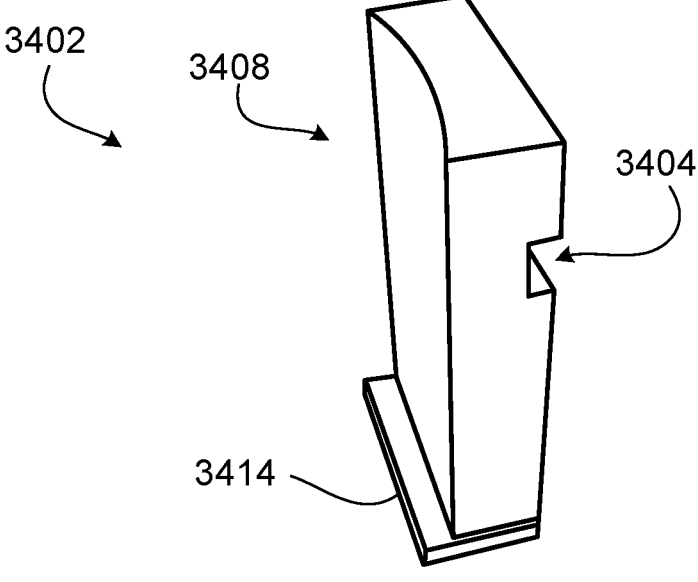
Figure 34C:
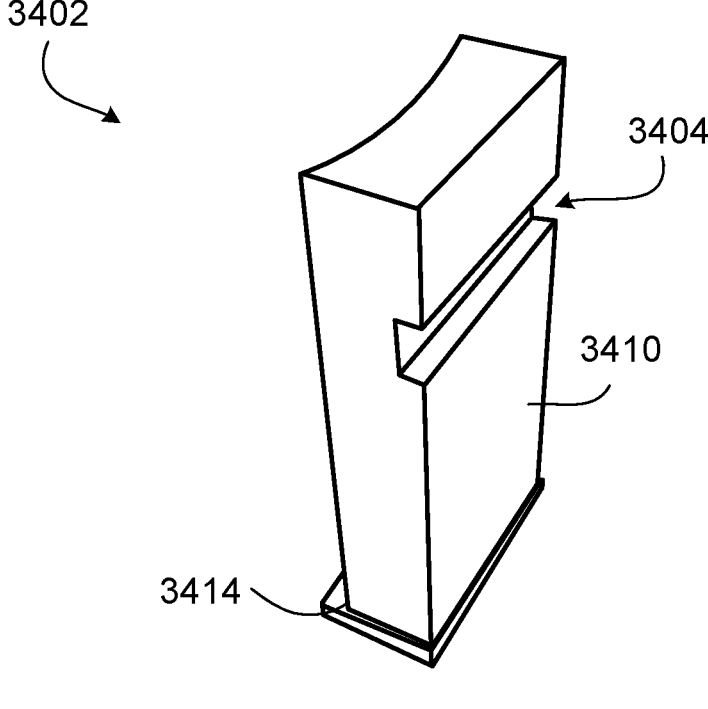

FIGS. 34A-C show another example of a capacitor 3400 and a magnet 3402 that is mounted toward a bottom portion of the capacitor 3400. In some implementations, one or more of the capacitors described herein may include one or more relays (e.g., potential relays, control relays, electronic relays, etc.). One or more relays may be incorporated into one or more of the capacitors described herein, for example, to allow the capacitor to operate as a hard start capacitor. Such capacitors are sometimes referred to as "start" capacitors, "hard start" capacitors, "easy start" capacitors, "motor start" capacitors, etc. A relay may be accommodated above a capacitor container of the capacitors described herein, for example, within a projected cylindrical envelope. In some implementations, capacitor may be configured to accept a cylindrical cap that can surround and cover the relay.

In some implementations, operations of the relay may be affected by magnetic fields in the vicinity of the relay. In particular, the magnets described herein may alter the magnetic field around the relay and cause the relay to operate in a manner that is undesirable. In some implementations, the positioning of the magnet 3402 toward the bottom portion of the capacitor 3400 (e.g., as shown in FIG. 34A) and away from the relay mounted toward the top portion of the capacitor 3400 may minimize the impact of the magnetic field created by the magnet 3402 on the operation of the relay, thereby allowing the relay to operate as intended.

The magnet 3402 illustrated in FIGS. 34A-C may be similar to the magnet 3302 illustrated in FIGS. 33A-C. For example, the magnet 3402 is a curved magnet 3402 that is mounted to an outside surface of a side wall 3462 of a case 3412 of the capacitor 3400 by a cable tie 3406. When the magnet 3402 is in a mounted position (e.g., as shown in FIG. 34A), a portion of the cable tie 3406 resides in an elongated recess 3404 of the magnet 3402. The recess 3404 is configured to accept the portion of the cable tie 3406 and assist in preventing the magnet 3402 from sliding upward or downward and out from underneath the cable tie 3406. A remainder of the cable tie 3406 wraps around an outer circumference of the case 3412 and applies an inward radial force to the magnet 3402, thereby holding the magnet 3402 in place on the outside surface of the side wall 3462 of the case 3412. In some implementations, the magnet 3402 may additionally be affixed to the case 3412 with the assistance of magnetic attraction. For example, the case 3412 may be made from a material that is magnetically attractive, and additional mounting strength can be provided by the strength of magnetic attraction between the magnet 3402 and the case 3412.

Referring to FIGS. 34B and 34C, the magnet 3402 includes the elongated recess 3404 that provides a track in which a portion of the cable tie 3406 may reside. In the illustrated example, the recess 3404 includes a plurality of grooves that interface with the cable tie 3406 when the cable tie 3406 is positioned therein.

The magnet 3402 also includes an inner curved surface 3408 that is configured to interface with the side wall 3462 of the case 3412, and an opposite outer flat surface 3410 (e.g., opposite to the curved surface 3408) that has a substantially flat shape. The flat surface 3410 can allow the case 3412 to interface with a surface (e.g., a substantially flat surface) of a separate object, such as an air conditioning system. For example, in some implementations, the magnet 3402 may be positioned on the exterior of the side wall 3462 of the case 3412 (e.g., as illustrated in FIG. 34A). The flat surface 3410 of the magnet 3402 can interface with a magnetically-attractive surface, such as a metal wall of an air conditioning unit or system. The strength of magnetic attraction between the flat surface 3410 and the magnetically-attractive surface may allow the capacitor 3400 to create a sufficient magnetic bond with the air conditioning unit or system such that the capacitor 3400 cannot become inadvertently dislodged or misaligned from its intended mounting position.

In the illustrated example, the magnet 3402 also includes a projection 3414 toward a bottom portion of the magnet 3402 that is configured to assist in holding the magnet 3402 in place at an intended mounted location on the case 3412 of the capacitor 3400. In some implementations, the projection 3414 may be provided as a separate portion of the magnet 3402 such that the magnet includes at least two separate pieces that are attached (e.g., by one or more of an adhesive, a mounting structure, magnetic attraction, etc.). In other words, the magnet 3402 may not be formed of a single monolithic piece. The projection 3414 may be formed as a lip (e.g., a tab or shelf) that extends horizontally, thereby creating a bottom surface of the magnet 3402 that has an area that is larger than a horizontal cross section of the rest of the magnet 3402. Referring to FIG. 34A in particular, the magnet 3402 may be mounted toward the bottom portion of the case 3412 such that the projection 3414 resides beneath a bottom surface of the case 3412 of the capacitor 3400. The projection 3414 can prevent the magnet 3402 from sliding upward and out from underneath the cable tie 3406.

Like the capacitor 3300 and magnet 3302 described with respect to FIGS. 33A-C, the capacitor 3400 and magnet 3402 illustrated in FIGS. 34A-C may also employ one or more structures to assist with and/or facilitate the mounting. For example, one or more mount-assist structures may be interfaced between the exterior of the side wall 3462 and/or a bottom wall of the case 3412 and the magnet 3402. Further, one or more recesses, grooves, cutouts, slots, patterns, etc. may be provided on the case 3412, the magnet 3402, and/or the mount-assist structure to assist with interfacing between the various components, in a manner similar to that described above. Similarly, one or more of the recess, groove, cutout, slot, pattern, etc. techniques described above may be applied to another surface of the magnet 3402 (e.g., the flat surface 3410 of the magnet 3402) to assist with interfacing the magnet 3402 with a surface of a separate object (e.g., the air conditioning system). In some implementations, one or more materials (e.g., adhesive, epoxy, etc.) may be used to assist in affixing the magnet 3402 to the case 3412 and/or the magnet 3402 to a mounting surface. For example, an epoxy may be placed between the magnet 3402 and an exterior of a bottom surface of the case 3412 and/or the exterior of the side wall 3462 of the case 3412.

Figure 35:
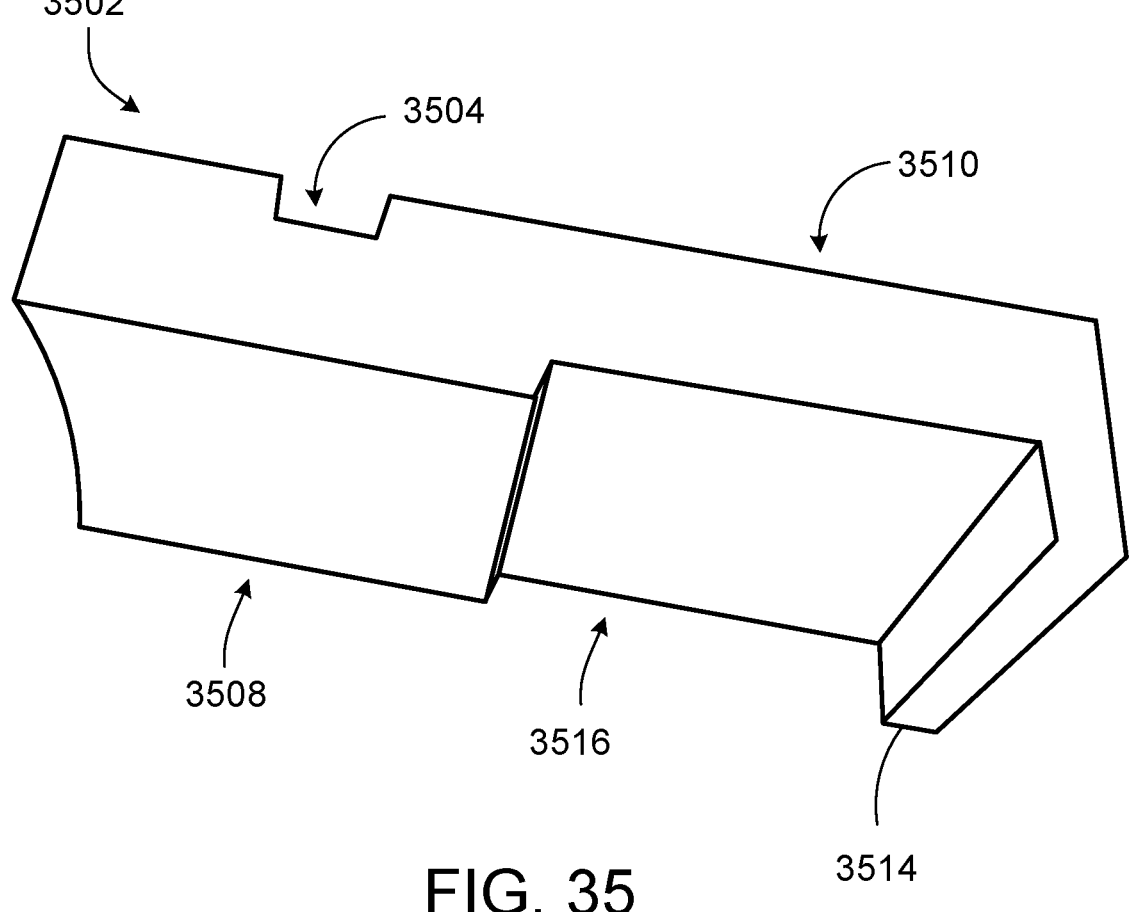
FIG. 35 shows an example of a magnet configured to be mounted to a case of a capacitor. The same reference numerals refer to the same elements throughout the various Figures.

FIG. 35 shows another example of a magnet 3502 that (e.g., like the magnet 3402 of FIGS. 34A-C) is configured for mounting toward a bottom portion of a capacitor. As described above, in some implementations, one or more of the capacitors described herein may include one or more relays (e.g., potential relays, control relays, electronic relays, etc.). A relay may be included toward a top portion of the capacitor. In some implementations, operations of the relay may be affected by magnetic fields in the vicinity of the relay. In particular, the magnets described herein may alter the magnetic field around the relay and cause the relay to operate in a manner that is undesirable. In some implementations, the positioning of the magnet 3502 toward the bottom portion of the capacitor away from the relay situated toward the top portion of the capacitor may minimize the impact of the magnetic field created by the magnet 3502 on the operation of the relay, thereby allowing the relay to operate as intended.

The magnet 3502 illustrated in FIG. 35 may be similar to the magnet 3402 illustrated in FIGS. 34A-C. For example, the magnet 3502 includes a curved portion and is configured to be mounted to an outside surface of a side wall of a case of a capacitor (e.g., the capacitor 3400 of FIGS. 34A-C or a similar capacitor) by a cable tie or other structure. When the magnet 3502 is in a mounted position, a portion of the cable tie may reside in an elongated recess 3504 of the magnet 3502. The recess 3504 is configured to accept the portion of the cable tie and assist in preventing the magnet 3502 from sliding upward or downward and out from underneath the cable tie. A remainder of the cable tie can wrap around an outer circumference of the capacitor and apply an inward radial force to the magnet 3502, thereby holding the magnet 3502 in place on the outside surface of the side wall of the case of the capacitor. In some implementations, the magnet 3502 may additionally be affixed to the capacitor with the assistance of magnetic attraction. For example, the case of the capacitor may be made from a material that is magnetically attractive, and additional mounting strength can be provided by the strength of magnetic attraction between the magnet 3502 and the case of the capacitor. In the illustrated example, the recess 3504 includes a plurality of grooves that interface with the cable tie when the cable tie is positioned therein.

The magnet 3502 also includes an inner curved surface 3508 that is configured to interface with the side wall of the case of the capacitor, and an opposite outer flat surface 3510 (e.g., opposite to the curved surface 3508) that has a substantially flat shape. The flat surface 3510 can allow the case to interface with a surface (e.g., a substantially flat surface) of a separate object, such as an air conditioning system. For example, in some implementations, the magnet 3502 may be positioned on the exterior of the side wall of the case of the capacitor (e.g., similarly to the illustration of FIG. 34A, except with the magnet 3502 of FIG. 35). The flat surface 3510 of the magnet 3502 can interface with a magnetically-attractive surface, such as a metal wall of an air conditioning unit or system. The strength of magnetic attraction between the flat surface 3510 and the magnetically-attractive surface may allow the capacitor to create a sufficient magnetic bond with the air conditioning unit or system such that the capacitor cannot become inadvertently dislodged or misaligned from its intended mounting position.

In the illustrated example, the magnet 3502 also includes a projection 3514 toward a bottom portion of the magnet 3502 that is configured to assist in holding the magnet 3502 in place at an intended mounted location on the case of the capacitor. In the illustrated example, the magnet 3502 is a monolithic piece that includes the projection 3514. For example, the magnet 3502 is formed of a single monolithic piece that includes a cutout 3516 that increases a surface area of a top surface of the projection 3514 (e.g., a top surface that faces in a direction of the curved surface 3508 of the magnet 3502). The projection 3514 may be formed as a lip (e.g., a tab or shelf) that extends horizontally, thereby creating a bottom surface of the magnet 3502 that has an area that is larger than a horizontal cross section of the rest of the magnet 3502. The magnet 3502 may be mounted toward the bottom portion of the capacitor such that the projection 3514 resides beneath a bottom surface of the case of the capacitor. The projection 3514 can prevent the magnet 3502 from sliding upward and out from underneath the cable tie used to mount the magnet 3502 to the capacitor.

Like the capacitors 3300, 3400 and magnets 3302, 3402 described with respect to FIGS. 33A-C and 34A-C, the magnet 3502 illustrated in FIG. 35 may also employ one or more structures to assist with and/or facilitate the mounting. For example, one or more mount-assist structures may be interfaced between an exterior of the side wall and/or a bottom wall of the case of the capacitor and the magnet 3502. Further, one or more recesses, grooves, cutouts, slots, patterns, etc. may be provided on the case, the magnet 3502, and/or the mount-assist structure to assist with interfacing between the various components, in a manner similar to that described above. Similarly, one or more of the recess, groove, cutout, slot, pattern, etc. techniques described above may be applied to another surface of the magnet 3502 (e.g., the flat surface 3510 of the magnet 3502) to assist with interfacing the magnet 3502 with a surface of a separate object (e.g., the air conditioning system). In some implementations, one or more materials (e.g., adhesive, epoxy, etc.) may be used to assist in affixing the magnet 3502 to the case of the capacitor and/or the magnet 3502 to a mounting surface. For example, an epoxy may be placed between the magnet 3502 and an exterior of a bottom surface of the case of the capacitor and/or the exterior of the side wall of the case of the capacitor.

In some implementations, the projection 3514 may have a form different from what is illustrated in FIG. 35 and described above. For example, in some implementations, the magnet may include a disk-shaped projection such that the projection resides beneath a bottom wall of the capacitor to assist in preventing the magnet from moving vertically upwards in an axial direction along the capacitor. The disk-shaped projection may have a circumference and area that is similar to, smaller than, or larger than the circumference and/or area of the capacitor to which the magnet is mounted. In some implementations, rather than the magnet being completely formed for a magnetic material, the disk-shaped portion may be formed of a magnetic material (e.g., to allow for mounting via the bottom surface of the case), and the rest of the structure may be formed of a non-magnetic material. In this way, the magnetic material can be situated away from the top of the capacitor (e.g., which may include a relay), and the remainder of the structure that may be situated relatively closer to the top of the capacitor may be formed of a material that will not influence the operation of the relay. The disk-shaped projection may be connected to the flat surface of the magnet in a manner similar to the projection 3514 and magnet 3502 illustrated in FIG. 35.

In some implementations, rather than the magnet 3502 including a curved surface 3508 that is configured to interface and/or match a curved surface of the case of the capacitor, the magnet may include two canted surfaces (e.g., having a "v-shaped" cross section) that is configured to accommodate capacitors of various sizes, cross-sectional areas, circumferences, and diameters. The two canted surfaces meet at a point. For example, while the curved surfaces of the magnets described with respect to FIGS. 33A-C, 34A-C, and 35 are configured to interface with a capacitor of a particular size and/or shape, a magnet including the canted surfaces described herein may be configured to accommodate a wider range of different capacitors. In turn, such a magnet may be especially useful when provided as an aftermarket addition to a capacitor to assist an end user in mounting the capacitor as desired.

The two canted surfaces may have a relatively wide v-shaped cross section such that, when the magnet is placed against a round surface of a capacitor, the capacitor makes contact with the case of the capacitor at at least two points; in particular, the capacitor and the magnet may make contact with each other at a first line on a first one of the canted surfaces, the capacitor and the magnet may make contact with each other at a second line on a second one of the canted surfaces, and the capacitor and the magnet may not make contact at the location where the two canted surfaces meet. In other words, in some implementations, a void may be formed between the magnet and the capacitor, and edge portions of the canted surfaces may flare away from the capacitor such that outer edges of the canted surfaces do not make contact with the capacitor.

In some implementations, an outer (e.g., exterior) surface of each of the canted surfaces may include a recess (e.g., similar to the recesses 3404, 3504 described above) that is configured to accept a cable tie to apply inward force to the magnet 3502, thereby assisting in mounting the magnet 3502 to the capacitor. In some implementations, an outer point (e.g., the seam at which the two canted surfaces meet) may be flattened (e.g., shaved down) and a single horizontal recess may be provided thereon to accept the cable tie.

In some implementations, the magnet 3302, 3402, 3502 may be mounted to a capacitor (e.g., the capacitors 3300, 3400, or other capacitors in accordance with those described herein) such that the magnet 3302, 3402, 3502 is configured to maintain a particular vertical (e.g., axial) position on the case while being permitted to rotate about the case. For example, mounting by the cable tie may sufficiently hold the magnet 3302, 3402, 3502 in place against the case of the capacitor such that the magnet 3302, 3402, 3502 will not become dislodged from the case, yet the cable tie may include enough slack to allow the magnet 3302, 3402, 3502 to be rotated about a central axis of the case when a tangential force is applied to the magnet 3302, 3402, 3502. In some implementations, an adhesive and/or epoxy may be omitted between the case and the magnet 3302, 3402, 3502 to allow for such rotation. Rotating the magnet 3302, 3402, 3502 about the case can allow a user to customize the configuration of the magnet 3302, 3402, 3502 to meet a particular need. For example, the magnet 3302, 3402, 3502 can be positioned as desired to allow the capacitor to be mounted at a desired position. In some examples, the magnet 3302, 3402, 3502 can be positioned such that particular ones of the terminals of the capacitor are positioned at desired locations. The magnet 3302, 3402, 3502 can be rotated such that one or more particular terminals of the capacitor are accessible or more easily accessible (e.g., for attaching a wire thereto). For example, the magnet 3302, 3402, 3502 may be rotated such that a terminal to which a wire/clip is to be attached is openly positioned (e.g., with sufficient clearance) when the capacitor is mounted at a desired position at an air conditioning unit. On the other hand, in some implementations, the magnet 3302, 3402, 3502 may be mounted such that rotation is prevented.

In some implementations, the capacitor and magnet 3302, 3402, 3502 can be provided (e.g., from a manufacturer or supplier) in an assembled form substantially as illustrated in FIGS. 33A and 34A. For example, the capacitor can be provided with the magnet 3302, 3402, 3502 mounted thereon by the cable tie. In this way, the capacitor, the magnet 3302, 3402, and the cable tie are all in contact with their respective components (e.g., at the time of manufacturer and/or prior to shipping).

In some implementations, the various components illustrated in FIGS. 33A-C, 34A-C, and/or 35 may be provided separately for subsequent assembly. In this way, one or more of the capacitor, the magnet 3302, 3402, 3502, and the cable tie may not be in contact with each other initially (e.g., at the time of shipping). For example, the illustrated components may be provided as a capacitor mounting kit/system that includes the capacitor, the magnet 3302, 3402, 3502, and the cable tie (and in some cases the mount-assist structure(s)) for assembly by an end user and/or a retailer. In some implementations, the magnet 3302, 3402, 3502 may be provided without the cable tie 3306, 3406, the capacitor 3300, 3400, and/or any mount-assist structure(s) for attachment to a capacitor by an end user and/or retailer (e.g., as illustrated in FIG. 35). In some implementations, the capacitor can be provided without the magnet 3302, 3402, 3502, the cable tie, and/or the mount-assist structure(s) in a form that is configured to be fitted with a separate magnet and a cable tie after the fact. For example, the capacitors described herein may be provided with an indicator, label, recess, etc. indicating a location at which a magnet should be provided and including instructions for using a cable tie to assist with such mounting. In some implementations, the capacitor and the magnet 3302, 3402, 3502 may be provided together with instructions for the end user to mount the magnet 3302, 3402, 3502 to the capacitor by a cable tie (which is to be obtained by the end user).

In some implementations, the magnet 3302, 3402, 3502 can have one or more characteristics of the various magnets described herein, including but not limited to the magnets 402 and 502 of FIGS. 31 and 32, in any of a number of combinations.

In some implementations, any of the various magnets described herein (e.g., the magnet 402 of FIG. 31, and/or the magnet 502 of FIG. 32, and/or the magnet 3302, 3402 of FIGS. 33A-C and 34A-C, and/or the magnet 3502 of FIG. 35, and/or multiple ones of the magnets as described herein in any combination or configuration) may be mounted inside and/or outside of the case of the capacitor. For example, to name a few examples, and not by way of limitation, multiple disk shaped magnets may be mounted on an exterior of the case. In particular, multiple disk shaped magnets in a stacked configuration, as described above, may be positioned on an exterior (e.g., bottom) surface of a bottom wall of the capacitor. In some implementations, a first disk shaped magnet may be mounted inside of the case, and a second disk shaped magnet may be mounted outside of the case (e.g., on the exterior surface of the bottom wall of the capacitor).

In some implementations, any of the various magnets described herein may be molded from a magnetic material and/or may be a single, monolithic piece. For example, one or more of the magnets described herein may be molded from a magnetic powder.

In some implementations, any combination of one or more disk shaped magnets, and/or one or more strip shaped magnets, and/or one or more curved magnets, etc. may be mounted in any combination of inside and/or outside of the case. In sum, while particular implementations are described herein and illustrated in the figures, it should be understood that any combination of the interior and/or exterior magnets described herein may be incorporated into the various capacitors 10, 200, 300, 400, 500, 3300, and/or 3400 described herein.

In some implementations, providing magnetic mounting capability for the capacitor can provide a number of advantages. For example, in some implementations, a component to which or within which the capacitor is to be mounted (e.g., an air conditioning system) may or may not include an area (e.g., a designated area) that is typically used for mounting the capacitor. However, the user may desire to mount the capacitor elsewhere. By providing magnetic mounting capability, the number of options for mounting can be greatly increased.

In some implementations, the capacitor is mounted at locations that include metallic and/or magnetic objects. Such objects may impact the performance of the capacitor. In some implementations, the user may desire to mount the capacitor at a particular location such that particular operating conditions are achieved. Magnetic mountability of the capacitor can allow the user to mount the capacitor at such locations. In some examples, the capacitor can be mounted at locations that allow for shorter conductive connections (e.g., wires) between the capacitor's section cover terminals and common cover terminal and the device to which the capacitor is connected. Without such flexibility in possible mounting locations, the wires may be excessively long and may be susceptible to being cut or broken along with being susceptible to noise and/or distortions.

The capacitor and the features thereof described above are believed to admirably achieve the objects of the invention and to provide a practical and valuable advance in the art by facilitating efficient replacement of failed capacitors. Those skilled in the art will appreciate that the foregoing description is illustrative and that various modifications may be made without departing from the spirit and scope of the invention, which is defined in the following claims.

The invention claimed is:

1. An apparatus providing a plurality of selectable capacitance values, the apparatus comprising:
   a plurality of capacitive devices providing at least three capacitors each having a capacitance value, each of the plurality of capacitive devices having a first capacitor terminal;
   a case receiving the plurality of capacitive devices, the case having an open end;
   a cover assembly sealingly secured to the open end of the case, the cover assembly comprising:
   a deformable cover mountable to the case,
   a common cover terminal having a contact extending from the deformable cover,
   three capacitor cover terminals, each corresponding to one of the at least three capacitors provided by the plurality of capacitive devices and each having at least one contact extending from the deformable cover, wherein the deformable cover is configured to displace at least one of the three capacitor cover terminals upon an operative failure of at least one of the plurality of capacitive devices, and
   three insulation structures, wherein each is configured to provide insulation for at least one of the three capacitor cover terminals; and
   a plurality of conductors, wherein each conductor electrically connects one capacitor cover terminal to its corresponding capacitive device of the plurality of capacitive devices, at least some of the conductors being frangibly connected to a respective capacitor cover terminal;

wherein a monolithic magnetic element is configured to be positioned at an exterior of the case; and wherein the apparatus may be connected to provide selected capacitance values in an electric circuit by attaching selected ones of the common cover terminal and capacitor cover terminals to conductors of the electrical circuit, and outward deformation of the deformable cover caused by operative failure of at least one of the plurality of capacitive devices breaks at least some of the frangible connections sufficient to disconnect the plurality of capacitive devices from the electric circuit.

2. The apparatus of claim 1 wherein the plurality of capacitive devices are each separately wound.

3. The apparatus of claim 2 wherein the plurality of capacitive devices are positioned in a vertically stacked configuration in the case.

4. The apparatus of claim 1 wherein each of the capacitive devices has a second capacitor terminal, and the second capacitor terminals of the capacitive devices are electrically connected to the common cover terminal.

5. The apparatus of claim 1 wherein the common cover terminal is centrally located on the deformable cover.

6. The apparatus of claim 1 wherein one of the at least three capacitors has a 25 microfarad capacitance value and another of the at least three capacitors has a 20 microfarad capacitance value.

7. The apparatus of claim 1 wherein the plurality of capacitive devices provide at least one additional capacitor.

8. The apparatus of claim 7 wherein the at least one additional capacitor has a capacitance value of about 5 microfarads.

9. The apparatus of claim 1 wherein the case is cylindrical and at least one plurality of capacitive devices is placed vertically in the case.

10. The apparatus of claim 1 wherein the combined capacitance value of the capacitors provided by the plurality of capacitive devices greater than about 55.0 microfarads.

11. A capacitor as defined in claim 1 wherein the common cover terminal is positioned generally centrally on the deformable cover and the capacitor cover terminals are positioned surrounding the common cover terminal.

12. A capacitor as defined in claim 1 wherein each of the capacitor cover terminals is surrounded by an insulator cup, and the insulator cups are color coded to indicate the capacitance value of the capacitor electrically connected thereto.

13. The apparatus of claim 1 wherein the apparatus is configured for dual application such that at least one capacitive device is operable for use with a compressor motor of the air-conditioning system and another capacitive device is operable for use with a fan motor of the air-conditioning system.

14. The apparatus of claim 1 wherein the monolithic magnetic element comprises a curved surface having a shape that substantially matches a shape of the exterior of the case.

15. The apparatus of claim 1 wherein the monolithic magnetic element comprises a recess for receiving a cable tie to assist in holding the monolithic magnetic element to the case.

16. A system comprising:

an apparatus providing a plurality of selectable capacitance values, the apparatus comprising:

a plurality of capacitive devices providing at least three capacitors each having a capacitance value, each of the plurality of capacitive devices having a first capacitor terminal, a case receiving the plurality of capacitive devices, the case having an open end, a cover assembly sealingly secured to the open end of the case, the cover assembly comprising:

a deformable cover mountable to the case;

a common cover terminal having a contact extending from the deformable cover;

three capacitor cover terminals, each corresponding to one of the at least three capacitors provided by the plurality of capacitive devices and each having at least one contact extending from the deformable cover, wherein the deformable cover is configured to displace at least one of the three capacitor cover terminals upon an operative failure of at least one of the plurality of capacitive devices; and three insulation structures, wherein each is configured to provide insulation for at least one of the three cover terminals, and a plurality of conductors, wherein each conductor electrically connects one capacitor cover terminal to its corresponding capacitive device of the plurality of capacitive devices, at least some of the conductors being frangibly connected to a respective capacitor cover terminal; and a monolithic magnetic element is configured to be positioned at an exterior of the case, wherein the monolithic magnetic element comprises a curved surface having a shape that substantially matches a shape of the exterior of the case, and a flat surface opposite the curved surface.

17. The system of claim 16, wherein the monolithic magnetic element comprises a recess for receiving a cable tie to assist in holding the monolithic magnetic element to the case.

18. The apparatus of claim 1, wherein the monolithic magnetic element comprises a projection that comprises the curved surface.

19. The apparatus of claim 18, wherein the monolithic magnetic element comprises a flat surface opposite the curved surface.

20. The system of claim 16, wherein the monolithic magnetic element comprises a projection that comprises the curved surface.

* * * * *